United States Patent
Ofek et al.

(10) Patent No.: US 6,982,979 B2
(45) Date of Patent: Jan. 3, 2006

(54) TIME FRAME SWITCHING METHOD USING TIME FRAME LABELS AND A COMMON TIME REFERENCE

(75) Inventors: Yoram Ofek, Riverdale, NY (US); Mario Baldi, Cuneo (IT)

(73) Assignee: Synchrodyne Networks, Inc., Riverdale, NY (US)

( * ) Notice: Subject to any disclaimer, the term of this patent is extended or adjusted under 35 U.S.C. 154(b) by 813 days.

(21) Appl. No.: 09/960,206

(22) Filed: Sep. 21, 2001

(65) Prior Publication Data

US 2002/0080828 A1 Jun. 27, 2002

Related U.S. Application Data

(63) Continuation-in-part of application No. 09/120,700, filed on Jul. 22, 1998
(60) Provisional application No. 60/235,765, filed on Sep. 27, 2000, and provisional application No. 60/261,133, filed on Jan. 10, 2001.

(51) Int. Cl.
*H04L 12/28* (2006.01)

(52) U.S. Cl. ..................................... 370/395; 370/389
(58) Field of Classification Search ................ 370/395, 370/412, 429, 389, 517; 709/248; 398/51
See application file for complete search history.

(56) References Cited

U.S. PATENT DOCUMENTS

| 6,674,754 B1 * | 1/2004 | Ofek .......................... 370/389 |
| 6,718,080 B2 * | 4/2004 | Ofek et al. ................... 385/15 |
| 6,735,199 B1 * | 5/2004 | Ofek .......................... 370/389 |
| 6,757,282 B1 * | 6/2004 | Ofek .......................... 370/389 |
| 6,778,536 B1 * | 8/2004 | Ofek et al. .............. 370/395.4 |

* cited by examiner

*Primary Examiner*—Chi Pham
*Assistant Examiner*—Prenell Jones
(74) *Attorney, Agent, or Firm*—Sitrick & Sitrick

(57) ABSTRACT

A time frame switching method and system of data units that utilize a time frame labels and a common time reference (CTR), which is divided into a plurality of contiguous periodic time frames. The system is designed to operate with high-speed wavelength division multiplexing (WDM) links. The plurality of data units that are contained in each of the time frames are forwarded in a pipelined manner through the network switches, and can be switched from any incoming WDM channel to any subset of outgoing WDM channels responsive to the time frame labels and the common time reference. The combination of time frame labels and CTR can be further used for protection when a failure occurs.

49 Claims, 44 Drawing Sheets

Maximum alignment subsystem requirements for
local recovery from arbitrary timing failure:
- *For immediate recovery a time measurement time stamp should be sent every time frame and/or time cycle.*

| Time Cycle | OC-48 – 2.4 Gb/s | OC-192 – 9.6 Gb/s |
|---|---|---|
| 1 ms | 0.3 MByte | 1.2 MByte |
| 2 ms | 0.6 MByte | 2.4 MByte |
| 4 ms | 1.2 MByte | 4.8 MByte |
| 10 ms | 3 MByte | 12 MByte |
| 20 ms | 6 MByte | 24 MByte |

FIG. 11

| TF duration [μs] | # TF queues | Memory req. [Kbytes] | Clock accuracy | Stratum | Tolerance D | H | M | S |
|---|---|---|---|---|---|---|---|---|
| 7.8125 | 20 | 195 | 1.00E-10 | 1 | 7 | 16 | 27 | 42 |
| 7.8125 | 20 | 195 | 1.60E-08 | 2 | 0 | 1 | 9 | 10 |
| 7.8125 | 20 | 195 | 4.60E-06 | 3 | 0 | 0 | 0 | 14 |
| 7.8125 | 20 | 195 | 3.20E-05 | 4 | 0 | 0 | 0 | 2 |
| 7.8125 | 200 | 1,953 | 1.60E-08 | 2 | 0 | 13 | 21 | 35 |
| 7.8125 | 200 | 1,953 | 4.60E-06 | 3 | 0 | 0 | 2 | 47 |
| 7.8125 | 200 | 1,953 | 3.20E-05 | 4 | 0 | 0 | 0 | 24 |
| 7.8125 | 1000 | 9,766 | 1.60E-08 | 2 | 2 | 19 | 36 | 48 |
| 7.8125 | 1000 | 9,766 | 4.60E-06 | 3 | 0 | 0 | 14 | 6 |
| 7.8125 | 1000 | 9,766 | 3.20E-05 | 4 | 0 | 0 | 2 | 1 |
| 15.625 | 20 | 391 | 1.00E-10 | 1 | 15 | 8 | 55 | 25 |
| 15.625 | 20 | 391 | 1.60E-08 | 2 | 0 | 2 | 18 | 20 |
| 15.625 | 20 | 391 | 4.60E-06 | 3 | 0 | 0 | 0 | 28 |
| 15.625 | 20 | 391 | 3.20E-05 | 4 | 0 | 0 | 0 | 4 |
| 15.625 | 200 | 3,906 | 1.60E-08 | 2 | 1 | 2 | 43 | 11 |
| 15.625 | 200 | 3,906 | 4.60E-06 | 3 | 0 | 0 | 5 | 34 |
| 15.625 | 200 | 3,906 | 3.20E-05 | 4 | 0 | 0 | 0 | 48 |
| 15.625 | 1000 | 19,531 | 1.60E-08 | 2 | 5 | 15 | 13 | 36 |
| 15.625 | 1000 | 19,531 | 4.60E-06 | 3 | 0 | 0 | 28 | 13 |
| 15.625 | 1000 | 19,531 | 3.20E-05 | 4 | 0 | 0 | 4 | 3 |
| 31.25 | 20 | 195 | 1.00E-10 | 1 | 30 | 17 | 50 | 50 |
| 31.25 | 20 | 195 | 1.60E-08 | 2 | 0 | 4 | 36 | 41 |
| 31.25 | 20 | 195 | 4.60E-06 | 3 | 0 | 0 | 0 | 57 |
| 31.25 | 20 | 195 | 3.20E-05 | 4 | 0 | 0 | 0 | 8 |
| 31.25 | 200 | 1,953 | 1.60E-08 | 2 | 2 | 5 | 26 | 22 |
| 31.25 | 200 | 1,953 | 4.60E-06 | 3 | 0 | 0 | 11 | 9 |
| 31.25 | 200 | 1,953 | 3.20E-05 | 4 | 0 | 0 | 1 | 36 |
| 31.25 | 1000 | 9,766 | 1.60E-08 | 2 | 11 | 6 | 27 | 12 |
| 31.25 | 1000 | 9,766 | 4.60E-06 | 3 | 0 | 0 | 56 | 26 |
| 31.25 | 1000 | 9,766 | 3.20E-05 | 4 | 0 | 0 | 8 | 6 |

FIG. 34

TIME FRAME SWITCHING METHOD USING TIME FRAME LABELS AND A COMMON TIME REFERENCE

RELATED APPLICATIONS

This is a continuation-in-part application, under 37 C.F.R. §1.53, of now abandoned prior application Ser. No. 09/120,700, filed on Jul. 22, 1998, for "INTERCONNECTING A SYNCHRONOUS SWITCHING NETWORK THAT UTILIZES A COMMON TIME REFERENCE WITH AN ASYNCHRONOUS SWITCHING NETWORK," and further claims priority of now abandoned provisional application Ser. No. 60/235,765, filed on Sep. 27, 2000, for "SWITCHING, GROOMING, AND DEGROOMING METHODS AND LINK TRANSMISSION CONTROL WITH COMMON TIME REFERENCE," and of now abandoned provisional application Ser. No. 60/261,133, filed on Jan. 10, 2001, for "SWITCHING METHODS WITH COMMON TIME REFERENCE AND PLURALITY OF TIME FRAME DURATIONS."

BACKGROUND OF THE INVENTION

This invention relates generally to a method and apparatus for switching and grooming of data units, over a plurality of communications links with a plurality of transmission rates, in a communications network in a timely manner while providing low switching complexity and performance guarantees.

Circuit-switching networks, currently the main carrier for real-time traffic, are designed for telephony service and cannot be easily enhanced to support multiple services or carry multimedia traffic in their native data unit formats. Circuit-switching is based on very accurate clock frequency for byte-by-byte multiplexing and switching, which enables circuit-switching networks to transport data streams at constant rates with a small delay jitter. Finally, SONET requires even higher clock accuracy as the line's transmission speed increases.

Packet switching networks handle bursty data more efficiently than circuit switching, due to their statistical multiplexing of the packet streams. However, current packet switches and routers operate asynchronously and provide "best effort" service only, in which end-to-end delay and jitter are neither guaranteed nor bounded. Statistical variations of traffic intensity often lead to congestion that results in excessive delays and loss of packets, thereby significantly reducing the fidelity of real-time streams at their points of reception. Additionally, current packet switches and routers electronically process the header of each packet to be routed and switched, which requires high processing power and limits the scalability of the packet switching network.

Circuit switches use time for routing. A time period is divided into very small time slices, each containing only one byte. The absolute position of each time slice within each time period determines where that particular byte is routed.

In accordance with some aspects of the present invention, time driven switching/routing supports a more sophisticated and flexible timing than circuit switching. Consequently, time driven switching provides better support of video-based multimedia applications. The time frames used for time driven switching in the present invention have longer duration than the time slot used in circuit switching—consequently, time driven switching is much simpler than circuit switching. The present invention also supports routing based on information included in at least one of the headers and trailers of selected ones of the time frames, which current circuit switching cannot provide for.

Moreover, the present invention uses a Common Time Reference (CTR). The CTR concept is not used in circuit switching. Using a CTR has far reaching implications when comparing circuit switching and the current invention. For example, CTR deterministically ensures no slip of time frames, while enabling deterministic pipeline forwarding of time frames. This is in contrast to circuit switching, where (1) there are time slot slips, and (2) deterministic pipeline forwarding is not possible.

In U.S. Pat. No. 5,418,779 Yemini et al. disclose a switched network architecture that uses time. Time is used in order to determine when a plurality of switches can transmit over a predefined routing tree to one destination. This kind of tree is known as "sink" tree since the destination switch functions as a "sink" for the transmissions from all switches. The time interval in which the plurality of switches transmits to a selected "sink" destination switch is called time band. In different time bands the plurality of switches are transmitting to a different single "sink" destination switch. Network switches change their configuration between time bands in order to build the proper "sink" tree during each time band. The present invention does use neither "sink" trees nor time bands for transmission over "sink" trees.

Yemini's invention may not be realizable in communications networks with end-to-end propagation delays that are not much smaller than the time band durations. In general, in Yemini's invention the end-to-end propagation delays introduce a non-trivial scheduling problem that may or may not have a solution. Furthermore, Yemini's invention does not discuss or specify how to take into consideration the link propagation delays and the end-to-end propagation delays. Consequently, general topology switched network cannot be built the way it is taught by Yemini's et al. invention.

Yemini's invention has another problem, which is congestion, that is the direct result of using "sink" trees. Data units received from different upstream switches contend for a single outgoing link towards the root of the "sink" tree. The present invention does not have any congestion. This is a direct consequence of using in the current invention completely different system operation principles and methods.

For example, in Yemini's et al. patent there is no pipeline forwarding: data units do not proceed in a lock-step fashion through the communications network, as it is the case in the present invention. The lack of pipeline forwarding leads to the above mentioned scheduling and congestion problems. Such problems are due to the fact that incoming time bands of Yemini's invention are not aligned in different input ports of the network's switches. Furthermore, Yemini's et al. patent does not specify what are the temporal relationship of the same and different time bands on different "sink" tree switches when the link propagation delay and the end-to-end propagation delay are not zero. In contrast, time frames in the present invention are aligned with a Common Time Reference (CTR) on every switch.

In optical data communications with a single wavelength a single data stream is transduced into a series of pulses of light carried over an optical fiber. These pulses of light are of a single wavelength. This single wavelength vastly underutilizes the capacity of the optical fiber, which is capable of carrying a large number of signals each at a unique wavelength. Due to the nature of propagation of light signals, the optical fiber can carry multiple wavelengths simultaneously. The process of carrying multiple discrete signals via separate wavelengths of light on the same optical fiber is known in the art as wavelength division multiplexing (WDM). Many optical components, including, but not limited to, WDM multiplexers, WDM demultiplexers, star couplers, tunable lasers, filters, waveguide grating routers (WGRs) are deployed in optical networks featuring WDM, and consequently used in the embodiments presented in this disclosure. [T. E. Stern and K. Bala, "Multiwavelength Optical Networks: a Layered Approach," Prentice Hall PTR, Upper Saddle River, N.J., USA, ISBN 020130967X. R. Ramaswami and K. N. Sivarajan, "Optical Networks: a Practical Perspective," Morgan Kaufmann Publishers, San Francisco, Calif., USA, ISBN 1-55860-445-6. H. J. R. Dutton, "Understanding Optical Communications," Prentice Hall PTR, Upper Saddle River, N.J., USA, ISBN 0-13-020141-3].

The increasing demand for communications capacity has led to the deployment of Wavelength Division Multiplexing (WDM), which requires extremely high capacity switches. Lambda or static wavelength switches address this need by switching a whole wavelength from an input optical fiber link to an output optical fiber link without requiring any processing of the transmitted data units. WDM with whole lambda_switching will be deployed in the network's optical core. However, switching of whole lambdas (e.g., lambdas at OC-192) is inefficient and costly for three reasons:

1. N square problem: the number of lambdas needed to accommodate all the possible connections among all access points is on the order of the square of the number of such access points. This will limit the size of the optical core.
2. Bandwidth mismatch problem: there is a substantial bandwidth mismatch when extremely high capacity backbone packet networks feed low capacity access links. As data leaves the core and is moved by packet switches towards the edge, buffers at access links frequently become congested, causing increased delays and dropped packets.
3. Traffic unbalancing problem: the traffic load across the network is not evenly distributed, i.e., it is not balanced. Thus, trying to satisfy the traffic load requirements using whole lambda_switching is both inflexible and inefficient.

These three problems are solved by adding the capability of switching_fractions of lambdas or Fractional Lambda Pipes (FLPs). This approach, which is called Fractional Lambda Switching (FLSw) or time driven switching, will permit the optical core to be extended much closer to the network edges while reaching the lower speed network access devices with a bandwidth that matches their operation capability.

FLSw dynamically switches lambda fractions while carrying data units (e.g., IP data packets, SONET STS1 frames, SONET STS-N frames) in a heterogeneous (mix of very high speed and very low speed links) meshed network, while providing deterministic performance guarantees. The size of fractional lambda pipes can be dynamically allocated to satisfy the specific needs of the access networks to which a fractional lambda pipe is connected. Small capacity FLPs can be used at the periphery to access low speed sub-networks, such as, cable modem access points, XDSL access points, VoIP gateways, and wireless.

Fractional Lambda Switching (FLSw) combines the advantages of circuit switching and packet switching. FLSw is used for constructing Fractional Lambda Pipes (FLPs). A FLP is equivalent to a leased line in circuit switching. A FLP is realized by two simple elements:

1. A Common Time Reference (CTR) throughout the network that is globally aligned with the Coordinated Universal Time (UTC); and 2. Pipeline Forwarding (PF) of time frames (logical containers of data units) across FLPs.

The CTR is a reference clock used to realize pipeline forwarding of time frames, both within switches and across FLPs. The CTR is received, for example, via the Global Positioning System (GPS), which is globally available at a low cost with an accuracy of 10-20 nanoseconds. The CTR can be alternatively derived by the signal of the GLONASS or Galileo systems. The common time reference, or more specifically the UTC second, is partitioned into time frames. The duration of a time frame is a link parameter—fast links might use shorter time frames, while slow links might use longer time frames. Contiguous time frames are grouped into time cycles, and contiguous time cycles are grouped together into contiguous super cycles. The duration of a super cycle is one UTC second, as shown in FIG. 2, and the duration of time frames and the number of timer frames in a cycle can be chosen for convenience. For example, a 1 Gb/s link might use time frames with duration of 125 microseconds, with time cycles of 100 time frames; while a 10 Gb/s link might use time frames with duration of 12.5 microseconds, with time cycles of 1000 time frames. For both links, each time frame will carry the same 15,625-byte payload, and there will be 80 time cycles in each super cycle or one UTC second, as shown in FIG. 2.

The common time reference can be realized by using UTC (Coordinated Universal Time), which is globally available via at least one of the GPS (Global Positioning) the GLONASS system and the Galileo system. By international agreement, UTC is the same all over the world. UTC is the scientific name for what is commonly called GMT (Greenwich Mean Time), the time at the 0 (root) line of longitude at Greenwich, England. In 1967, an international agreement established the length of a second as the duration of 9,192,631,770 oscillations of the cesium atom. The adoption of the atomic second led to the coordination of clocks around the world and the establishment of UTC in 1972. The Time and Frequency Division of the National Institute of Standards and Technologies (NIST) (see http://www.boulder.nist.gov/timefreq) is responsible for coordinating UTC with the International Bureau of Weights and Measures (BIPM) in Paris.

FIG. 3 shows an example of the pipeline forwarding of time frames, for a FLP, through switches A, B, and C. The path through switches A, B, and C has been previously scheduled and no header processing is necessary once data units enter the FLP. According to this specific example, the content of a TF that was forwarded from Switch A at time frame 2 will reach Switch B at time frame 5; it is then switched to the output port and forwarded at time frame 6, and will reach Switch C at time frame 9. The link between Switch A and B has a propagation delay of four time frames (time frame numbers: 2 through 5). Data units are automatically switched to the proper output port of Switch B in one time frame and then forwarded to Switch C, arriving at Switch C after three additional time frames (time frame numbers: 7 through 9). All data units are guaranteed to arrive at the end of their FLP at the same predetermined rate at which they entered the FLP.

Each FLP's switching schedule is simple, and repeats every time cycle and/or super cycle. Thus FLP, together with the predictability provided by the CTR and pipeline forwarding, eliminate the complexity of packet header processing. Each FLP transports data units of one protocol, such as IP, MPLS, ATM, FR, or FC. However, each FLP may carry data units of different protocols.

Fractional lambda switches have significantly lower complexity than packet switches and lower complexity than circuit switches with the same switching capability for the following reasons.

1. Minimum switch fabric complexity that can be implemented using a Banyan network, which has the complexity of $a \cdot N \cdot lg_a N$ switching elements, where N is the total number of optical channels and 'a' is the size—i.e., number of inputs and outputs—of each switching element.
2. No switch fabric speed-up: the switch fabric operates at the same speed as the optical channel (e.g., 10 Gb/s with OC-192 links).
3. Optimal memory access bandwidth that is equal to the optical channel bandwidth—the switch architecture enables that, with only 3 input queues, a queue is never used for reading and writing at the same time (i.e., memory access does not require a speedup).
4. (Very) small input memory for each optical channel (e.g., a 10 Gb/s channel requires 3 input queues with a total of 48 Kbytes of memory and no buffering on the output port).
5. (Very) simple control of the switch fabric, since its configuration changes at a relatively low frequency (e.g., 80,000 times per second) and it is known in advance since it changes with a reoccurring pattern. This operation complexity is comparable to that of a T1 multiplexer.

Though highly efficient, a Banyan Network is subject to what is known as switch blocking: it may be impossible to connect an idle input with an idle output because a switching element is not available on the path between input and output. An interesting attribute of fractional lambda switching is the almost complete elimination of blocking through Banyan-based switches.

The advances in optical transport led to the realization of high speed optical channels; however, a single source transmitting to a single destination will not fill such a channel. This has led to two basic requirements: (i) Grooming and degrooming: the need to aggregate (i.e., grooming) traffic from multiple sources into one optical channel and to separate (i.e., degrooming) an optical channel traffic to different destinations; and (ii) dynamic optical switching: the need to route portions from one optical channel (i.e., a lambda or a wavelength) on different optical paths to different destinations.

Dynamic all-optical switching is possible when the optical switch reconfiguration time is significantly smaller than the time between two successive switch configuration changes. Dynamic all-optical switching is appealing for a number of reasons stemming from the transparency of the transported data stream to the switching system, which has the following properties: (i) intrinsically protocol independent (multi-protocol) transport; (ii) high scalability, since the transmission rate of each optical channel is transparent to the optical switching system; and (iii) no processing performed on switched data units, thus eliminating processing bottlenecks.

The latest advances in optical switching have resulted in decreasing reconfiguration times of optical switch fabrics. However, taking full advantage of such advances for dynamic optical switching is not obvious for several reasons: (i) Processing of in band control information (e.g., packet headers) is not possible; (ii) Dynamic optical storage is not available to assist in coping with switch control and reconfiguration time; and (iii) Optical switch reconfiguration time should be significantly smaller than the time between two successive reconfigurations.

Due to the above limitations it is not possible to realize an asynchronous optical packet switching system, and therefore, using time is necessary. However, time-based techniques deployed in circuit switching—e.g., SONET, based on byte switching (i.e., byte de-multiplexing and byte multiplexing)—are not applicable to all-optical switches.

The most comprehensive solution to the above-mentioned problems is to use a common time reference (CTR) for pipeline forwarding (PF) in order to facilitate dynamic all-optical switching. A CTR provides the synchronization needed to orchestrate the control of network switches while eliminating the need for optical storage and processing.

Dynamic All-optical Switching of Time Frames

Dynamic all-optical switching of time frames works as follows: time is divided into time frames, any time frame of a sequence of incoming time frames over one optical channel can be optically switched to any outgoing optical channel. Such time frame switching is the basis of time driven switching, also known as fractional lambda switching (FLSw). FLSw is used for constructing Fractional lambda pipes (FLPs) (i.e., fractions of a wavelength). Each FLP transports data units of different protocols—such as, IP, MPLS, ATM, FR, FC, and SONET frames (e.g., STS1 frames), thereby realizing the desired protocol independent property of all-optical switching.

In an all-optical switch PF is realized in two operational phases. Data units belonging to a whole time frame received from each of the optical channels during Phase 1 are switched through the switch in Phase 2. In a possible embodiment, if Phase 1 begins in time frame t, Phase takes place in time frame t+1. In another embodiment, if Phase 1 ends in time frame t, Phase 2takes place in time frame t+1. The 2 phase operation ensures that data units received from the various optical channels are aligned with the CTR before being switched. Phase 2 can be performed during either the time frame immediately following Phase 1, during time frame t+1—immediate forwarding operation, or at a later time frame—non-immediate forwarding operation.

Alignment

Alignment consists of aligning the beginning and end of each time frame on each optical channel with the beginning and end of the CTR time frames. The alignment can be performed either before or after having separated the WDM channels deployed on a link. In other words, alignment can be performed collectively on all the channels on a link, or on each channel individually.

The alignment is needed since the propagation delay on optical links between switches is not an integer multiple of time frames. An optical alignment system is part of the all-optical fractional lambda switch and operates on all the wavelengths carried by each optical fiber and is part of Phase 1 of the PF. The optical alignment system can be based on a programmable optical delay line guaranteeing that the overall delay experienced through the optical fiber and the delay line is an integer number of time frames. As a result, when data units that have left the switch at the transmitting end of the fiber aligned with the CTR arrive at the WDM DMUX at the receiving end, they are still aligned with respect to CTR. The alignment system comprises a controller that detects time frame delimiters and adjusts the delay by using a programmable optical delay line (note that the alignment changes only when the propagation delay on the optical link changes).

SUMMARY OF THE INVENTION

Some aspects of the present invention utilize an alignment feature within an input port for aligning incoming data units to a time frame boundary prior to the entry into a switch fabric. In a possible embodiment, the alignment feature is designed using electrical components, such as random access memory (RAM) and digital circuitry. In another embodiment, the alignment feature is designed using optical components, such as optical delay lines.

In accordance with the present invention, the synchronization requirements are independent of the physical link transmission speed, while in circuit switching the synchronization becomes more and more difficult as the link speed increases. In accordance with some aspects of the present invention routing is performed based on timing information; in accordance with some aspects of the present invention routing is based also on information contained in at least the header and trailer of time frames.

A control mode is provided by the present invention where at least one time frame, or fraction of a time frame—called control time frame and control sub-time frame, respectively-comprises signaling information to establish, maintain, and dis-establish (or destroy) a reserved traffic channel. The system decodes and is responsive to the control information in the time frame or time frame fraction. The switches of the present invention respond, when able, by establishing a reserved data channel, a reserved transfer bandwidth, or by reserving capacity for the traffic associated with the control information. In an analogous fashion, a terminating control signal to each switch in a plurality of connected switches causes the switches of the present invention to respond by destroying, reallocating, or reclaiming the data transfer capacity or bandwidth that had been made available to the traffic channel.

A method is provided for coupling control information with selected time frames. Such control information is used by coupled transmitting systems and receiving systems to identify at least one of the boundaries of the time frames, the ordinal number of the time frame within the ordinal number of the time cycle within the super cycle. Deployment of this method enables the requirement on the accuracy of the common time reference to be relaxed and thereby increases the robustness and reliability of the switching systems operating responsive to the common time reference.

A system design and method are provided for switching time frames using control information, such as a label, coupled to each time frame. In one aspect of the disclosed invention the label is contained within the header associated with each time frame. A method and system is provided for mapping a time frame onto the proper switching time and forwarding time, wherein the method for mapping is responsive to the control information, such as a label, coupled to the time frame, wherein switching and forwarding is responsible to the common time reference.

Coupling control information with each time frame enables an increase in the reliability of the switching system and a reduction in the accuracy requirement on the common time reference signal. Moreover, one aspect of the invention comprises methods for providing protection switching by pre-allocating protection channels. In a possible embodiment, the same protection channel is shared by a plurality of primary channels. In an alternative embodiment, a protection channel carries low priority traffic while the primary channel operates normally.

One aspect of the invention described in the present disclosure is a method and system for switching time frames using different time references in different switches. One aspect of the invention is a method for a switching system to derive the common time reference from neighboring switches in the event that the common time reference is not available through an external signal, such as the GPS. A method is also provided for enabling a plurality of switching systems to operate with the time reference generated by one of the switching systems called a "reference node". This invention encompasses a method for electing the reference node in a distributed fashion.

The method for switching with different time references provides the switching systems with an increased robustness and independence with regards to the availability of an external common time reference signal.

These and other aspects and attributes of the present invention will be discussed with reference to the following drawings and accompanying specification.

BRIEF DESCRIPTION OF THE DRAWINGS

FIG. 7A depicts a complete encapsulation from the physical layer (SONET STS-Nc frame) to the carried data (SONET STS-1 frame);

FIG. 7B details a possible choice for higher layer protocols;

FIG. 7C shows a format of the header of a special purpose protocol to carry a SONET Synchronous Payload Environment over IP (SPE/IP);

FIG. 11 is a table providing the amount of buffering required to recover from a link failure, according to the channel capacity (OC-48 and OC-192) and the time cycle duration;

FIG. 34 shows the tolerance to the error in clock frequency of a switching system operating according to the present disclosure in a variety of configurations comprising clocks with different accuracy levels and different amounts of memory in the per-TF-queuing systems;

DETAILED DESCRIPTION OF THE PREFERRED EMBODIMENT

Figure 1:
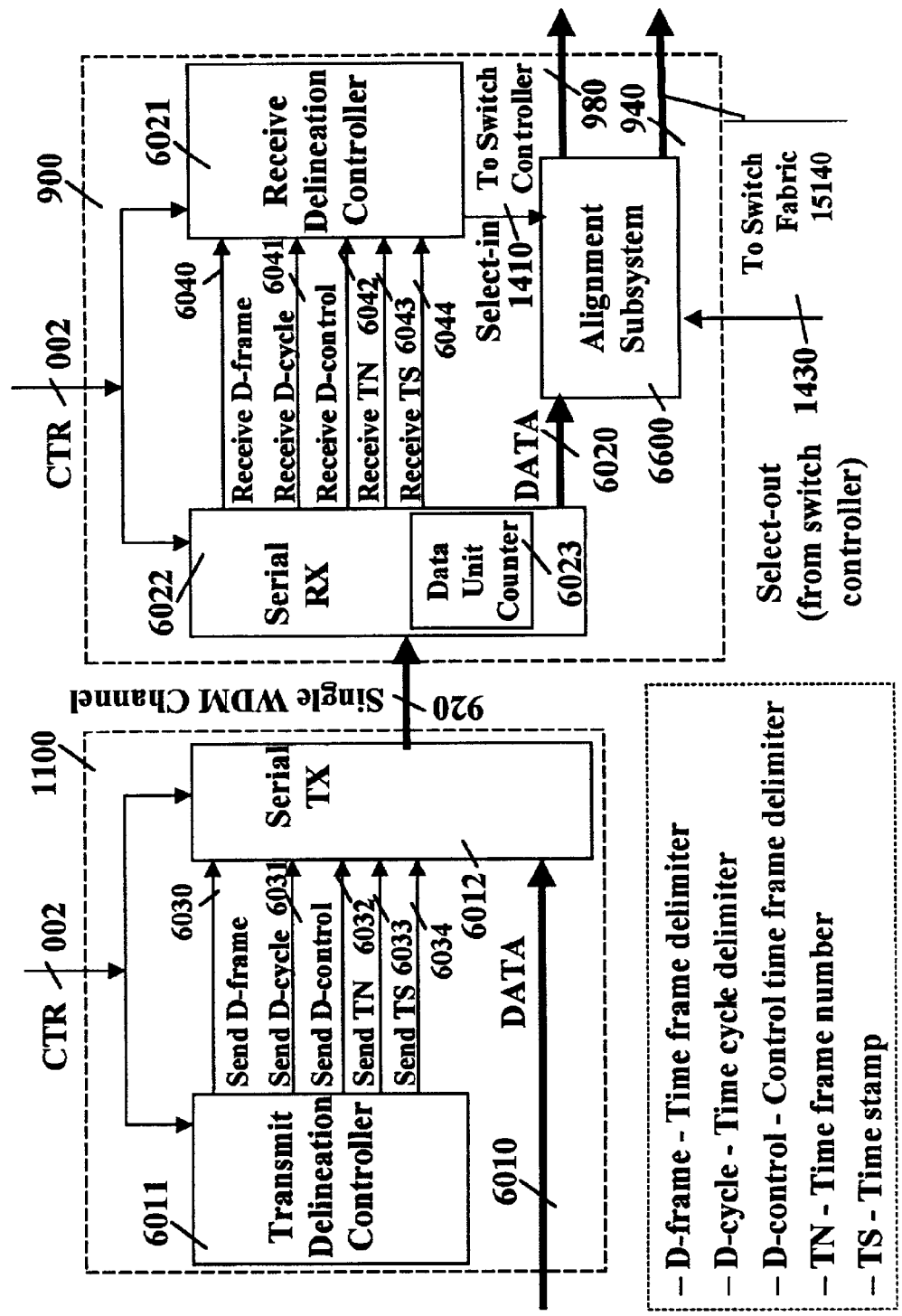
FIG. 1 shows the functional architecture of a communications system responsive to the common time reference wherein data units are associated to a specific time frame when transmitted and are associated to the same specific time frame when received.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

The present invention relates to a system and method for switching and forwarding data units over a network with optical WDM (wavelength division multiplexing) links. The switches of the network maintain a common time reference (CTR), which is obtained either from an external source (such as GPS—Global Positioning System—GLONASS, or Galileo) or is generated and distributed internally. The common time reference is used to define time intervals, which include super cycles, time cycles, time frames, sub-time frames, and other kinds of time intervals. The time intervals are arranged both in simple periodicity and complex periodicity (like seconds and minutes of a clock).

A data unit that arrives to an input port of a switch or a grooming system or a degrooming system is switched to an output port based on either arrival time information and/or specific routing information in the data unit's header (e.g., IPv4 destination address in the Internet and other IP networks, VCI/VPI labels in ATM, MPLS—multi-protocol label switching-labels). Each switch along a route from a source to a destination forwards data units in periodic time intervals that are predefined using the common time reference.

A system is provided for managing data transfer of data units from a source to a destination. The transfer of the data units is provided during a predefined time interval, comprised of a plurality of predefined time frames. The system is further comprised of a plurality of switches. A common time reference signal is coupled to each of the switches, and a time assignment controller assigns selected predefined time frames for transfer into and out from each of the respective switches responsive to the common time reference signal.

Each communications channel may use a different time frame duration generated from the common time reference signal. Data units received during at least one of a plurality of time frames over at least one of a plurality of input channels can be transmitted during a single time frame over a single output channel. Data units received during a single time frame from an input link are transmitted during at least one of a plurality of time frames over at least one of a plurality of output links.

For each switch, there is a first predefined time frame and first predefined (optical) channel within which a respective data unit is transferred into the respective switch, and a second predefined time frame and second predefined (optical) channel within which the respective data unit is forwarded out of the respective switch, wherein the first and second predefined time frames may have different durations. The time assignment provides consistent fixed time intervals between the input to and output from the fractional lambda pipe.

In a preferred embodiment, there is a predefined subset of the predefined time frames during which selected data units are transferred in the switch, and for each of the respective switches, there is a predefined subset of the predefined time frames during which the selected data units are transferred out of the switch.

For each of the data units, there is an associated time of arrival to a respective one of the input ports. The time of arrival is associated with a particular one of the predefined time frames. For each of the mappings by the routing controller, there is an associated mapping by a scheduling controller which maps each of the data units between the time of arrival and forwarding time out. The forwarding time out is associated with a specified predefined time frame.

There is a fixed time difference between the time frames for the associated time of arrival and forwarding time out for each of the data units. A predefined interval is comprised of a fixed number of contiguous time frames comprising a time cycle. Data units that are forwarded over a given fractional lambda pipe are forwarded from an output port within a predefined subset of time frames in each time cycle.

The time frames associated with a particular one of the switches within the fractional lambda pipe are associated with the same switch for all of the time cycles, and are also associated with one of input into or output from the particular respective switch.

In one embodiment of the present invention, there is a constant fixed time between the input into and output from a respective one of the switches for each of the time frames within each of the time cycles. A fixed number of contiguous time cycles comprise a super cycle, which is periodic. Data units that are forwarded over a given fractional lambda pipe are forwarded from an output port during a predefined subset of time frames in each super cycle. Furthermore, the number of data units that can be forwarded in each of the predefined subset of time frames within a super cycle for a given fractional lambda pipe is also predefined.

In the preferred embodiment, the common time reference signal is devised from the GPS (Global Positioning System), and is in accordance with the UTC (Coordinated Universal Time) standard. The UTC time signal does not have to be received directly from GPS. Such a signal can be received by using various means, such as the GLONASS system and the Galileo system, as long as the delay or time uncertainty associated with that UTC time signal does not exceed half of a time frame.

Data units can be Internet Protocol (IP) data packets, multi-protocol label switching (MPLS) data packets, Point-to-Point Protocol (PPP) frames, High-level Data Link Control (HDLC) frames, Frame Relay frames, fiber channel data units, asynchronous transfer mode (ATM) cells, or SONET/SDH frames.

In accordance with one aspect of the present invention, a system is provided for transferring data units across a data network while maintaining for reserved data traffic constant bounded jitter (or delay uncertainty) and no congestion-induced loss of data units. Such properties are essential for many multimedia applications, such as telephony and video teleconferencing.

The Common Time Reference

Figure 2:
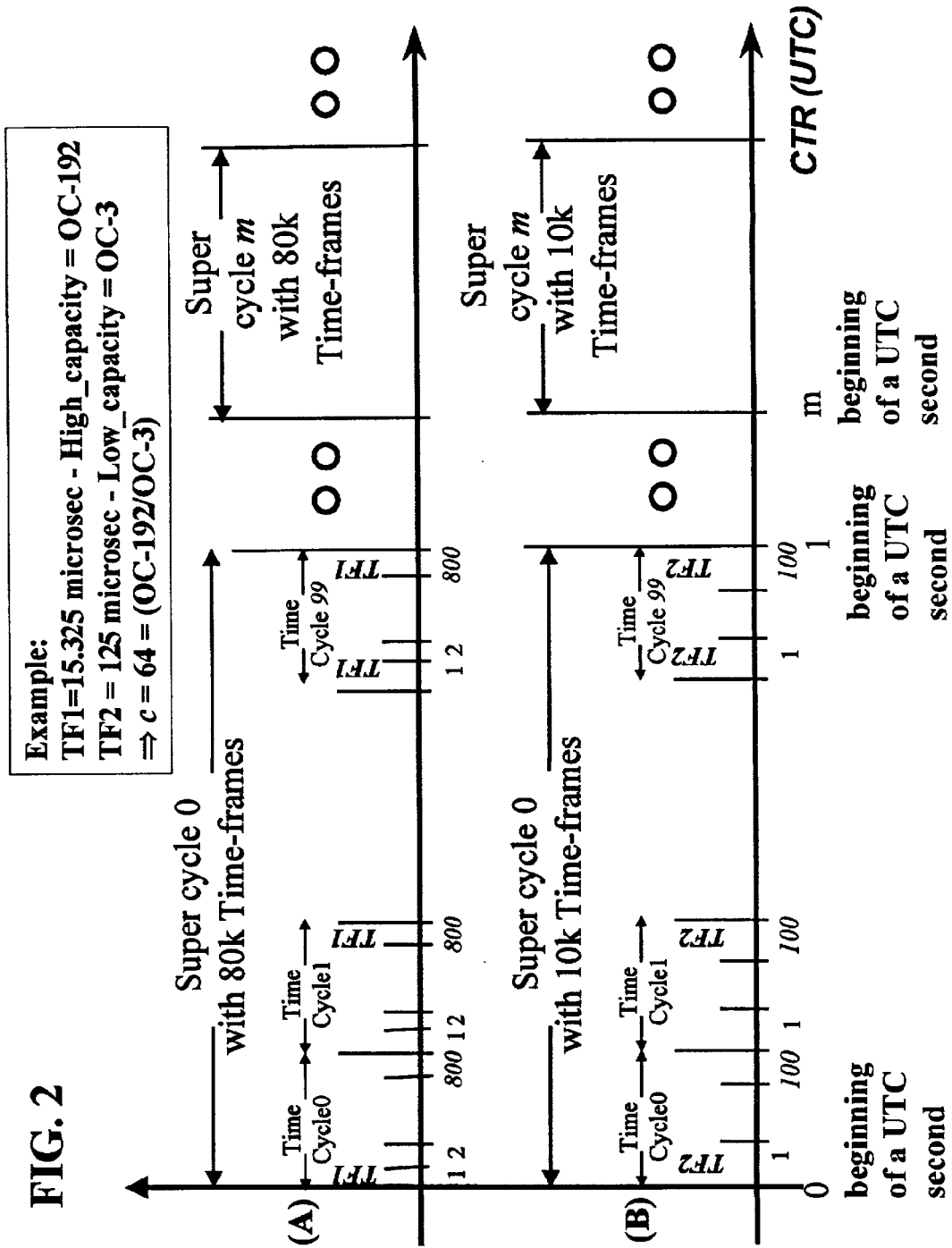
FIG. 2A contains a timing diagram of a common time reference (CTR) that is aligned with the coordinated universal time (UTC) standard, as utilized by the present invention, wherein the CTR is divided into a plurality of contiguous periodic super cycles each comprised of 100 contiguous time cycles, each contiguous time-cycle comprised of 800 contiguous time frames.
FIG. 2B contains a timing diagram of a common time reference (CTR) that is aligned with the coordinated universal time (UTC) standard, as utilized by the present invention, wherein the CTR is divided into a plurality of contiguous periodic super cycles each comprised of 100 contiguous time cycles, each contiguous time cycle comprised of 100 contiguous time frames.

FIG. 2 is an illustration of a common time reference (CTR) that is aligned to UTC. Consecutive time frames are grouped into time cycles. FIG. 2A and FIG. 2B provide examples of organization of the common time reference (CTR) according to time frames of two different durations. As shown in the example illustrated in FIG. 2A, there are 800 time frames in each time cycle, with each time frame lasting 12.5 microseconds. For illustration purposes, the time frames within a time cycle are numbered 1 through 800. According to the example shown in FIG. 2B, there are 100 time frames in each time cycle, each time frame lasting 125 microseconds. For illustration purposes, the time frames within a time cycle are numbered 1 through 100.

Time frames having different durations can be used for transmission over channels with different capacity. FIG. 2A provides an example in which 15.325 microseconds time frames are coupled with OC-192 (2.4 Gb/s) channels, while FIG. 2B exemplifies the coupling of 125 microseconds time frames with OC-3 (155 Mb/s) channels. In FIG. 2 the ratio c between the transmission speed of a high capacity channel and the transmission speed of a low capacity channel is defined. In the example in FIG. 2, c is 64.

As shown in FIG. 2, consecutive time cycles are grouped together into super cycles, and in both embodiments presented in FIG. 2A and FIG. 2B there are 100 time cycles in each super cycle. For illustration purposes, time cycles within a super cycle are numbered 0 through 99. Super cycles 0 and m are shown in FIG. 2. Time cycles of different duration can be coupled with channels that deploy time frames of different duration. Equivalently, super cycles comprised of a different number of time cycles can be coupled with different channels that deploy time frames having different durations.

FIG. 2 is illustrative of the relationship between time frames, time cycles, and super cycles; in alternate embodiments, the number of time frames within a time cycle may be different from 100 or 800, and the number of time cycles within a super cycle may be different from 100.

FIG. 2 illustrates how the common time reference signal can be aligned with the UTC (Coordinated Universal Time) standard. In this illustrated example, the duration of every super cycle is exactly one second, as measured by the UTC standard. Moreover, as shown in FIG. 2, the beginning of each super cycle coincides with the beginning of an UTC second. Consequently, when leap seconds are inserted or deleted for UTC corrections (due to changes in the earth rotation period), the cycle and super cycle periodic scheduling will not be affected. The time frames, time cycles, and super cycles are associated in the same manner with all respective network switches at all times.

In the embodiment illustrated in FIG. 2, the super cycle duration is equal to one second as measured using the UTC (Coordinated Universal Time) standard. In an alternate embodiment, the super cycle duration spans multiple UTC seconds. In another alternate embodiment, the super cycle duration is a fraction of the UTC second. In another embodiment, the super cycle duration is a small integer number of UTC seconds. A time frame may be further divided into time slots in the preferred embodiment—not illustrated in FIG. 2.

Fractional Lambda Interface

Figure 16:
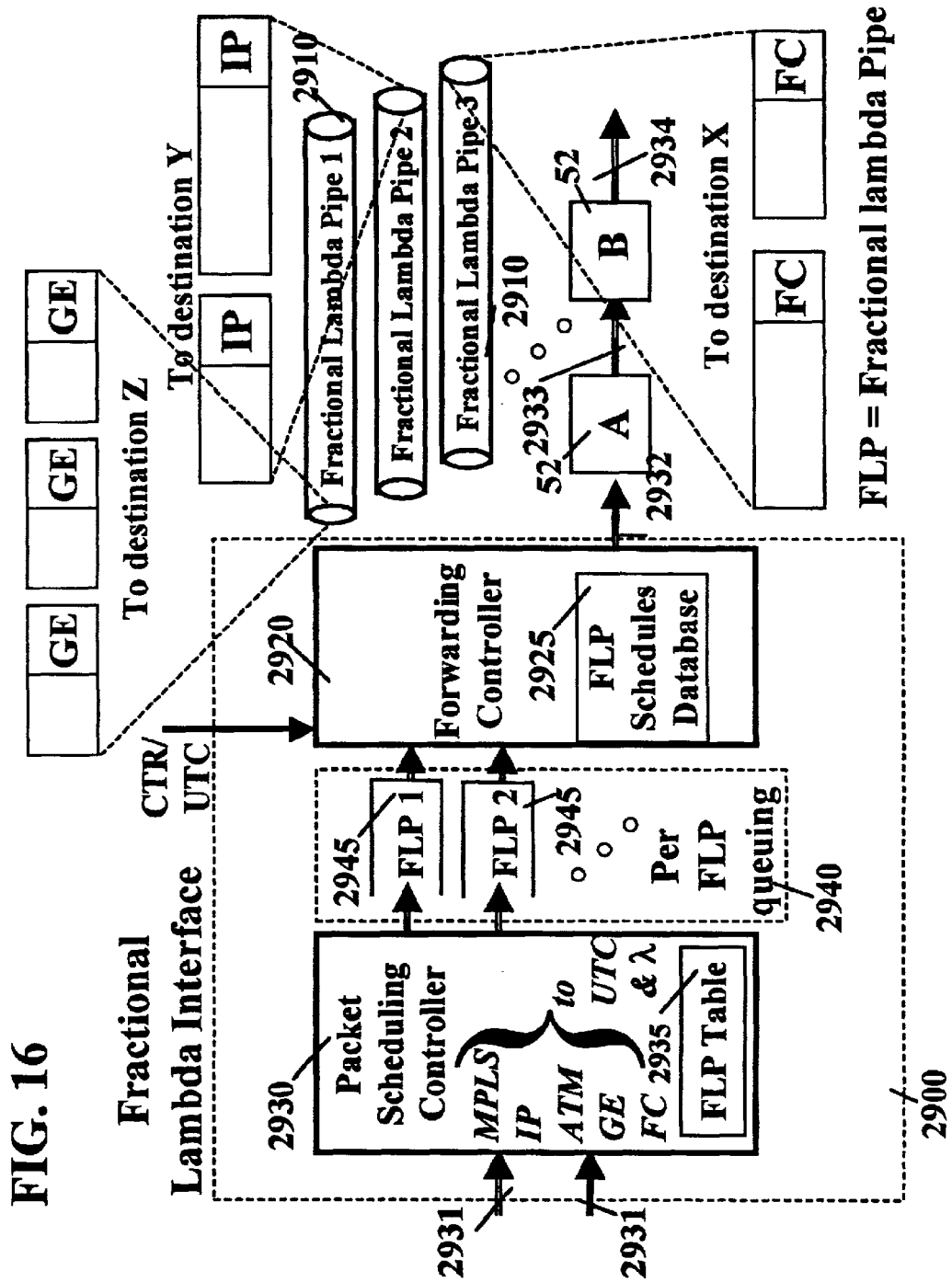
FIG. 16 is an architecture of a possible implementation of a Fractional Lambda Interface. The fractional lambda interface is installed at the ingress of a network that deploys time driven switching from networks that do not deploy time driven switching. The fractional lambda interface is responsible for mapping incoming data units on fractional lambda pipes.

FIG. 16 shows 3 Fractional Lambda Pipes (FLPs) 2910 defined across the time driven switches A and B. FLP 1 carries Gigabit Ethernet frames that have to be delivered to destination Z, FLP 2 carries IP packets to destination Y, and FLP 3 carries Fiber Channel data units to destination X. A deterministic quality of service is guaranteed by reserving resources to each FLP. In the context of time driven switching, resources are reserved to a FLP by it requiring and being granted exclusive access to an output channel during at least one of a plurality of time frames or fractions of time frames.

A Fractional Lambda Interface (2900 in FIG. 16) at the boundary of a sub-network that is not deploying time driven switching, is responsible for mapping incoming data units on fractional lambda pipes (FLPs). The mapping is based on either control information carried in the data units' header—in case of packet switching, or the data units' arrival time—in case of circuit switching.

FIG. 16 shows the block diagram of the preferred embodiment of a fractional lambda interface 2900. A Packet Scheduling Controller 2930 processes data units (for example asynchronous packets or SONET frames) arriving from at least one of a plurality of input channels 2931. Based on information contained in the packet header (such as an MPLS label, destination address in an IP packet, VCI/VPI in an ATM cell, other header fields) or time position of a SONET STS-N frame in a multiplexed STS-M frame, where M>N, the Packet Scheduling Controller 2930 identifies the fractional lambda pipe 2910 to which the data unit belongs. In a possible embodiment, the relevant header information is used, for example as a lookup key, to retrieve fractional lambda pipe information from a pre-computed table.

Once processed by the Packet Scheduling Controller 2930 in FIG. 16, data units are stored in a per fractional lambda pipe (FLP) queuing system 2940. The per FLP queuing system 2940 comprises a multiplicity of queues 2945, where each queue is associated with one fractional lambda pipe. For each data unit, the Packet Scheduling Controller 2930 in FIG. 16 uses the control information associated with the data unit as a key to an FLP table 2935 to retrieve the pointers to the queue in which the data unit should be stored. The Forwarding Controller 2920 retrieves the data units contained in a respective queue 2945 during each of the time frames reserved to the associated fractional lambda pipe 2910.

Another implementation of a fractional lambda interface could feature a per time frame queuing system that contains one queue for each time frame in the time cycle. For each data unit, the Packet Scheduling Controller 2930 in FIG. 16 uses the control information associated with the data unit as a key to a fractional lambda pipe schedules table—not shown in FIG. 16—to retrieve the pointers to the queue in which the data unit should be stored. Multiple ways exist for the Packet Scheduling Controller 2930 to choose the specific queue in which to store a data unit. One possible implementation consists in choosing the first queue that will be served, i.e., the one associated to the next time frame to come which is reserved for the fractional lambda pipe 2910 to which the data unit belongs.

At each time frame, the Forwarding Controller 2920 in FIG. 16 retrieves and forwards on the line 2932 towards a time driven switch 52 data units stored in the queue associated to the fractional lambda pipe 2910 to which the given time frame has been reserved. The current time frame is identified in accordance to the Common Time Reference 002.

At the beginning of a new time frame the Forwarding Controller 2920 in FIG. 16 may possibly change the queue 2945 from which to retrieve data units. The new queue 2945 is identified by consulting the FLP schedules database 2925, which contains among other information, the fractional lambda pipe to which each time frame had been reserved.

Each of the per-fractional lambda pipe queues 2945 can be logically organized in sub-queues. When retrieving data units from each of the queues 2945, the Forwarding Controller 2920 can apply a variety of scheduling algorithms, such as FIFO, simple priority, round robin, weighted fair queuing. Additionally, the order in which data units are retrieved from the various sub-queues (i.e., the relative priority of the sub-queues) depends on the adopted queue management policy.

Data units that happen to be remaining in a queue 2945 by the end of the associated time frame will be served in the upcoming time frames that are reserved to the fractional lambda pipe 2910 associated with the given queue 2945.

The fractional lambda interface 2900 can have multiple lower capacity input lines 2931 that are aggregated on the same higher speed output line 2932. In other words, data units are received from multiple input lines 2931, and then sorted in the queues 2945 of the same per-FLP queuing system 2940 from which the Forwarding Controller 2920 retrieves data units for transmission on the output channel 2932.

The Forwarding Controller 2920 can be comprised of a plurality of Forwarding Controllers, each one associated with at least one output channel 2932. There can be a plurality of per FLP queuing systems 2940, each per FLP queuing systems 2940 comprising at least one queue 2945, wherein each per FLP queuing systems 2940 is associated with one of the Forwarding Controllers 2920.

The Forwarding Controller 2920 in FIG. 16 can retrieve data units from more than one queue 2945 and forward them on more than one output channel 2932. In this case the FLP Schedules database 2925 provides for each time frame the FLP 2910 for which it has been reserved on each of the output channels 2932. Thus, each time frame can be reserved for no FLP (not reserved), one FLP 2910, as many FLPs 2910 as the number of output channels 2932, or a number of FLPs larger than the number of output channels 2932 in the case that more than one FLP share the same time frame on the same channel 2932.

The Fractional Lambda Interface 2900 in FIG. 16 can comprise a plurality of Forwarding Controllers 2920 each associated with at least one of a plurality of asynchronous data unit streams (packet streams) or synchronous streams (circuit switched channels).

Fractional Lambda Pipe Setup and Scheduling of Time Frames

Scheduling is performed whenever a FLP is to be created—or setup. Given the intended capacity for the fractional lambda pipe (FLP), the equivalent respective number of time frames (TFs) per time cycle is devised. Then, the scheduling algorithm described in the following is executed to identify the time frames that are to be reserved to the new FLP. The scheduling algorithm presented in the following can be executed by a centralized scheduling center for a whole fractional lambda switching network, or in a distributed fashion by the switch controllers (4110 in FIG. 41) of the time driven switches 52 involved in the setup of the FLP, i.e., the time driven switches on the path of the FLP.

The scheduling algorithm will be described in two steps. First, an algorithm for networks that do not use WDM, i.e., where each communications link features a single communication channel, is presented. The algorithm takes into account a blocking switch fabric, e.g., a Banyan interconnection network, within time driven switches (or fractional lambda switches) 52. Support for multiple channels per communication link is then described.

Single Channel Per Communication Link

Figure 43:
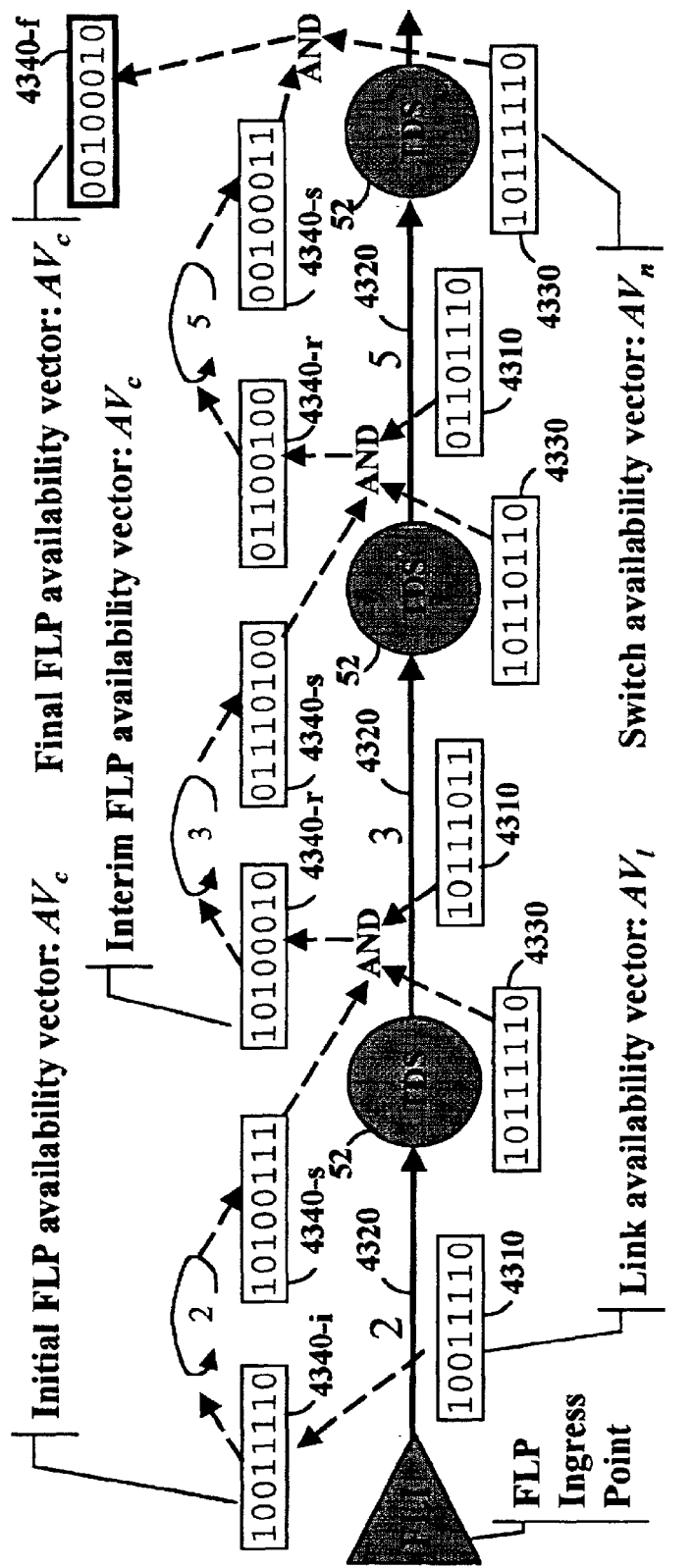
FIG. 43 shows a pictorial representation of the operation of a scheduling algorithm to be used when a single channel per link is deployed.

Scheduling and resource reservation are based on a data structure called availability vector, which has size of k bits, where k is the number of TF in each time cycle. As shown in FIG. 43, the presented scheduling algorithm deploys the following availability vectors:

A link availability vector 4310 is associated with each link 4320 of the network and contains the bit map of the TFs that have not yet been reserved on the respective link.

A switch availability vector 4330 is associated with each input/output pair of the time driven switches (TDSs) 52. It contains the bit map of the TFs during which a connection can be established between the respective input(output pair, given the existing input/output connections through the switch fabric during each TF.

The algorithm makes use of a plurality of FLP availability vector 4340. An FLP availability vector 4340-*i* is created when the algorithm is started—i.e., when the setup of an FLP begins—and it will eventually contain the bit map of the TFs that can be reserved for the FLP. Resource allocation is performed by selecting the needed number of TFs among those tagged as available in the final FLP availability vector 4340-*f* bit map.

FIG. 43 shows an example of the computation of an FLP availability vector 4340; the labels on each link 4320 represent the delay, in TFs, between (the egress of the alignment subsystems—4120 in FIG. 41—in) the time driven switches (TDSs) 52 at its ends. The FLP availability vector 4340-*i* is initialized to the link availability vector 4310 of the first link on the path of the FLP, as shown by the initial FLP availability vector 4340-*i* in FIG. 43. Then, the FLP availability vector 4340-*s* is cyclically shifted to the right a number of times equivalent to the link label. A bit-by-bit logical AND operation is performed between the shifted (interim) availability vector 4340-*s*, the availability vector of the next link 4310 on the path, and the switch availability vector 4330 of the input/output pair to which the two links are connected. The resulting bit vector 4340-*r* is shifted 4340-*s* and the whole procedure is repeated until the (final) FLP availability vector 4340-*f* is calculated at the FLP egress point, i.e., the last time driven switch 52 on the path of the FLP.

If the number of TFs tagged as available in (final) FLP availability vector 4340-*f* is greater than or equal o the equivalent respective number of time frames, the FLP is accepted, the equivalent respective number of TFs is chosen, and resources are reserved on all the links 4320 and switches 52 on the path by updating the link 4310 and switch availability 4330 vectors according to the chosen TFs. The set of chosen TFs is called a schedule.

Multiple Channels Per Communication Link

When multiple channels are available on each communication link 4420 between time driven switches 52 (and hence multiple alternative input/output connections through the switch fabric can be considered for routing an FLP), the scheduling problem solution space is much larger. In fact, when extending the scheduling algorithm described above to the multiple channel case, additional interim FLP availability vectors 4440 are generated at each node, as shown in FIG. 44, with the solution space growing accordingly.

Figure 44:
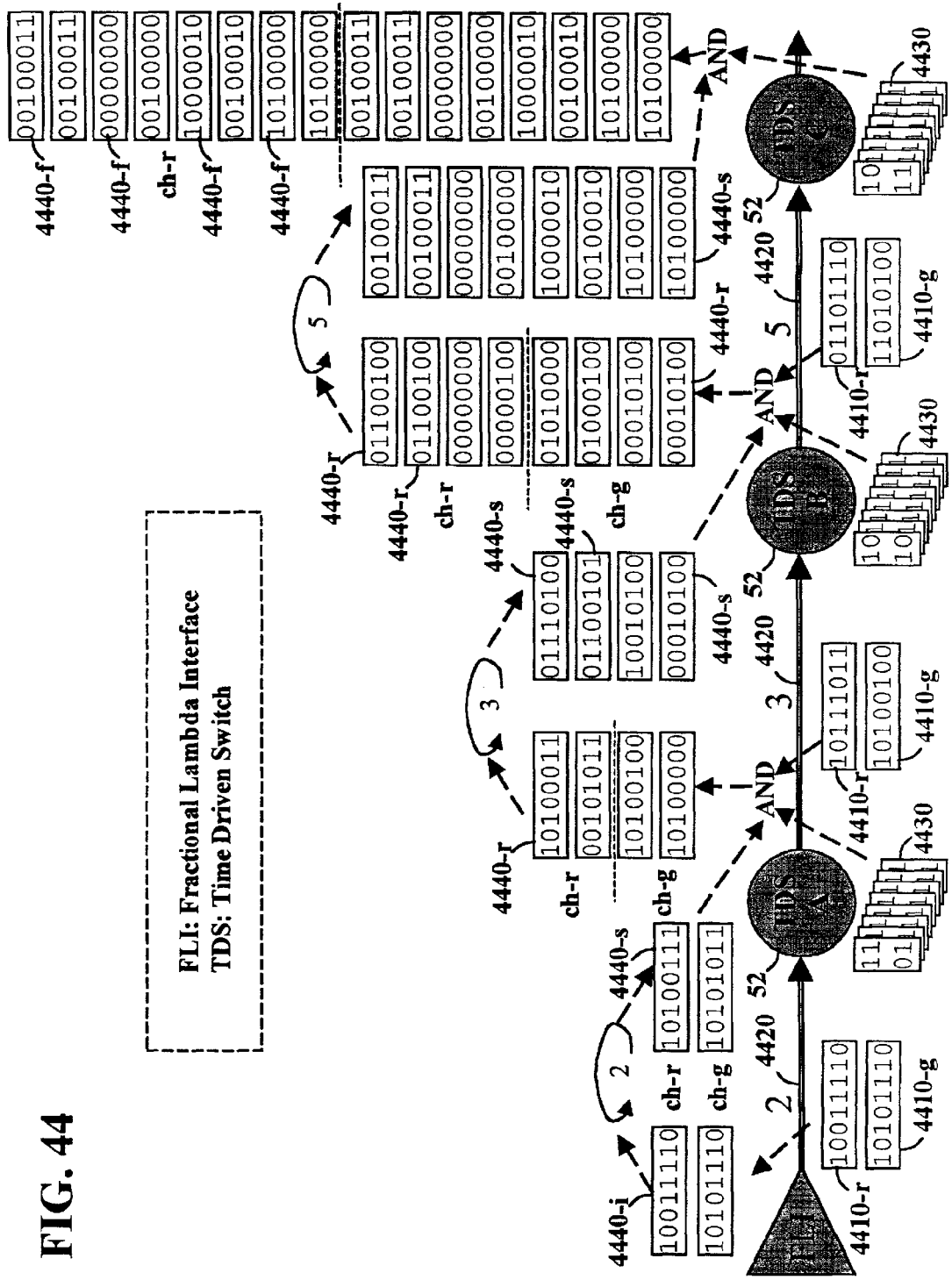
FIG. 44 shows a pictorial representation of the operation of a scheduling algorithm to be used when a multiple channels per link are deployed.

FIG. 44 shows an example of computation of a set of FLP availability vectors 4440 on a network with two optical channels ch-r and ch-g per link. Two channel availability vectors 4410-*r* and 4410-*g* are associated with each link and a three-dimensional switch availability vector 4430 is associated with each node 52. The switch availability vector 4430 has 8-by-2-by-2 a elements (bits), with each one indicating the feasibility of a specific input channel/output channel connection during a TF.

The initial set of (two) FLP availability vectors 4440-*i* is initialized to the availability vectors 4410-*r* and 4410-*g* of the two channels ch-r and ch-g on the first link 4420. At the next node, a three-operand bit-by-bit logical AND operation is performed among all the possible combinations of the following:

1. One of the shifted (interim) availability vectors 4440-*s;*
2. One channel availability vector 4410 of the next link 4420 on the path;
3. The one-dimensional switch availability vector 4430 of the switch fabric connection between the inlet and outlet connected to the selected input channel and output channel, respectively.

The above operation yields four availability vectors 4440-*r*, namely, as many as the product of the number of channels on the two links 4420. The resulting link availability vectors 4440-*r* are shifted 4440-*s* and combined with the switching 4430 and channel availability vectors 4410 at the following nodes 52 until a (final) set of 16 FLP availability vectors 4440-*f* is produced at the FLP egress point, as shown in FIG. 44.

If the number of TFs tagged as available in at least one of the (final) FLP availability vectors 4440-*f* is greater than or equal to the equivalent respective number of TFs, the FLP is accepted, an equivalent respective number of TFs is chosen based on the bit map in one of the final FLP availability vectors 4440-*f*, and resource reservation is performed on all the links 4420 and nodes 52 on the path by updating the channel availability vectors 4410 and the switch availability vectors 4430, respectively, according to the chosen TFs.

The Pipeline Forwarding (PF) Principle

Figure 3:
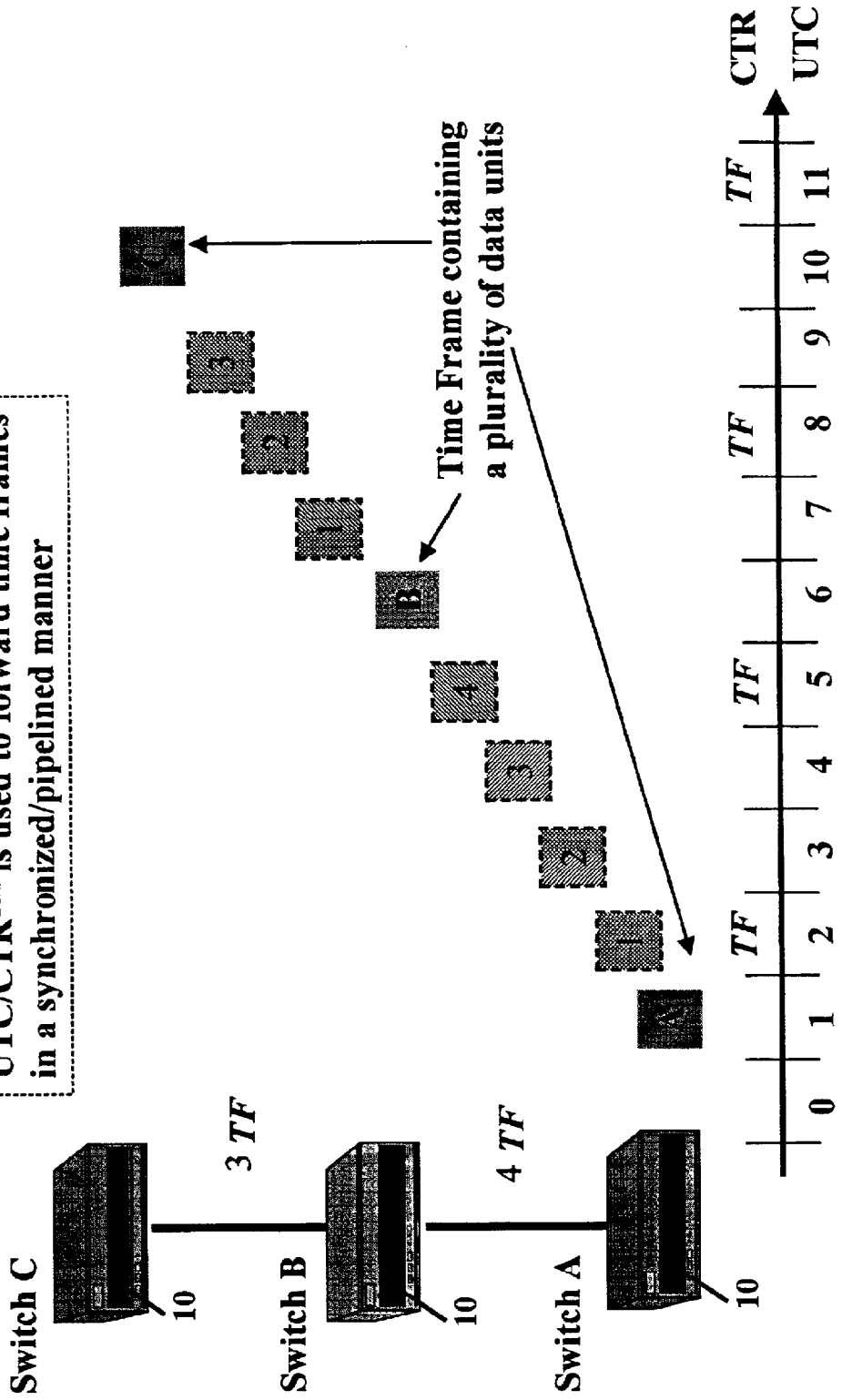
FIG. 3 shows how time frames are forwarded in a synchronized or pipelined manner responsive to UTC/CTR.

In the method shown in FIG. 3, the content of the whole time frame is switched in the same way—namely, all the data units belonging to the time frame are switched to the same output port Consequently, there is no need to use time slots. FIG. 3 shows an example of time frame (TF) switching and forwarding through a sequence of the switches: Switch A, Switch B, and Switch C. According to this specific example, the content of a TF that was forwarded from Switch A at time frame 2 will be completely received by Switch B during time frame 6, then it will be switched to its respective output and forwarded during time frame 7, and will be completely received by Switch C during time frame 9. The method of time frame switching is extremely effective in reducing the switching complexity of communications systems with a very high transmission rate (e.g., OC48, OC-192, OC-768) and/or a plurality of wavelengths (i.e., WDM channels).

The mapping between a specific time frame or sub-time frame on a specific input channel and a specific time frame or sub-time frame on an output channel is repeated cyclically, e.g., over each time cycle, over each super cycle, or a multiple thereof. The sub-time frame within the specific time frame on which an incoming time frame and input channel are mapped can be either fixed or change in each cyclical mapping. Each time frame in a time cycle or in a super cycle can have a different mapping. The same mapping can be used for more than one time frame in the same cycle or super cycle.

Time Frame Identifiers and Delimiters

Data units can be identified as belonging to different time frames and sub-time frames by means of delimiters introduced during the transmission operation, as described in more detail later in this disclosure. Data units can also be identified as belonging to different time frames and sub-time frames by means of their time of arrival or time of transmission, or by counting the amount of data received since the end of the previous time frame or sub-time frame.

The sub-time delimiter can comprise a time frame identifier implemented according to the methods described later in this disclosure. The time frame identifier identifies the sub-time frame within its time frame, or the time frame within its time cycle.

In a possible embodiment, time frame identifiers are constructed hierarchically to carry information about the time frames during which the corresponding data units were previously received by each time driven switch having performed aggregation (or grooming). Time frame and input channel information is added by each aggregating (or grooming) time driven switch, and removed by each de-aggregating (or degrooming) time driven switch.

Figure 9:
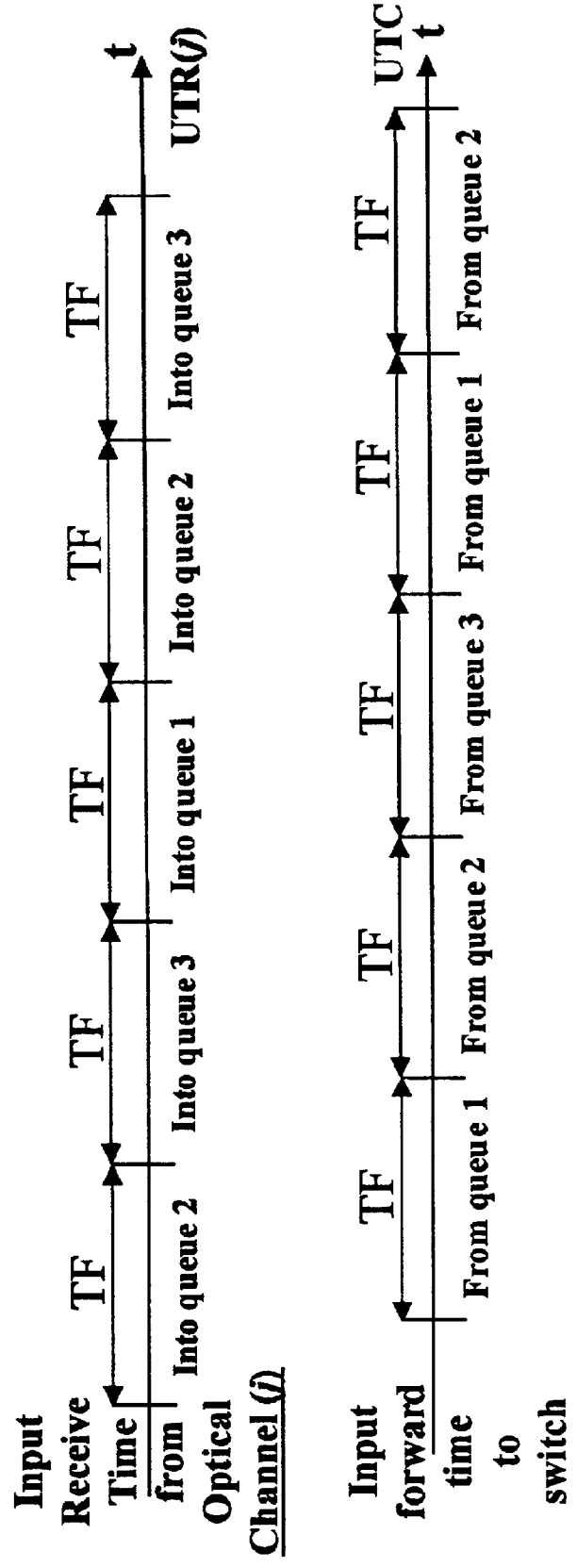
FIG. 9 is a timing diagram of the alignment subsystem operation responsive to the CTR and the serial link's unique time reference (UTR)

Given a time driven switch, each input channel (j)—possibly being an optical channel multiplexed with other channels on a single fiber—on link (i) has a unique time reference UTR(j), as shown in FIG. 9, that is independent of the CTR 002, also shown in FIG. 9. The UTR(j) is divided into super cycles, time cycles, TFs (time frames), and possibly sub-time frames of the same duration as the super cycles, time cycles, TFs, and possibly sub-time frames of the CTR used on channel (j). Each of the super cycles, time cycles, and TFs of the UTR-i possibly starts and ends at a time different than the respective start and end time of the super cycles, time cycles, and TFs of the CTR Between successive super cycles, time cycles, TFs, and sub-time frames there can be explicit or implicit delimiters. The explicit delimiters can be realized by one of the methods described later in this disclosure. There can be a different delimiter control word to signal the beginning of a new TF (i.e., a time frame delimiter—TFD), time cycle (i.e., a time cycle delimiter—TCD) and super cycle (i.e., a super cycle delimiter—SCD). The explicit delimiter signaling can be realized by the SONET/SDH path overhead field that is designed to carry control, signaling, and management information. An implicit delimiter can be obtained form the CTR signal.

Between successive super cycles, time cycles, TFs, and sub-time frames (subTFs) of the UTR-i there can be explicit or implicit delimiters. The explicit delimiters can be realized by one of several methods. There can be a different delimiter control word to signal the beginning of a new TF (i.e., a time frame delimiter—TFD), time cycle (i.e., a time cycle delimiter—TCD), and super cycle (i.e., a super cycle delimiter—SCD). The explicit delimiter signaling can be realized by the SONET/SDH path overhead field that is designed to carry control, signaling, and management information. An implicit delimiter can be realized by measuring the UTR-j time with respect to the CTR. An alternative way of implementing an implicit delimiter is by counting the number of bytes from an explicit delimiter.

Link Transmission Control with Common Time Reference

Control information can be inserted into the flow of data units on a channel between two time driven switches in order to delineate time frames and sub-time frames, i.e., in order to enable the receiver to unmistakably sort out data units that belong to the same time frame or sub-time frame. In other words, the above-mentioned control information enables the receiver to unmistakably and univocally associate each data unit with the time frame or sub-time frame during which it was transmitted. FIGS. 1 through 18(73&150) describe a system and method for inserting control information during the transmission of data units and for use of the mentioned control information while receiving the data unit flow to unmistakably and univocally associate each data unit with the time frame or sub-time frame during which it was transmitted.

FIG. 1 depicts a transmission system for coupling of data units from an output port 1100 to an input port 900 over a communications channel 920. The system receives a common time reference 002 and comprises a transmission delineation controller 6011, source of delimiter signals, responsive to the CTR 002; a transmitter 6012 responsive to the delimiter signals 6030 through 6034 and the CTR 002 for sending the control information and the data units over the communications channel 920. The system depicted in FIG. 1 further comprises a receiver 6022, responsive to the CTR 002, coupled with a delineation controller 6021, responsive to the CTR 002 and the delimiter signals 6040 through 6044, and an Alignment Subsystem 6600 used for storing the data units received from the communications channel 920 and sorting them out according the time frame or sub-time frame during which they were sent out of the output port 1100.

The system depicted in FIG. 1 further comprises a Data Unit Counter 6023 that counts the number of data units received by the receiver—responsive to the serial bit stream and the CTR. The method for counting data units is used among other things for detecting various control information, such as, the end of a time frame, the end of a time cycle, and the position and value of other control information.

Figure 17:
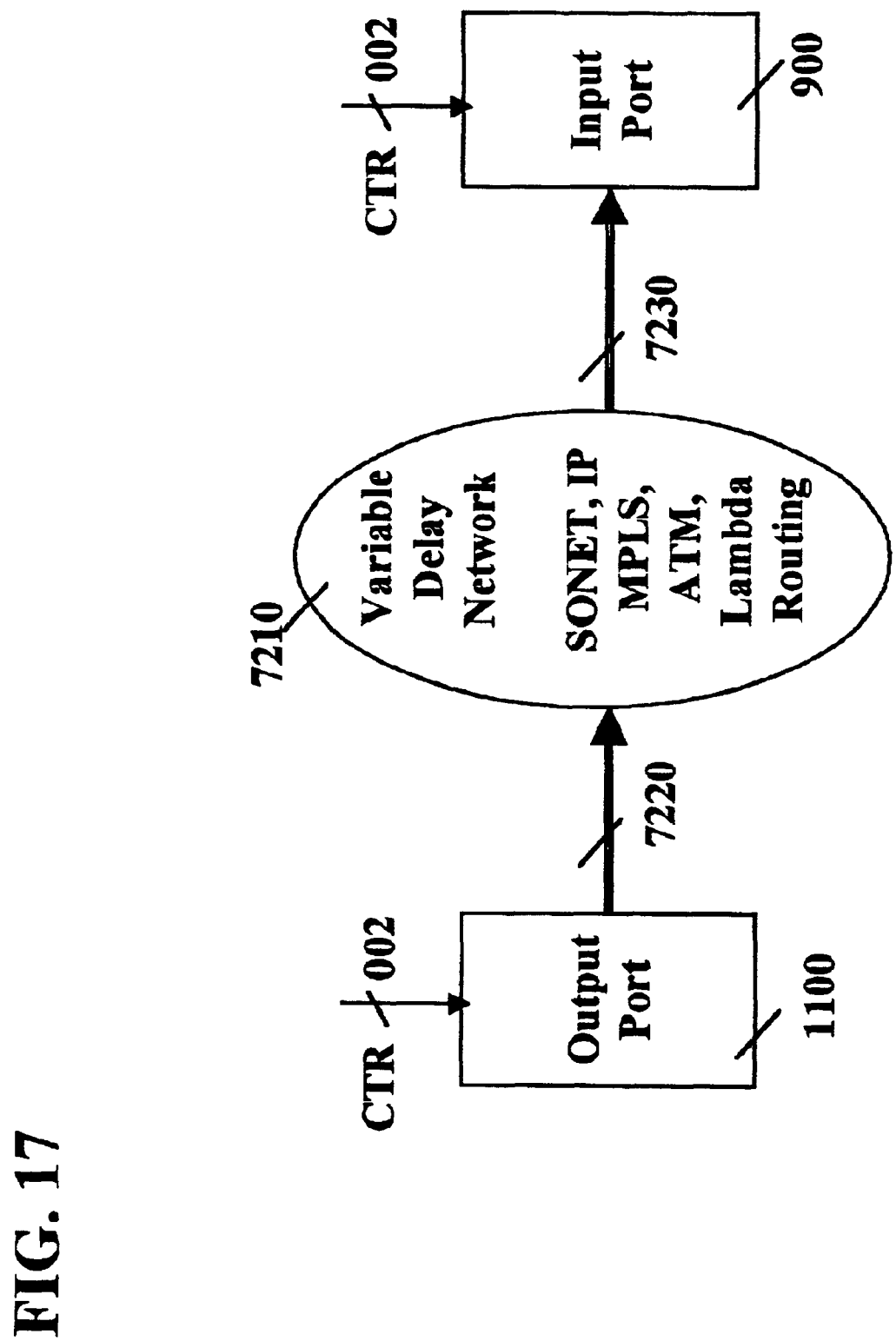
FIG. 17 shows a communications system responsive to the common time reference, wherein data units are associated to a specific time frame when transmitted across a network with variable delay, and are associated to the same specific time frame when received.

FIG. 17 shows a more general view of the same system shown in FIG. 1, wherein the communications channel 920 between the output port 1100 and the input port 900 in FIG. 1, is shown by FIG. 17 to be realized over a network 7210. The delay experienced by data units when transiting the network 7210 from the ingress point 7220 to the egress point 7230 is not constant.

Depending on the technology used to implement the network 7210 (in FIG. 17), the delay can vary on a per data unit basis, or on a longer time scale. For example, if the network 7210 is implemented using Internet Protocol (IP) or MPLS (Multi-protocol Label Switching) technology with best effort service, the delay experienced by each data unit transiting through the network 7210 can vary significantly for each data unit, depending on the traffic conditions.

If the network 7210 (in FIG. 17) is implemented using technology that can provide guarantees on the quality of the offered service, such as, for example, ATM (Asynchronous Transfer Mode), the variation of the delay experienced by each data unit can be controlled. As a result, short term variations can be smaller, while long term variations (such as those due to changes in the path on which data units travel in the network) are larger.

If the network is implemented using circuit switched technologies, such as SONET or lambda switching, delay variations are experienced only on a large time scale due to changes in the (light) path followed by data units. Other sources of delay changes can be, among other things, optical fiber temperature change, optical fiber length change as a result of its elasticity, and wavelength (lambda) specific delay. Such delay change can be corrected responsive to the CTR and various control information, such as time frame delimiters, time cycle delimiters, and time stamps. Compensating for delay changes can be done by controlling the Alignment Subsystem 6600 (shown in FIG. 1). The alignment can be adjusted with a high accuracy up to a small fraction of the time frame duration.

In connection oriented technologies, such as MPLS, ATM, SONET, and lambda switching, route changes take place only on a long time scale due to traffic engineering optimizations and failure recovery. In connection less technologies, such as IP, changes in the path followed by data units take place not only on a long time scale due to failure recovery, but also on a shorter time scale due to changes in the instantaneous load throughout the network.

In connection oriented technologies-such as MPLS, ATM, SONET, and lambda switching, the order of data units entering the network 7210 at the ingress point 7220 is preserved across the network 7210 and at the exit point 7230. In connection less technologies, such as IP, the order of data units is not preserved across the network 7210; consequently, the order of data units transmitted on the ingress link 7220 can be different from the order that data units have when received from the egress link 7230 (in FIG. 17). The fact that order is not preserved can result in the incorrect assignment of data units into time frame when they are received.

The common time reference (CTR), illustrated in FIG. 2, is aligned to UTC. Consecutive time frames are grouped into time cycles. FIG. 2A and FIG. 2B provide examples of a common time reference (CTR) organized according to time frames of two different durations. In the example shown in FIG. 2A, there are 800 time frames in each time cycle, each time frame lasting 12.5 microseconds. For illustration purposes, the time frames within a time cycle are numbered 1 through 800. According to the example shown in FIG. 2B, there are 100 time frames in each time cycle, with each time frame lasting 125 microseconds. For illustration purposes, the time frames within a time cycle are numbered 1 through 100.

Time frames having different durations can be used for transmission over channels with different capacities. FIG. 2A provides an example in which 15.325 microseconds time frames are coupled with OC-192 (2.4 Gb/s) channels, while FIG. 2B exemplifies the coupling of 125 microseconds time frames with OC-3 (155 Mb/s) channels.

In FIG. 1, the Transmit Delineation Controller 6011, responsive to the CTR 002, generates delimiter signals 6030 through 6034 that indicate to the serial transmitter (TX) 6012 to insert control information in the data flow.

The serial transmitter (TX) 6012 receives data units over line 6010 and transmits them on the communications channel 920. Upon reception of a Send D-frame signal 6030, the serial transmitter 6012 combines the data units to be transmitted on the communications channel 920 with a time frame delimiter, according to one of the plurality of methods described in the following of this disclosure.

Upon reception of a Send D-cycle signal 6031, the serial transmitter 6012 combines the data units to be transmitted on the communications channel 920 with a time cycle delimiter, according to one of the plurality of methods described in the following of this disclosure.

Upon reception of a Send D-control signal 6032, the serial transmitter 6012 combines the data units to be transmitted on the communications channel 920 with a control time frame delimiter, according to one of the plurality of methods described in the following of this disclosure.

Upon reception of a Send time frame number (TN) signal 6033, the serial transmitter 6012 includes in the flow of data units to be transmitted on the communications channel 920 the number of the current time frame during which the data units are being transmitted, according to one of the plurality of methods described in the following of this disclosure.

Upon reception of a Send time stamp (TS) signal 6034, the serial transmitter 6012 includes in the flow of data units to be transmitted on the communications channel 920 a time stamp derived from the common time reference 002. The time stamp is transmitted according to one of the plurality of methods described in the following of this disclosure.

The transmit delineation controller 6011 generates each delimiter signal 6030 through 6034 according to one of a plurality of possible policies. For example, a Send D-frame signal 6030 can be generated at the beginning of each time frame and a send TS signal 6034 can be generated every other time frame. Different policies will provide the system with different levels of robustness, resiliency to fault, and fault recovery time.

In general a time frame delimiter D-frame is used to signal the beginning of a new time frame or sub-time frame. In other words, in a possible embodiment the data units preceding the time frame delimiter D-frame belong to a previous time frame different from the one to which the data units following the time frame delimiter D-frame belong.

A time cycle delimiter D-cyde identifies the beginning of a new time cycle. In other words, in a possible embodiment the data units preceding the time cycle delimiter D-cycle belong to a first time frame of a previous time cycle different from the one of the time frame to which the data units following the time cycle delimiter D-cyde belong.

Figure 19:
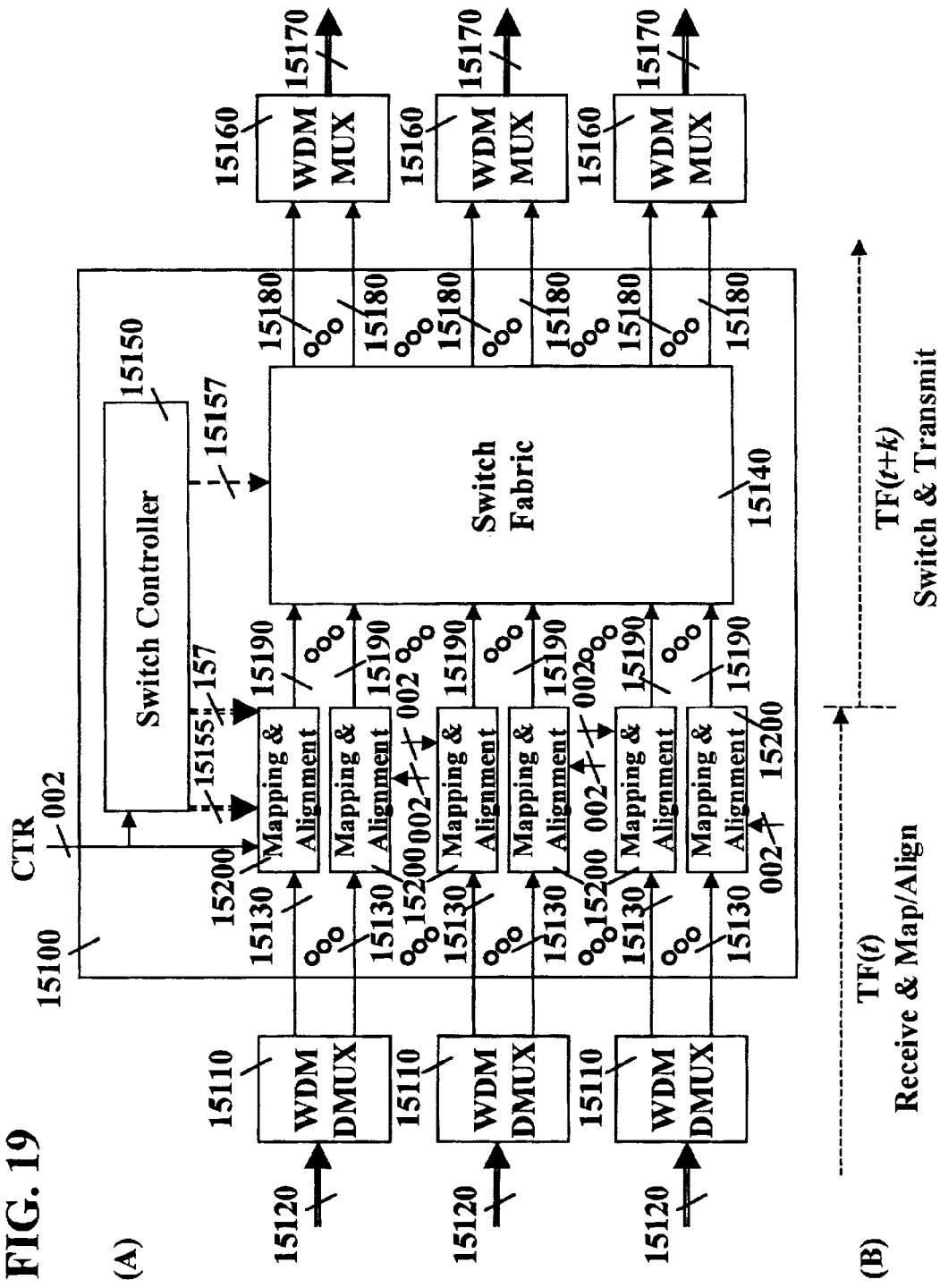
FIG. 19A is an architecture of a time driven switch capable of switching labeled time frames responsive to at least one of the CTR and time frame label, encompassing a switch controller, a plurality of mapping & alignment subsystems, and a switch fabric, wherein the switch's inputs and outputs are wavelength division multiplexed on a plurality of optical communications links.
FIG. 19B is a pictorial representation of the 2 phase forwarding principle.

A control time frame delimiter D-control identifies the beginning of a control time frame that contains control data. In other words, in a possible embodiment the data units preceding the control time frame delimiter D-control belong to a first time frame, while the data units following the control time frame delimiter D-control are known as control data and are to be delivered to the switch controller. Control data can be used, among other purposes, to configure the switch fabric, to perform Operation, Administration, and Management (OAM) operations on the switching system, and to perform signaling (for example: create, close, or modify a fractional lambda pipe). Thus, the data units received during a control time frame are not switched to an output port 1100, but delivered to the switch controller 15150 (in FIG. 19A).

A time frame number TN is the number that identifies the time frame during which said time frame number TN delimiter signal is transmitted. Associating this information with a time frame, among other things, enables the receiver to verify that the channel 920 is operating correctly. For example, by comparing the transmitted time frame number TN with the expected one, the receiver can realize if the communications channel 920 has been temporarily interrupted or if the delay across the channel has changed. This can be useful, for example, when the communications channel 920 is realized over a SONET ring and an automatic reconfiguration of the ring takes place due to the failure of one of its physical links.

The time stamp TS is the value of the CTR at the time in which the control information TS is transmitted. Associating this control information with a time frame allows the receiver to calculate the propagation delay of data units through the communications channel 920. Thus, the time helps the receiver to verify if the channel 920 is operating correctly. For example, after the propagation delay through the communications channel 920 has been devised, by comparing the transmitted time stamp TS with the expected one, the receiver can realize if the communications channel 920 has been temporarily interrupted or if the delay across the channel has changed. This can be useful for example, when the communications channel 920 is realized over a SONET ring and an automatic reconfiguration of the ring takes place due to the failure of one of its physical links.

Upon receiving the data stream, the serial receiver (RX) 6022 in FIG. 1 on the receiving side of the communications channel 920 separates data units from control information. The serial receiver (RX) 6022 outputs the received data units on the data line 6020 and notifies the receive delineation controller 6021 of the received control information via the delimiter signal 6040 through 6044.

Whenever the serial receiver 6022 receives a time frame delimiter D-frame inserted within the flow of data units as described in the following of this disclosure, the receive delineation controller 6021 is notified over the line Receive D-frame 6040 shown in FIG. 1.

Whenever the serial receiver 6022 receives a time cycle delimiter D-cycle inserted within the flow of data units as described in the following of this disclosure, the receive delineation controller 6021 is notified over line Receive D-cycle 6041 shown in FIG. 1.

Whenever the serial receiver 6022 receives a control time frame delimiter D-control inserted within the flow of data units as described in the following of this disclosure, the receive delineation controller 6021 is notified over the line Receive D-control 6042 shown in FIG. 1.

Whenever the serial receiver 6022 receives a time frame number TN within the flow of data units as described in the following of this disclosure, the receive delineation controller 6021 receives the number of the current time frame over the line Receive IN 6043 shown in FIG. 1.

Whenever the serial receiver 6022 receives a time stamp TS within the flow of data units as described in the following of this disclosure, the receive delineation controller 6021 receives the value of the mentioned time stamp over the line Receive TS 6044 shown in FIG. 1.

Using the delimiter signals received from lines 6040 through 6044, the receive delineation controller 6021 generates the Select-in signal 1410 for the alignment subsystem 6600, as shown in FIG. 1. As it will be described in the following of this disclosure, the Select-in signal 1410 enables the alignment subsystem 6600 to determine which data units should be stored together because belonging to the same time frame or sub-time frame.

Figure 10:
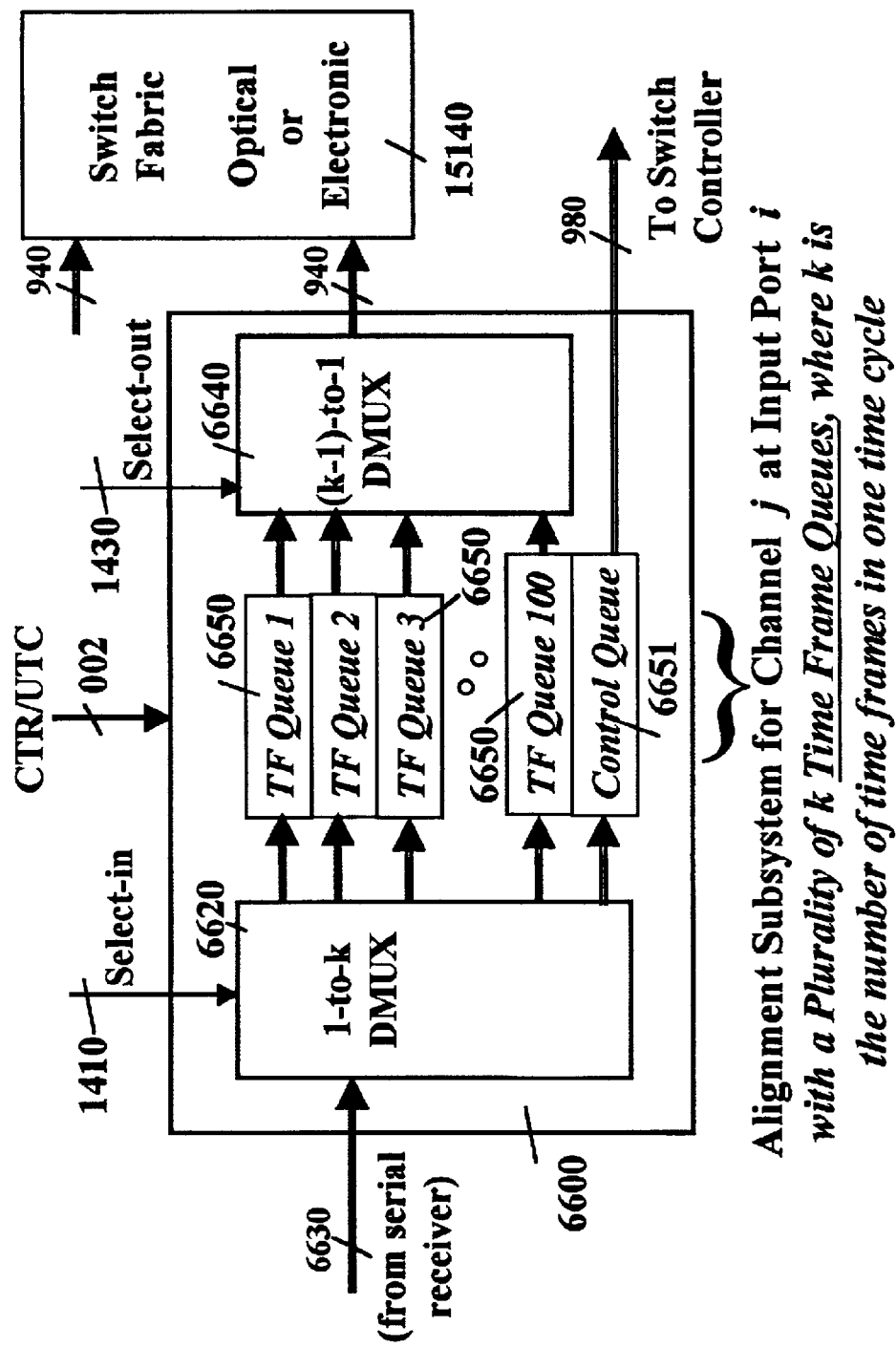
FIG. 10 is the block diagram of an alignment subsystem comprising a plurality of queues, wherein incoming data units are always stored in a queue different from the one from which output data units are retrieved.

The alignment subsystem 6600, in FIG. 10, receives data units over the data line 6020 from the serial receiver 6022, as shown in FIG. 1. The data units that exit from the alignment subsystem 6600 are transferred to the switch fabric 15140 (in FIG. 19A) over its input lines 940. The control data, namely the data units transmitted over the communications channel 920 during a control time frame, are transferred to the switch controller through line 980.

The output port 1100 in the communications system depicted in FIG. 1 clusters transmitted data units in time frames responsive to the common time reference 002. The input port 900 receives data units organized according to a Unique Time Reference (UTR). The UTR is divided into super cycles, time cycles, TFs (time frames), possibly sub-time frames of the same duration as the super cycles, time cycles, TFs, and possibly sub-time frames, respectively, of the CTR used on the communications channel 920 (for example as shown in FIG. 2). Each of the super cycles, time cycles, and TFs of the (UTR-i—UTR on optical channel i) possibly starts and ends at a time different than the respective start and end time of the super cycles, time cycles, and TFs of the CTR.

Control information transmitted on the communications channel 920, such as time frame delimiters D-frame, control time frame delimiters D-control, time cycle delimiters D-cycle, time frame numbers TN, and time stamps TS together with implicit information—such as the duration or size of time frames and time cycles—enable the receive delineation controller 6021 depicted in FIG. 1 to identify the UTR and to generate the Select-in signal 1410 accordingly.

The alignment subsystem 6600 in FIG. 10 comprises a plurality of queue buffers 6650-6651 that are used to store data units belonging to different time frames or sub-time frames. The implementation shown in FIG. 10 comprises 100 time frame queues 6650, where each queue is intended to contain data units belonging to the same time frame; a queue 6651 for data units belonging to the control time frame.

The receive delineation controller 6021 (see FIG. 1) logically maps, for each of the UTR TFs, incoming data units received through the communications channels 920 to selected buffer queues 6650 and 6651. Concurrently, the switch controller 15150 (see FIG. 19A) logically maps, for each of the CTR TFs, selected ones of the plurality of buffer queues 6650 and 6651 to the data line 940 connected to the switch fabric 15140.

The Select-in signal 1410 determines which of the buffers 6650 and 6651 in FIG. 10 will receive data units from the communications channel 920 (see FIG. 1) at every time frame as it is defined by the UTR. The Select-in signal 1410 is fed into a 1-to-k DMUX (de-multiplexer) 6620 that selects one of k queue buffers 6650 and 6651. In the sample implementation shown in FIG. 10 k=101. For each time frame, the buffer queues 6650 and 6651 in the alignment subsystem 6600 can be filled to an arbitrary level with data units in arbitrary order, prior to output.

The switch controller 15150 (see FIG. 19A) further provides for the coupling of selected ones of the time frame queues 6650 with the outgoing data line 940, shown in FIG. 1, for transfer of the respective stored data units during the respective CTR time frames (or CTR sub-time frames in alternative implementations). This operation is performed responsive to the Select-out signal 1430, as shown in FIG. 10.

For each of the TFs of the CTR, only one of the buffer queues 6650 in FIG. 10 is associated with the outgoing line 940. For each of the TFs of the UTR, only one of the buffer queues 6650 and 6651 is associated with the communications channel 920 (see FIG. 1). The same buffer queue 6650 is never associated at the same time with both the incoming communications channel 920 and the outgoing data line 940 coupled to the switch fabric 15140.

In an alternative implementation, for each of the subTFs of the CTR, only one of the buffer queues 6650 is associated with the outgoing line 940. For each of the subTFs of the UTR, only one of the buffer queues 6650 and 6651 in FIG. 10 is associated with the communications channel 920. The same buffer queue 6650 is never associated at the same time with both the incoming communications channel 920 and the outgoing data line 940 to the switch fabric 15140 (in FIG. 19A).

A timing diagram description of the alignment operation is provided in FIG. 9. The alignment operation follows the following principle:

TF Alignment of UTR to UTC (with three input queues) principle of operation: The same queue is not used simultaneously for:
1. Receiving data units from the serial link—responsive to the Select-in signal 1410 received from the receive delineation controller 6021 (shown in FIG>1), and
2. Forwarding data units to the switch fabric 15140— responsive to the Select-out signal 1430 received from the switch fabric controller 15150 (shown in FIG. 19A).

In the timing diagram example of FIG. 9, it is shown that a TF queue (TF Queue 1, TF Queue 2, . . . TF Queue 100 6650 and Control Queue 6651) is never written into and read from at the same time. In other words, the Select-in signal 1410 and the Select-out signal 1430 will not select the same TF queue 6650 (see FIG. 10) at the same time.

In an alternative embodiment, the alignment subsystem 6600 comprises an optical delay line. The delay line between the input communications channel 920 and the alignment subsystem ensures that the UTR is aligned with the CTR In other words, the time a data unit takes to travel from the alignment subsystem 6600 of an upstream time driven switch 15100 to the alignment subsystem 6600 of a downstream time driven switch 15100 (including the propagation delay through the switch fabric 15140, the communications channel 920 connecting the two switches, and the optical delay line) is an integer multiple of a TF. In order to achieve this communication time the delay element adds a link delay equal to the difference between a beginning of the CTR time frame and the beginning of a UTR time frame, where the time frame duration is the one deployed on the communications channel 920.

Figure 42:
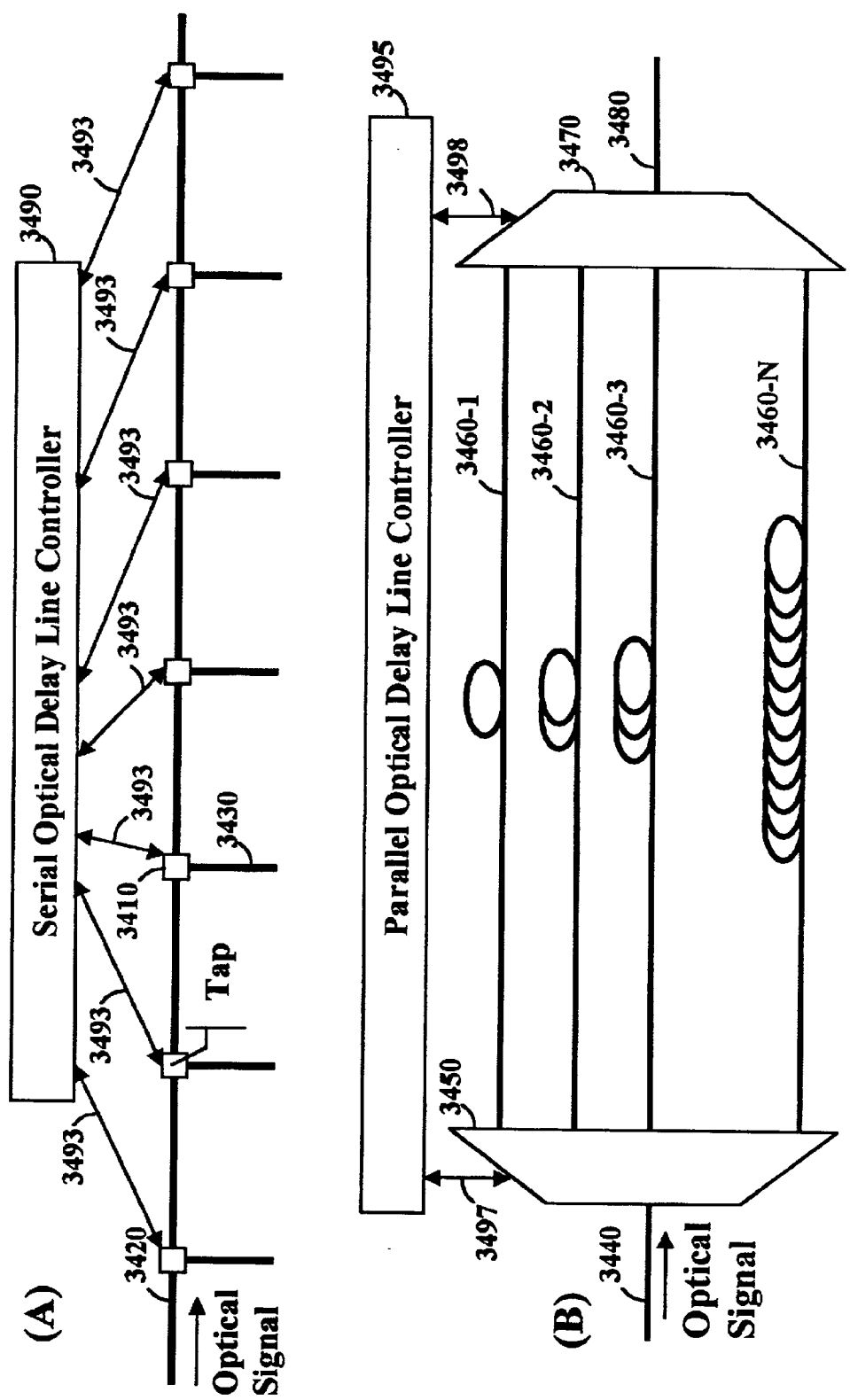
FIG. 42A shows a possible implementation of a serial optical delay line with multiple tap points.
FIG. 42B shows a possible architecture of a fiber delay line realized as a parallel optical delay line, comprising a plurality of fibers of different length.

The optical delay line can have programmable tap points possibly comprised of optical switches (serial optical delay line—shown in FIG. 42A), or be realized as a fiber delay line comprising a plurality of fibers of different length (parallel optical delay line—shown in FIG. 42B). The optical delay line can be external to the switch, internal, or integrated in the serial receiver 6012 (shown in FIG. 1).

The architecture of a linear delay line, a.k.a. serial optical delay line, is shown in FIG. 42A. A plurality of taps 3410 are inserted at predefined intervals onto an optical fiber 3420. The tap 3410 is an optical switch that can let an optical signal pass through along the fiber 3420 or switch it out 3430. In order to better understand how a linear delay line works and the role of time, let us observe a data unit that was injected into the fiber 3420 at time t=0. In order to fetch this data unit at any later time the fiber should be filled with infinite number of taps 3410. Obviously, this is not feasible. In a possible realization taps 3410 are placed in regular intervals that are equally spaced in time. Let us call this time interval T. Consequently, a data unit that was injected into the fiber at time t=0 can be fetched from the fiber at times: t=1·T, 2·T, 3·T, etc. A serial optical delay line controller 3490 configures the taps 3410 through its bi-directional control lines 3493, responsive to the amount of time data units are to spend inside the optical delay line. The serial optical delay line controller 3490 receives control and status information from the taps 3410 through its bi-directional control lines 3493.

The architecture of a parallel optical delay line, more widely known as fiber delay line (FDL), is shown in FIG. 42B. Fibers 3460 of different lengths are deployed to delay data units for different amounts of time. The delay experienced by data units in a parallel optical delay line has predefined granularity depending on the length difference between the fibers 3460. The number of parallel fibers 3460 needed to realize a parallel optical delay line depends on the granularity and maximum storage time required. In a possible realization the length difference between fibers 3460 is constant such that the first fiber 3460-1 delays by 1·T, the second fiber 3460-2 delays by 2·T, the third fiber 3460-3 delays by 3·T, and so on. The optical signal injected in the parallel optical delay line through the input 3440 shown in FIG. 42B is split by an optical splitter 3450 over the plurality fibers 3460. Only one of the optical signals exiting the plurality of fibers 3460 is selected by an optical selector 3470 for emission on the output 3480 of the optical parallel delay line. The optical selector 3470 can be implemented by at least one of: a plurality of optical gates and an optical star, a plurality of optical gates and an optical multiplexer, an N-by-1 optical switch. A parallel optical delay line controller 3495 configures the optical splitter 3450 and the optical selector 3470 through bi-directional control lines 3497 and 3498, respectively, responsive to the amount of time data units are to spend inside the optical delay line. The parallel optical delay line controller 3495 receives control and status information from the optical splitter 3450 and the optical selector 3470 through the bi-directional control lines 3497 and 3498, respectively.

Figure 4:
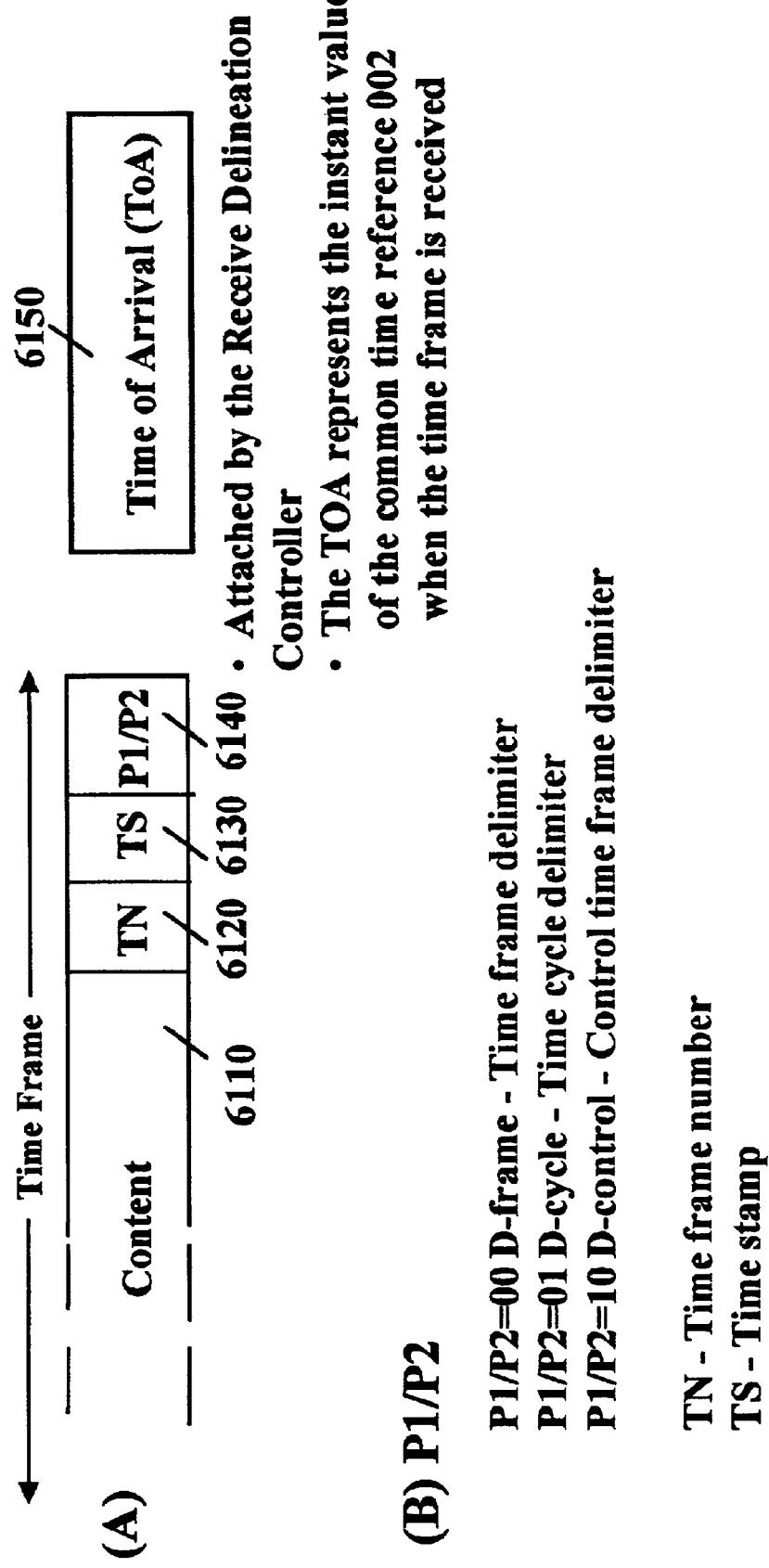
FIG. 4A provides a pictorial representation of a time frame comprising some control information transmitted to delineate and uniquely identify the time frame.
FIG. 4B lists a possible set of values for the control information used for delineation and control of the transmission of time frames.
Figure 5:
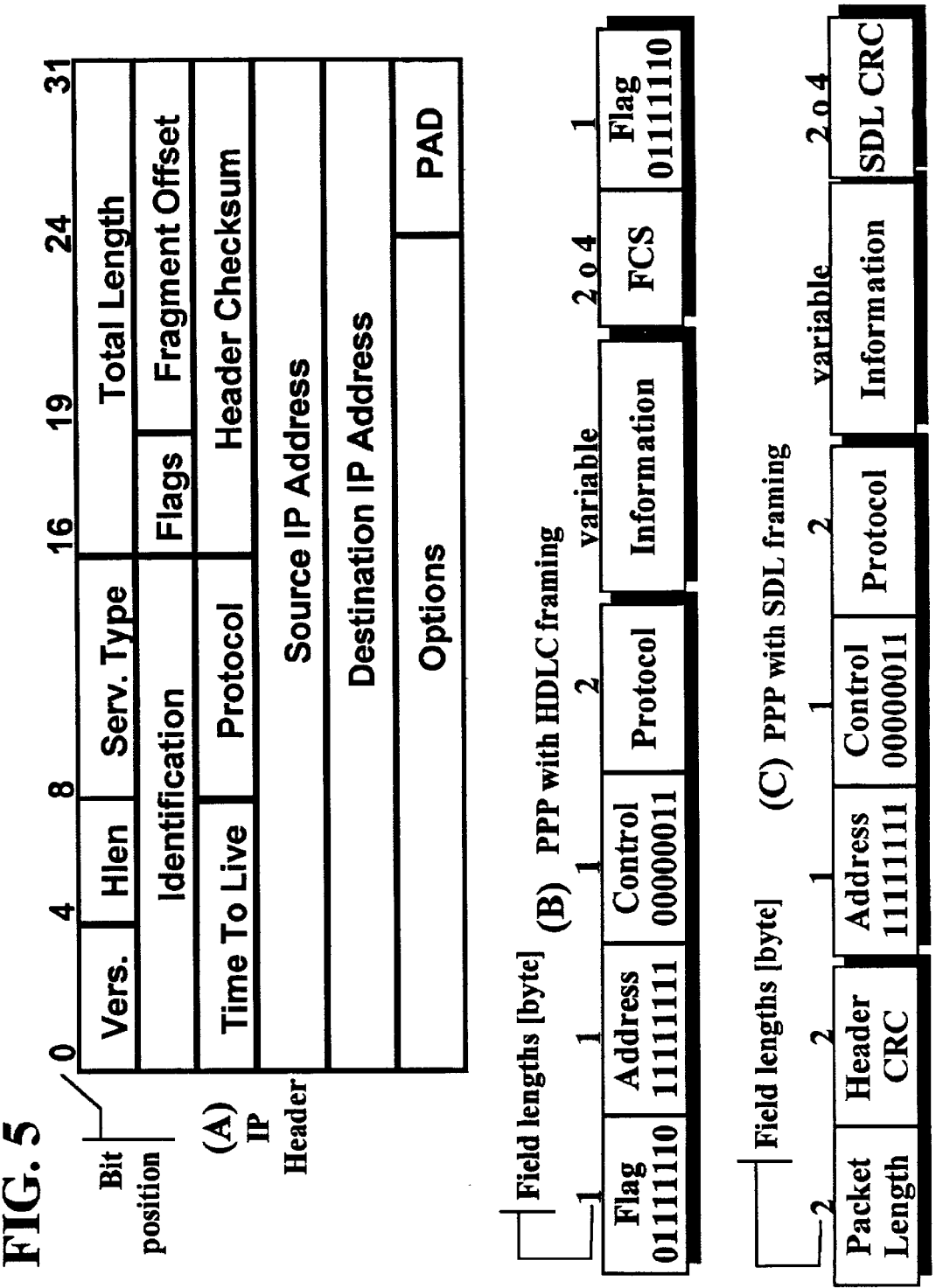
FIG. 5A depicts the structure of an IP (Internet Protocol) packet.
FIG. 5B shows the structure of a PPP (Point-to-Point Protocol) frame with HDLC (High-level Data Link Control) framing.
FIG. 5C depicts a PPP packet with SDL (Simple Data Link) framing.

In general, as depicted for example in FIG. 4, various pieces of control information can be associated with each time frame. Together with the actual content 6110, one or more of the following can be transmitted for at least a selected one of a plurality of time frames within each time cycle or super cycle: a time frame number TN 6120, a time stamp TS 6130, and a delimiter 6140, wherein the delimiter can be one of a time frame delimiter D-frame, time cycle delimiter D-cycle, or control time frame delimiter D-control. Alternative implementations include the transmission of other kinds of control information. FIG. 4B shows a possible encoding for the three kinds of delimiters listed above. The proposed encoding is based on a 2-bit field.

As shown in FIG. 18A, the control information associated with a time frame 15060 can be transmitted in the form of at least one of a header control information 15010 and trailer control information 15020. As shown in FIG. 18C, in a possible embodiment a safety gap 15070 can be introduced between the transmitted data units and control information (at least one of header control information 15010 and trailer control information 15020) belonging to consecutive time frames 15060-1 and 15060-2.

In a possible embodiment, the safety gap 15070 begins after the end of the trailer control information 15020-1 of a first time frame 15060-1 and ends before the beginning of the header control information 15010-2 of a second time frame 15060-2, wherein the second time frame 15060-2 immediately follows the first time frame 15060-1.

The safety gap 15070 is useful in separating the data units and control information pertaining to different time frames transmitted (and received) on the same channel. Moreover, in a possible implementation a time driven switch changes the configuration of its switch fabric during the safety gap. As an example, the safety gap is extremely useful for the operation of optical time driven switches deploying an all-optical switch fabric because all optical switch fabrics have typically longer reconfiguration times than electronic switch fabrics.

A possible embodiment of an all-optical time driven switch takes advantage of the safety gap by using it to switch the content of subsequent time frames without having to process the control information received in the header control information 15010 or in the trailer control information 15020 fields. In a possible implementation neither the header control information 15010 nor the trailer control information 15020 are present.

Processing of the control information 6120 through 6140 associated with a time frame, as shown in FIG. 4A, together with the time of arrival (ToA) 6150 of the time frame—namely the time, with reference to the CTR 002, at which the time frame was received at the input port—enables the identification and recovery of communications channels failures and propagation delay changes. The control information 6120 through 6140 is attached to the time frames by the Transmit Delineation Controller 6011 of the output port 1100 at the transmitting end of a communications channel, as shown in FIG. 1. The ToA 6150 in FIG. 4A is determined by the Receive Delineation Controller 6021 in FIG. 1 that is also in charge of processing the received control information 6120 through 6140 in FIG. 4A.

The following of this disclosure describes a plurality of methods for embedding control information aimed at time frame delineation within the data flow transmitted on a communications channel. The following description is provided as an example and is not meant to be exhaustive since other methods can be deployed alternatively or in conjunction with the presented ones.

The control information can be inserted in the flow of data units at one of a plurality of layers, as defined by the OSI (Open System Interconnection) protocol reference model or other protocol architecture. A first possible implementation comprises embedding control information at the network layer, namely, such that the control information is embedded in the header of a network layer packet or in the payload of a flagged data packet.

FIG. 5A shows the structure of an IP (Internet Protocol) packet header. A possible implementation for transmitting control information over a communication channel consists in embedding such information in the IP header of packets being transmitted on the channel. For example, a possible implementation uses newly defined Options to carry at least one of a time frame delimiter D-frame, a control time frame delimiter D-control, a time cycle delimiter D-cycle, a time frame number TN, and a time stamp TS. Alternative implementations use the three fields Identification, Flags, and Fragment Offset to carry control information, while avoiding that packet fragmentation be necessary. In fact, the fields Identification, Flags, and Fragment Offset are used to handle fragmentation of IP packets along their path towards the destination.

The control information can be included in at least one of the first packet and the last packet transmitted during the time frame with which the information is to be associated. Alternatively, a service IP "empty" packet can be sent explicitly to carry the control information. The packet is said to be "empty" since it does not contain any data, but is sent exclusively for the purpose of including the control information in the flow of data unit—namely, in the flow of IP packets in this example.

Alternatively, a control packet, to be carried within an IP packet, can be sent to carry the control information above mentioned. In this case a plurality of alternative implementations are available. Among others, a new protocol could be defined, together with a protocol code point to be written in the Protocol field shown in FIG. 5A. The payload of the control packet would contain a message carrying, according to the format defined by the aforementioned new protocol, the control information. A control packet containing the said message could be transmitted at the beginning of a selected number of time frames and sub-time frames in each time cycle and super cycle before transmitting any data unit belonging to the time frame.

The control information can be inserted at the data link layer. FIG. 5B shows the format of a PPP (Point-to-Point) packet with HDLC (High-level Data Link Control) framing. A possible implementation for transmitting control information over a communication channel consists of embedding such information in the PPP or HDLC header of packets being transmitted on the channel. For example, a possible implementation uses the Address field in the HDLC framing of a PPP packet to carry at least one of a time frame delimiter D-frame, a control time frame delimiter D-control, a time cycle delimiter D-cyde, and a time frame number TN. In fact, when using PPP with HDLC framing, the Address field is not used and thus can be used to carry the control information for time frame delineation, even though it would otherwise be intended to have value 255 (11111111 in binary notation).

The control information can be included at least one of the first packet and the last packet transmitted during the time frame to which the information is to be associated. Alternatively, a service PPP packet can be sent explicitly to carry the control information. A padding PPP packet could be used for this purpose. Alternatively, a Link Quality Protocol could be defined for carrying control information during PPP link operation in addition to providing link quality monitoring functionality. An alternative implementation consists of extending the existing Link Quality Report message to perform this task. Another way of carrying the control information consists of defining a new PPP packet meant for transport of control information.

Alternatively, a control packet, to be carried within a PPP packet, can be sent to carry the above mentioned control information. In this case, a plurality of implementation alternatives are available. Among others, a new protocol could be defined, together with a protocol code point to be written in the Protocol field shown in FIG. 5B. The payload of the control packet would contain a message carrying, according to the format defined by the aforementioned new protocol, the control information. A packet containing the said message can be transmitted at the beginning of a selected number of time frames and sub-time frames in each time cycle and super cycle, before transmitting any other data unit belonging to the time frame.

A time frame delimiter D-frame, control time frame delimiter D-control, or time cycle delimiter D-cycle, can be inserted in the flow of PPP packets by inserting an exception in one of the fields of the PPP or HDLC header of at least one of the first packet and the last packet transmitted during the time frame with which the delimiter is to be associated. For example, when using PPP with HDLC framing, or when using HDLC in its connectionless unreliable mode (which is virtually the only mode in which HDLC is being used in today's networks) as the data link protocol on a communications channel, the field Control in FIG. 5B is supposed to have value 3 (00000011 in binary notation). A different value could be used to identify a flagged PPP or HDLC packet. The serial receiver 6022 in the receiving input port 900 in FIG. 1 detects the flagged packet and generates an indication on the respective one of the delimiter signal—Receive D-frame 6040, Receive D-cycle 6041, and Receive D-control 6042.

When HDLC or PPP with HDLC framing is deployed as a data link protocol, at least one of a time frame delimiter D-frame, a control time frame delimiter D-control, a time cycle delimiter D-cycle, a time frame number TN, and a time stamp TS can be inserted in the flow of data units as a "short HDLC frame". HDLC frames are supposed to be at least four bytes long. Shorter frames, such as among others, a pair of flag fields with only one byte between them, is considered a so-called "short frame" and is discarded by usual HDLC implementations. However, such a short frame, or variation thereof can be used to carry control information, such as, but not limited to, a delimiter.

Whenever HDLC deploys byte-oriented transmission, such as when used to provide framing for PPP, according to its specification byte stuffing is used to avoid the flag character's appearance in the HDLC payload. Byte stuffing implies the transmission of a predefined byte sequence, called escape sequence, instead of the byte corresponding to the Flag value (01111110 in binary notation). The serial receiver 6022 in FIG. 1 handles the escape sequence differently than plain data. For example, in the case of the input port 900 shown in FIG. 1, the serial receiver 6022 does not transmit the escape sequence over the data line 6020. Instead, it interprets it and possibly sends on the data line 6020 a corresponding byte. Analogously, when the serial receiver 6022 receives a byte having the Flag value (01111110 in binary notation), it does not transmit it on the data line 6020, but rather interprets it—understanding that an HDLC frame is starting or ending.

Besides the Flag value, there are other predefined values that are not transparently handled by the serial receiver and thus require a corresponding escape sequence in order to be transmitted across a communications channel. In addition, HDLC encompasses the capability of allowing the two entities at the edges of a communications channel to custom define a set of byte values to be interpreted by the serial receiver 6022 (see FIG. 1), instead of being transparently forwarded on its data line 6020. One or more values could be defined to represent delimiters (D-frame, D-cycle, or D-control).

When PPP is used as the data link protocol over a communications channel, Simple Data Link (SDL) framing can be employed. SDL framing is an alternative to the Flag field shown in FIG. 5B for providing framing. The SDL framing of a PPP packet is shown in FIG. 5C. The Address and Control fields of the HDLC header are preposed to the PPP packet, and the resulting byte sequence is enclosed between the SDL header and trailer. The SDL header comprises a Packet Length field and an SDL Header CRC field; the SDL trailer consists of an SDL CRC field. Since the HDLC Flag field is not deployed, byte stuffing is not required with SDL framing. The beginning of a frame is identified by the serial receiver (e.g., 6022 in FIG. 1) through a hunting process on the Header CRC.

In the following of this disclosure, a number of sample alternative methods for inserting control information in a flow of data units transmitted over a communications channel deploying PPP with SDL framing are presented.

In a first implementation, control information is embedded in the PPP or HDLC header of packets being transmitted on the channel. For example, a possible implementation uses the Address field in the HDLC header of a PPP packet to carry at least one of a time frame delimiter D-frame, a control time frame delimiter D-control, a time cycle delimiter D-cycle, and a time frame number TN. In fact, when using PPP with SDL framing, the HDLC Address field is not used and thus can be deployed to carry the control information for time frame delineation, even though it would be otherwise intended to have value 255 (1111111 in binary notation).

The control information can be included in at least one of the first packet and the last packet transmitted during the time frame with which the information is to be associated. Alternatively, a service PPP packet can be sent explicitly to carry the control information. A padding PPP packet could be used for this purpose. Alternatively, a Link Quality Protocol could be defined for carrying control information during PPP link operation, in addition to providing link quality monitoring functionality. An alternative implementation consists in extending the existing Link Quality Report message to perform this task. Another way of carrying the control information consists in defining a new PPP packet meant for the transport of control information.

Alternatively, a control packet encapsulated in a PPP packet can be sent to carry the control information above mentioned. In this case a plurality of implementation alternatives are available. Among others, a new protocol could be defined, together with a protocol code point to be written in the Protocol field shown in FIG. 5C. The payload of the control packet would contain a message carrying, according to the format defined by the aforementioned new protocol, the control information. A packet containing the said message could be transmitted at the beginning of a selected number of time frames and sub-time frames in each time cycle and super cycle, before transmitting any other data unit belonging to the time frame.

A time frame delimiter D-frame, control time frame delimiter D-control, or time cycle delimiter D-cycle can be inserted in the flow of PPP packets by inserting an exception in one of the fields of the PPP or HDLC header of at least one of the first packet and the last packet transmitted during the time frame to which the delimiter is to be associated. For example, when using PPP with SDL framing, the field Control is supposed to have value 3 (00000011 in binary notation). A different value could be used to identify a flagged PPP packet. The serial receiver 6022 in the receiving input port 900 in FIG. 1 detects the flagged packet and generates an indication on the respective one of the delimiter signals—Receive D-frame 6040, Receive D-cycle 6041, and Receive D-control 6042.

Another implementation uses A or B SDL messages to carry the control information. The payload of A and B SDL messages does not carry data, and thus may be used to carry at least one of a time frame delimiter D-frame, a control time frame delimiter D-control, a time cycle delimiter D-cycle, a time frame number TN, and a time stamp TS. An A or B message containing the said control information can be sent at the beginning of the time frame or sub-time frame with which said control information is associated, before starting the transmission of the data units belonging to the selected time frame or sub-time frame.

Methods for transmitting control information over a communications channel (such as 920 in FIG. 1) on which at least one of the packet based protocols ATM, MPLS, Frame Relay, Fiber Channel (FC), Gigabit Ethernet (GE), and 10 Gigabit Ethernet (10 GE) is deployed, can be realized along the same lines of the methods for transmitting control information presented above.

The control information can be inserted at the physical layer. In the following, a set of sample implementations for the transmission of control information over a communications channel (such as 920 in FIG. 1) realized using SONET/SDH (Synchronous Optical NETwork/Synchronous Digital Hierarchy) technology is presented. The set of implementations is not meant to be exhaustive since other implementation alternatives are possible.

If PPP packets are transmitted over the channel, the methods previously described can be applied to carry control information.

Figure 6:
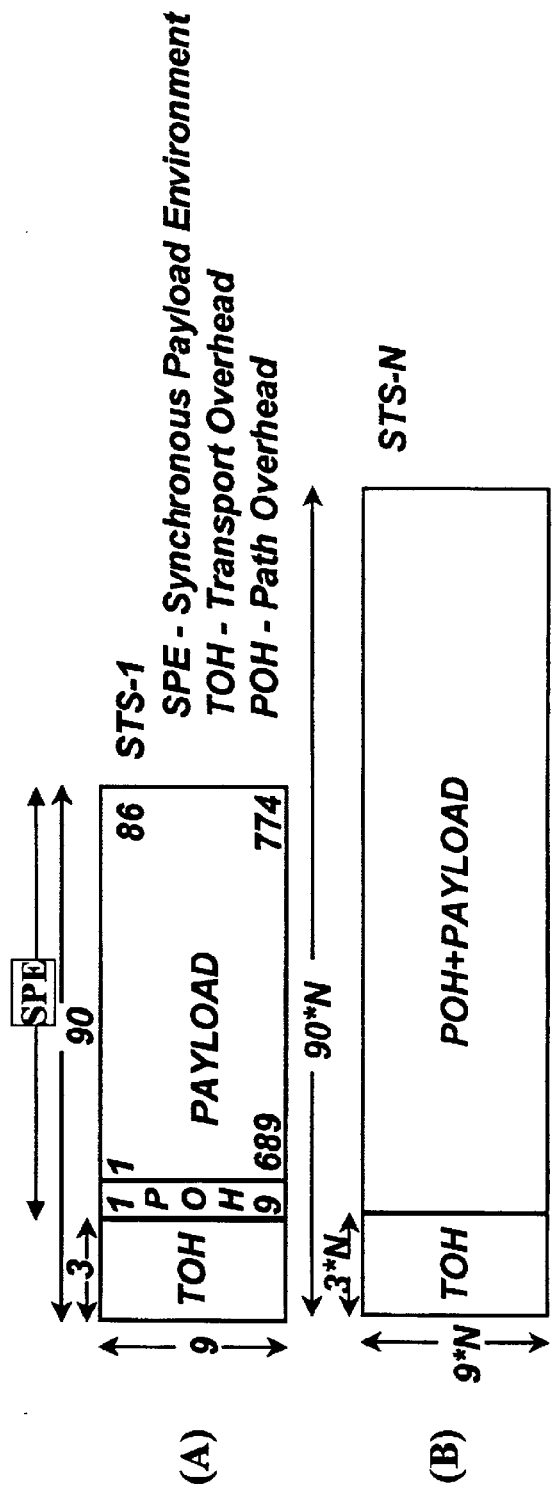
FIG. 6A depicts the structure of a SONET (Synchronous Optical NETwork) frame used for transmission at about 50 Mb/s (STS-1 channel)
FIG. 6B depicts the structure of a SONET (Synchronous Optical NETwork) frame used for transmission at an integer multiple N of an STS-1 channel—which is STS-N.

Otherwise, SONET frames, whose structure is depicted in FIG. 6 can be exploited to embed the control information in the flow of data units. FIG. 6A is the structure of an STS-1 (Synchronous Transport Signal) frame(used for transmission on channels at speed 51.84 Mb/s), while FIG. 6B shows the structure of an STS-N frame(used for transmission on channels at speed N·51.84 Mb/s).

The STS-1 frame is organized in rows and columns; the frame is transmitted on a serial communications channel (such as 920 in FIG. 1) by rows. The STS-1 frame is composed of 9 rows of 90 bytes. The first 3 bytes of every row carry control information called Transport Overhead TOH, which is used by the network elements at the end points of sections (e.g., repeaters) and lines (e.g., add-drop multiplexers). The remaining 87 bytes of each row are transported between the end points of a communication channel.

Data travelling end to end is not put in the STS-1 frame simply starting from column 3 of row 1. Instead, data is inserted in what is called a SONET Payload Environment SPE that can start at any position within the rightmost 87 columns of the STS-1 frame. The SPE is said to float within the payload of the STS-1 frame. Two of the bytes in the TOH, called bytes H1 and H2, function as a pointer to the position of the SPE within the STS-1 frame.

The SPE, comprising 9 rows of 87 bytes, is further divided in a payload part PAYLOAD and an overhead part, called Path Overhead POH, that consists of the first byte of each row—first column. User data travelling on a communications channel defined over a SONET network is carried within the PAYLOAD part.

The STS-N frame, shown in FIG. 6B, is obtained by byte interleaving N STS-1 frames. As a result, the first 3·N columns of an STS-N frame contain the transport overhead TOH, while the remaining N·87 columns contain N SPEs, each one floating independently.

An STS-N frame (with N≧1) is transmitted in 125 microseconds, resulting in a transmission speed of N·51.84 Mb/s.

Control information can be transmitted over a communications channel deploying SONET framing by including the control information in the transport overhead TOH or in the path overhead POH. For example, the SONET specification does not identify a specific use for some of the bytes of the path overhead. Such bytes, called F2, Z3, Z4, and Z5, can be used to carry at least one of a time frame delimiter D-frame, a control time frame delimiter D-control, a time cycle delimiter D-cycle, a time stamp TS, and a time frame number TN. Delimiters can be implemented as pointers.

In other words, in a possible embodiment the time frame delimiter D-frame is implemented by a field in the transport TOH or path overhead POH identifying the position within the STS frame or the SPE, respectively, at which the time frame begins.

The control time frame delimiter D-control is implemented by a field in the transport TOH or path overhead POH identifying the position within the STS frame or the SPE, respectively, where the control time frame begins.

The time cycle delimiter D-cyde is implemented by a field in the transport TOH or path overhead POH identifying the position within the STS frame or the SPE, respectively, where the time cycle begins.

In a possible implementation, the same pointer can be used for implementation of D-frame, D-control, and D-cyde; one, two, or more flags in either the transport TOH or path overhead POH are used to identify the kind of pointer.

Alternatively, the bytes H1 and H2 in the transport overhead TOH, which point to the position of the SPE within the STS frame, can be used as a time frame delimiter D-frame. In this implementation, the beginning of a time frame, sub-time frame, control time frame, or time cycle—depending on the pointer being implemented—must coincide with the beginning of the SPE. In other words, the SPE must be aligned with the common time reference (CTR) 002 employed in the output port (such as 900 in FIG. 1).

Figure 7:
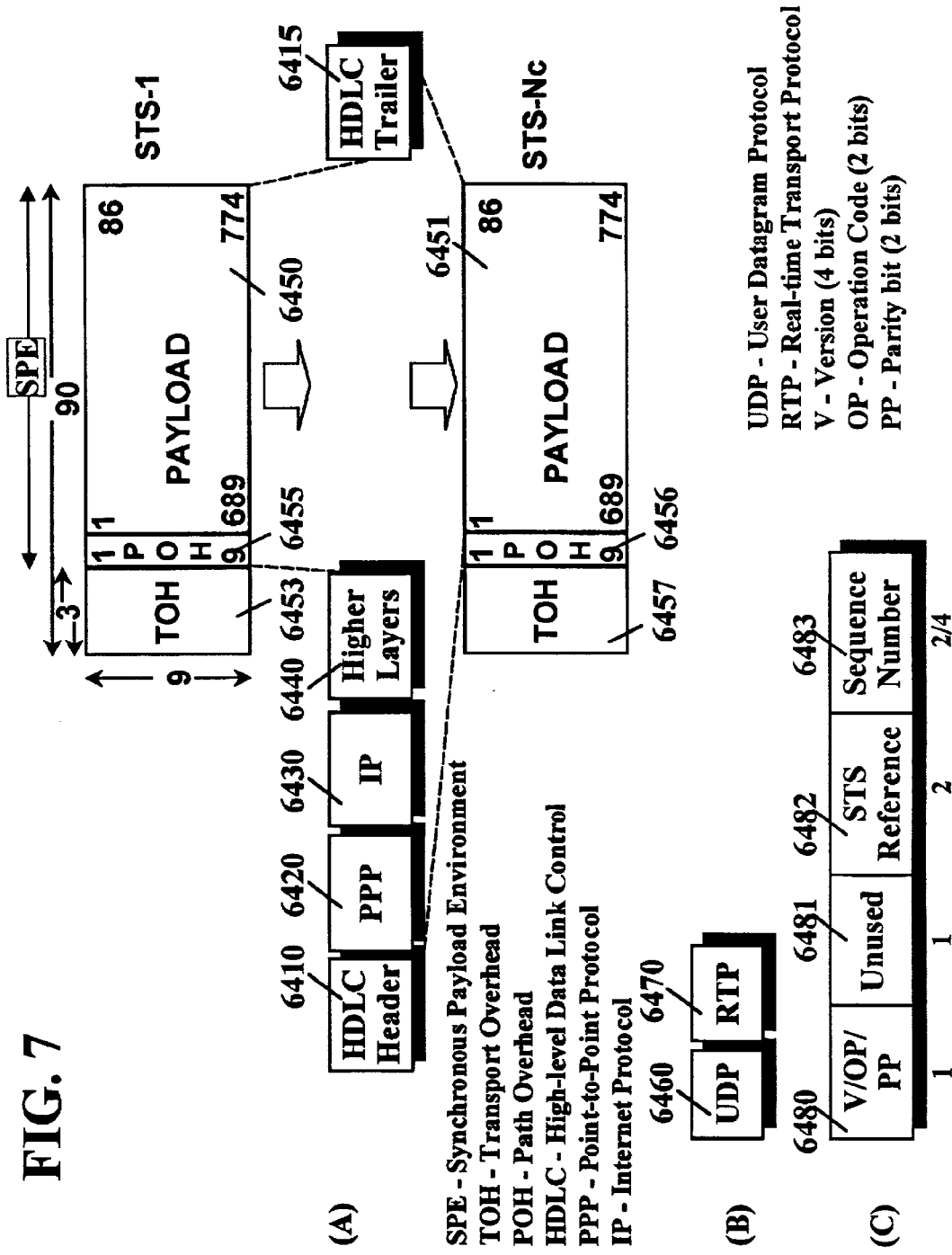
FIG. 7 shows possible ways for encapsulating a SONET frame within an IP packet that is subsequently transmitted within a SONET frame.

Recently, interest has been rising for transporting SONET channels over packet switched networks, and in particular, over IP (Internet Protocol) networks. Even though a standard method does not exist yet, proposals and implementations have begun to appear. FIG. 7 depicts some alternative methods for carrying STS-1 frames over IP networks; similarly, methods have been proposed to carry STS-Nc frames over IP networks.

As shown in FIG. 7A, the SPE (PAYLOAD 6455 and POH 6450) is carried within an IP packet after having prepended the header of at least one of a sequence of higher layer protocols 6440. The resulting IP packet (6430, 6440, 6455, and 6450) is routed throughout the IP network towards an edge device that is going to extract the SPE from the packet and possibly forward it over a SONET network after having prepended the proper transport overhead TOH.

If the IP packet travels over SONET links connecting IP routers, the typical Packet Over SONET (PoS) encapsulation is being used, which, as shown in FIG. 7A requires the IP packet to be prepended a PPP header 6420 with HDLC framing—implemented by an HDLC header 6410 and an HDLC trailer 6415, further detailed in FIG. 5B—and inserted within the payload of an STS-Nc frame 6451.

Various proposals and implementations of higher layer protocols 6440 used to carry SPEs over IP exist. Among others, the Real-time Transport Protocol (RTP) 6470 over the User Datagram Protocol (UDP) 6460 can be used, as shown in FIG. 7B.

Alternatively, a special purpose SPE over IP (SPE/IP) protocol layer can be used to encapsulate SONET frames in IP packets; FIG. 7C shows the format of a possible implementation of SPE/IP protocol. The first byte 6480 contains 3 fields: a four bit version number V, a 2 bit operational code OP used to differentiate standard user data frames from OAM frames, and a 2 bit parity bit field PP used to detect single bit errors within the SPE/IP header 6480 through 6483 and within the overall message (SPE/IP header 6480 through 6483 and SPE frame 6455 and 6450), respectively.

The SPE/IP header further comprises a 2 byte STS Reference number 6482 used to identify the specific channel to which the carried SPE 6450 and 6455 belongs, and a 2 or 4 byte Sequence Number 6483 that is incremented for successive SPEs belonging to the same channel, i.e., having the same reference number 6482.

Alternatively, at least one of a plurality of whole STS-1 frames (instead of SPEs) can be encapsulated in an IP packet according to any of the methods shown in FIG. 7 for encapsulating the SPE of 1 STS-1 frame.

Alternatively, one STS-N, or STS-Nc, or STS-N SPE, or STS-Nc SPE frame can be encapsulated in a plurality of IP packets according to the methods shown in FIG. 7, wherein each encapsulating IP packet contains a fraction of the STS-N, or or STS-Nc, or STS-N SPE, or STS-Nc SPE being encapsulated.

Various ways of embedding control information among data units transmitted on a communications channel do exist when using one of the configurations depicted in FIG. 7 to transport SONET channels.

If control information is to be embedded within the transported SONET channel 6450 and 6455, the methods described above must include in the path overhead POH 6455 at least one of a time frame delimiter D-frame, a control time frame delimiter D-control, a time cycle delimiter D-cycle, and a time frame number TN can be deployed.

If at least one of a time frame delimiter D-frame, a control time frame delimiter D-control, a time cycle delimiter D-cyde, and a time frame number TN is to be included over the transported channels, one of the methods described above for embedding such control information within at least one of the HDLC header 6410, the PPP header 6420, the IP header 6430, the SONET transport overhead TOH 6453, and the SONET path overhead POH 6455 may be deployed.

Figure 8:
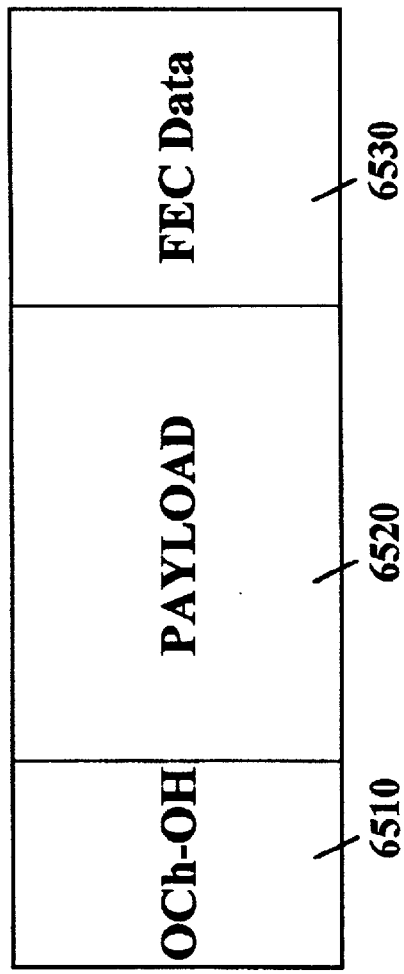
FIG. 8 provides a general structure of a digital wrapper to be deployed for transmission over a plurality of optical channels.

SONET can be deployed to provide Operation, Administration, and Management (OAM) and framing functionality over optical channels. However, proposals and implementations under the name of digital wrappers are appearing delineating alternative ways of providing the same functionality. Moreover, digital wrappers support forward error correction (FEC) in order to enable an optical channel to tolerate higher attenuation and transmission bit error rates, thus spanning longer distances and deploying less sophisticated transmission equipment. The general structure of a digital wrapper is shown in FIG. 8.

A digital wrapper is organized in rows and columns of bytes. The first few columns constitute the Optical Channel Overhead (OCh-OH) 6510 which provides, among other things, framing functions. PAYLOAD columns 6520 follow and the frame is closed by a number of columns containing Forward Error Correction (FEC) data 6530. The frame is transmitted on the serial communications channel (such as 920 in FIG. 1) by rows.

If control information is to be embedded among data units transmitted over an optical communications channel deploying a digital wrapper, the methods described above to include at the data link layer or higher layer, at least one of a time frame delimiter D-frame, a control time frame delimiter D-control, a time cycle delimiter D-cyde, and a time frame number TN may be deployed. In addition, available bytes in the optical channel overhead OCh-OH 6510 can be used to carry at least one of a time frame delimiter D-frame, a control time frame delimiter D-control, a time cycle delimiter D-cyde, a time stamp TS, and a time frame number TN. Delimiters can be implemented as pointers.

In other words, the time frame delimiter D-frame is implemented by a field in the optical channel overhead OCh-OH 6510 identifying the position within the PAYLOAD 6520 where the time frame begins.

The control time frame delimiter D-control is implemented by a field in the optical channel overhead OCh-OH 6510 identifying the position within the PAYLOAD 6520 at which the control time frame begins.

The time cycle delimiter D-cycle is implemented by a field in the optical channel overhead OCh-OH 6510 identifying the position within the PAYLOAD 6520 at which the time cycle begins.

In a possible implementation, the same pointer can be used for implementation of D-frame, D-control, and D-cyde; one, two, or more flags in the optical channel overhead OCh-OH 6510 are used to identify the kind of pointer.

Alternatively, the line encoding deployed on a communications channel can carry at least one of a time frame delimiter D-frame, a control time frame delimiter D-control, a time cycle delimiter D-cycle, a time stamp TS, and a time frame number TN. Delimiters can be implemented as pointers. As an example, if a possible implementation deploys 8B/10B encoding for transmission of the data stream over the communications channel (e.g., 920 in FIG. 1), codes which are not used to carry data and are not already assigned to transmission control functions, can be used to carry at least one of a time frame delimiter D-frame, a control time frame delimiter D-control, a time cycle delimiter D-cyde, a time stamp TS, and a time frame number TN.

After having reviewed some of the possible methods for embedding control information within the flow of data units through a communications channel such as 920 in FIG. 1, this disclosure describes a plurality of methods for deploying such control information in order to detect and recover from failures of the communication channels 920 and changes in the delay across the communications channel 920.

Figure 12:
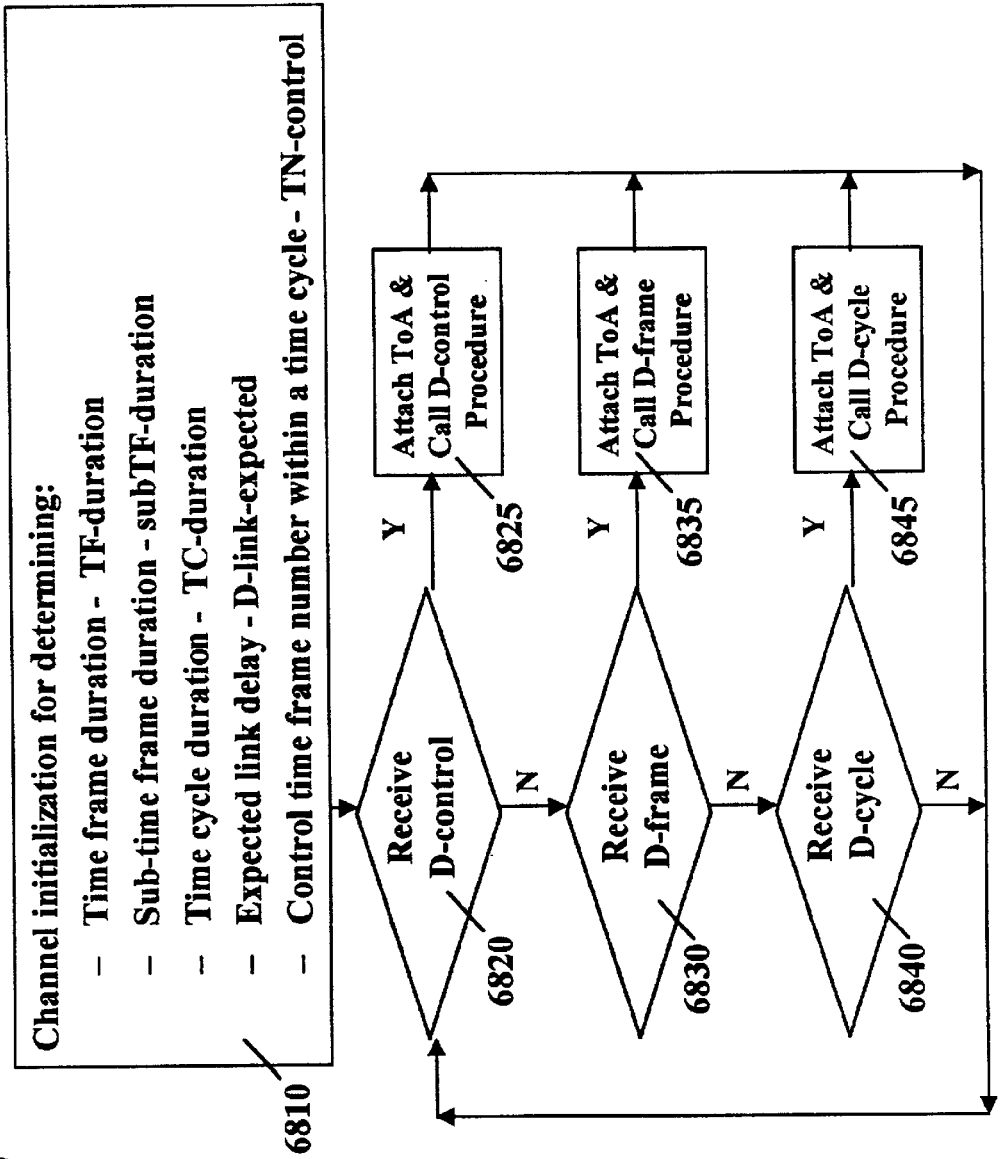
FIG. 12 is a flow chart describing the operation of a receive delineation controller; wherein the receive delineation controller is able to detect and recover from at least either a link failure or a change in the propagation delay of a link.

As shown in FIG. 12, before starting operation of the communications channel 920, an initialization phase 6810 needs to be performed in order for the Transmit Delineation Controller 6011 and the Receive Delineation Controller 6021 in FIG. 1 to exchange control information and negotiate channel parameters. FIG. 12 shows a list of information possibly exchanged during channel initialization 6810. Among other information, the Transmit Delineation Controller 6011 and the Receive Delineation Controller 6021 in FIG. 1 can negotiate at least one of the time frame duration TF-duration, the sub-time frame duration subTF-duration, the time cycle duration TC-duration, the expected link delay D-link-expected, and the number within a time cycle of the control time frame TN-control.

The channel initialization phase 6810 in FIG. 12 can be performed using a protocol specifically designed for it. Alternatively, existing channel initialization protocols such as the Link Control Protocol (LCP) used on communications channels deploying the Point-to-Point (PPP) protocol at the data link layer can be extended to carry the information that is to be exchanged during channel initialization 6810.

After channel initialization 6810 in FIG. 12 has been completed, the operational phase of the communications channel starts. The Receive Delineation Controller 6021 in FIG. 1 continuously checks for the reception of at least one of a control time frame delimiter D-control 6820, time frame delimiter D-frame 6830, and time cycle delimiter D-cyde 6840, as shown in the flow chart depicted in FIG. 12.

If a control time frame delimiter D-control is received 6825, the Receive Delineation Controller 6021 registers the time at which control time frame delimiter D-control was received (Time of Arrival ToA) according to the common time reference 002 and executes a procedure D-control Procedure 6900 to properly handle the control time frame delimiter D-control.

If a time frame delimiter D-frame is received 6835, the Receive Delineation Controller 6021 registers the time at which time frame delimiter D-frame was received (Time of Arrival ToA) according to the common time reference 002 and executes a procedure D-frame Procedure 7000 to handle the time frame delimiter D-frame.

If a time cycle delimiter D-cycle is received 6845, the Receive Delineation Controller 6021 registers the time at which time cycle delimiter D-cyde was received (Time of Arrival ToA) according to the common time reference 002 and executes a procedure D-cycle Procedure 7100 to handle the time frame delimiter D-cycle.

Figure 13:
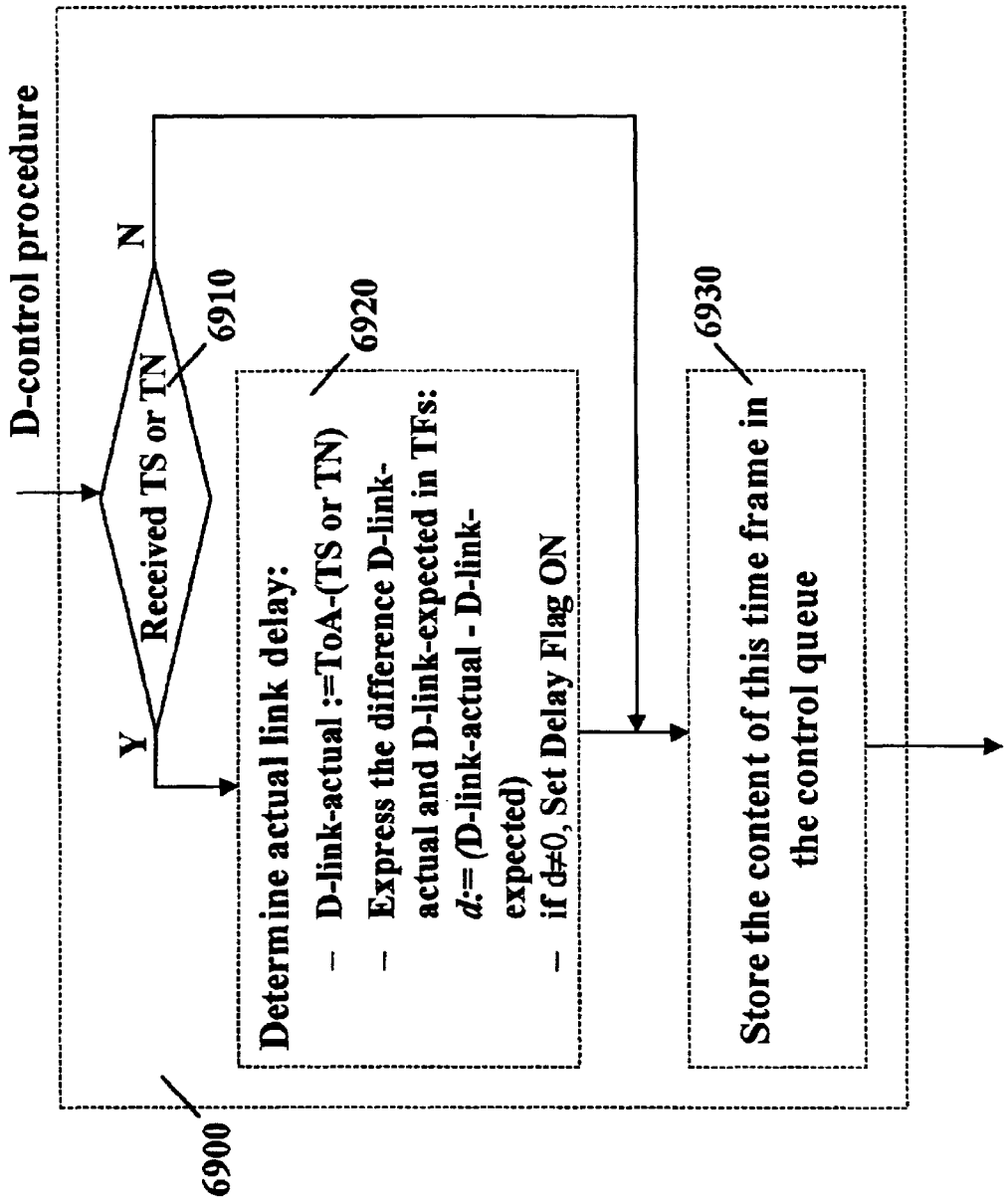
FIG. 13 is a flow chart describing the operation of the receive delineation controller upon reception of a control time frame delimiter.

FIG. 13 shows the flow diagram of a possible implementation of the D-control Procedure 6900, which begins with checking whether a time stamp TS or a time frame number TN has been received 6910. If a time stamp TS or a time frame number TN has been received 6920, it can be used to calculate the delay across the communications channel (such as 920 in FIG. 1) by comparing the time stamp TS or the time frame number TN with its time of arrival ToA or corresponding UTR time frame, respectively.

The difference d between the expected delay across the communications channel D-link-expected and the actual measured delay D-link-actual is calculated. If such difference d is not null, a Delay Flag is set. Subsequently 6930, the Control Queue 6651 in the Alignment Subsystem 6600 shown in FIG. 10 is selected through signal Select-in 1410 to store the data units being received during the control time frame.

Figure 14:
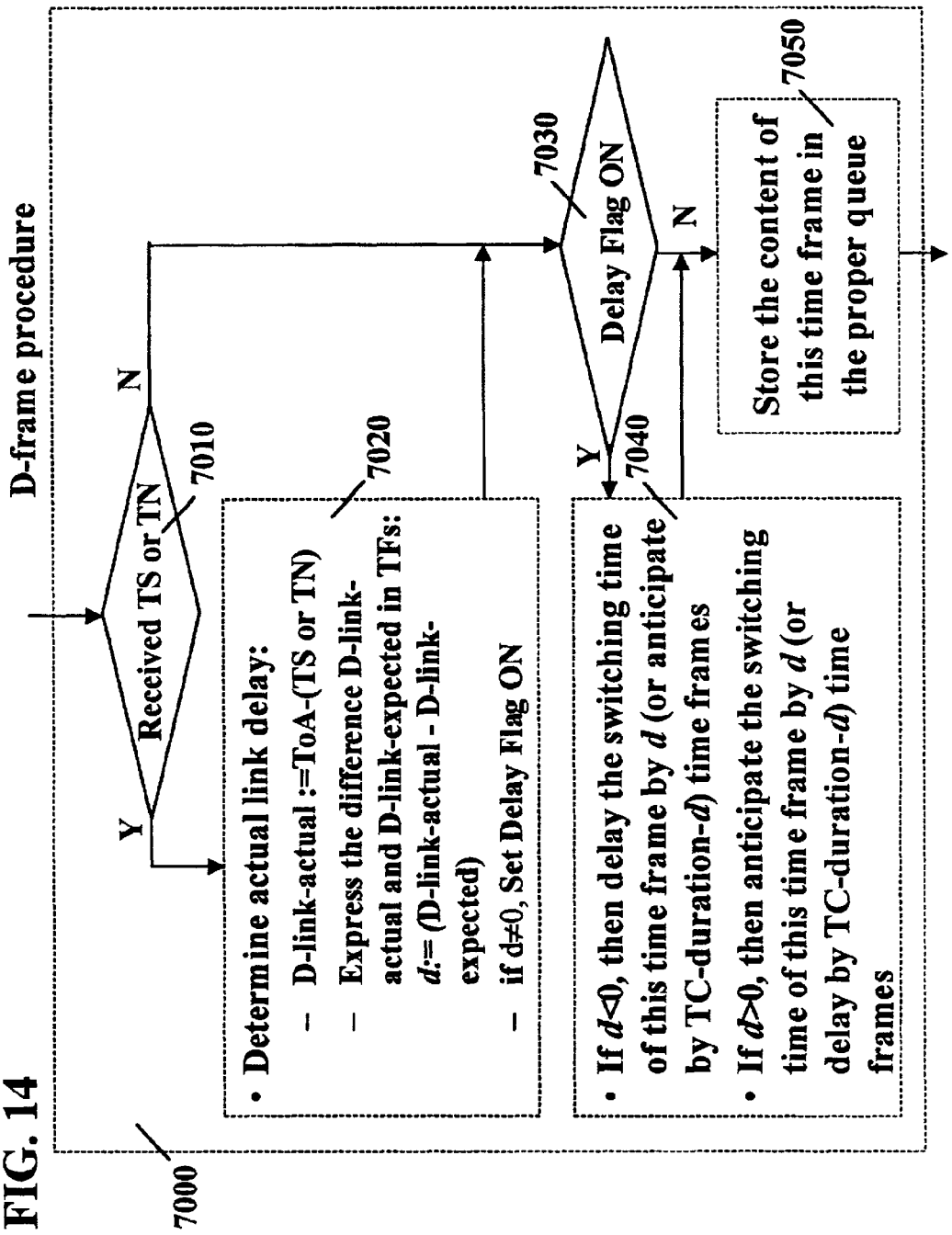
FIG. 14 is a flow chart describing the operation of a possible implementation of the receive delineation controller upon reception of a time frame delimiter (different from the delimiter of the control time frame)

FIG. 14 shows the flow diagram of a possible implementation of the D-frame Procedure 7000, which begins with checking whether a time stamp TS or a time frame number TN has been received 7010.

If a time stamp TS or a time frame number TN has been received 7020:

it can be used to calculate the delay D-link-actual across the communications channel by comparing the time stamp TS or the time frame number TN with its time of arrival ToA or corresponding UTR time frame, respectively.

The difference d between the expected delay across the communications channel D-link-expected and the actual measured delay D-link-actual is calculated. If such difference d is not null, a Delay Flag is set.

Subsequently, as well as in the case in which a time stamp TS or a time frame number TN has not been received, the Delay Flag is checked 7030. If the Delay Flag is set, the switching delay adjustment procedure 7040 is executed. Otherwise, if the Delay Flag is not set, 7050 the proper TF Queue 6650 in the Alignment Subsystem 6600 shown in FIG. 10 is selected through signal Select-in 1410 to store the data units being received during the current time frame.

The switching delay adjustment procedure 7040 checks whether the measured delay across the communications channel D-link-actual is shorter (d<0) or longer (d>0) than the expected delay D-link-expected (i.e., whether the delay across the communications channel has become shorter or longer).

If the delay across the communication channel has shortened, the time between reception and switching of the data units received during the current time frame must be increased in order to compensate for the reduction in the propagation delay across the communications channel. This aims at keeping the CTR 002 time frame during which the data units exit the Alignment Subsystem 6600 through the data line 940 (shown in FIG. 10) unchanged, even though the propagation delay across the respective communications channel has changed. This can be obtained in at least one of the two following ways: (1) by switching the data units d time frames later, and (2) by switching the data units TC-duration-d time frames earlier.

If the delay across the communication channel has become longer, the time between reception and switching of the data units received during the current time frame must be reduced in order to compensate for the increment in the propagation delay across the respective communications channel. This aims at keeping the CTR 002 time frame during which the data units exit the Alignment Subsystem 6600 through the data line 940 (shown in FIG. 10) unchanged, even though the propagation delay across the respective communications channel has changed. This can be obtained in at least one of the two following ways: (1) by switching the data units d time frames earlier, and (2) by switching the data units TC-duration-d time frames later.

The data units that are transferred to the switch fabric 15140 in FIG. 19A through line 940 during each of the time frames are those stored in the TF Queue 6650 in FIG. 10 selected by the Select-out signal 1430 generated by the switch controller 15150 in FIG. 19A. Since TF Queue 6650 selection is based on a cyclical pattern, ultimately the time frame during which data units exit the Alignment Subsystem 6600 to be switched depends on the TF Queue 6650 in which they are stored when they are received through line 6630 in FIG. 10. In other words, the Receive Delineation Controller 6021 in FIG. 1 adapts the switching time of data units to the variation of the delay across the communications channel 920 by properly modifying the criteria for generating the Select-in signal 1410.

Upon completion of the delay adjustment procedure 7040, the proper TF Queue 6650 in the Alignment Subsystem 6600 shown in FIG. 10 is selected through signal Select-in 1410 to store the data units being received during the current time frame 7050.

Figure 15:
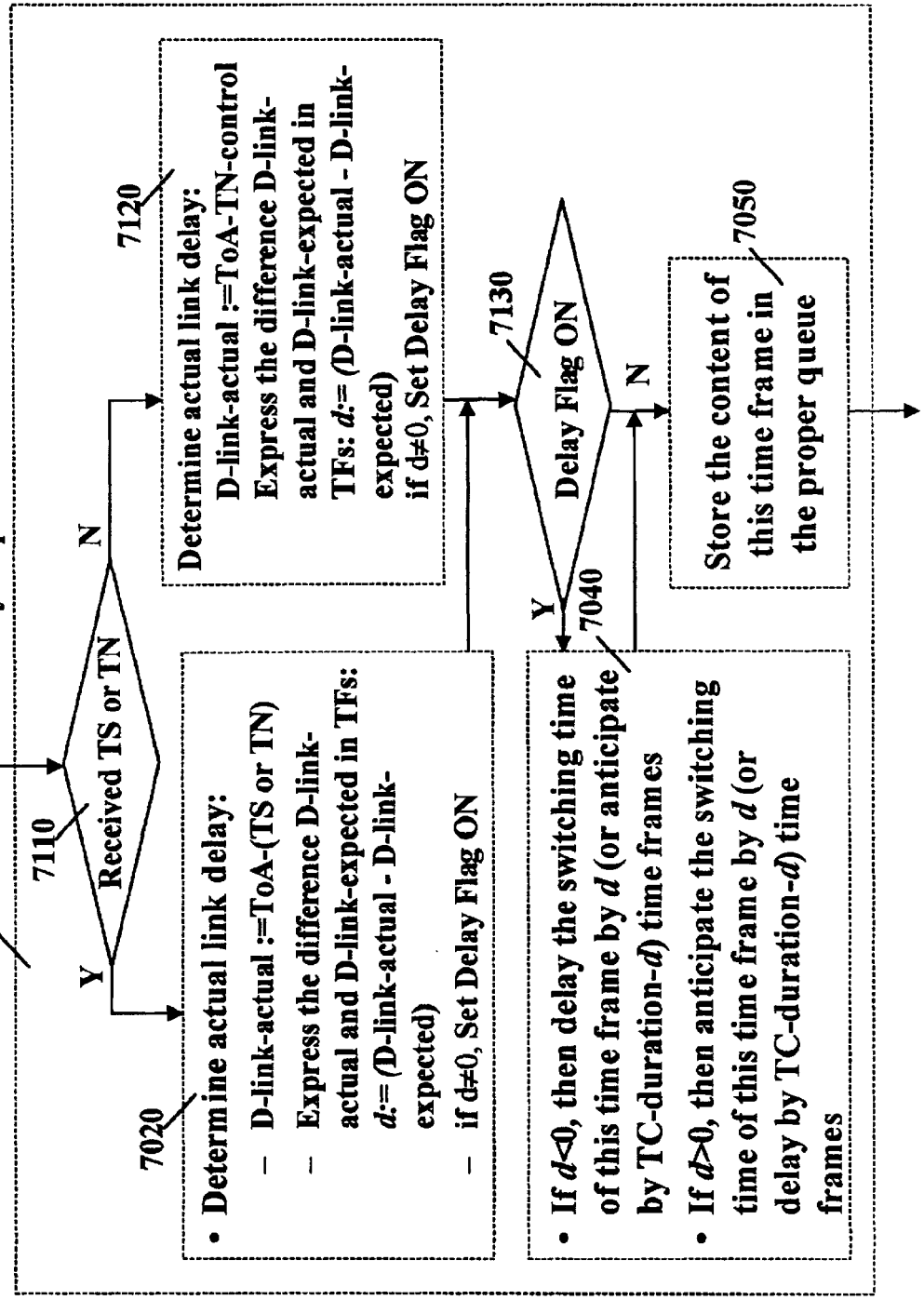
FIG. 15 is a flow chart describing the operation of a possible implementation of the receive delineation controller upon reception of a time cycle delimiter.

FIG. 15 shows the flow diagram of a possible implementation of the D-cyde Procedure 7100, which begins with checking whether a time stamp TS or a time frame number TN has been received 7110.

If a time stamp TS or time frame number TN has been received, the same procedure 7020 invoked during the D-frame Procedure 7000 is used to calculate the delay across the communications channel by comparing the time stamp TS or the time frame number TN with its respective time of arrival ToA or corresponding UTR time frame, respectively.

If a time stamp TS or time frame number TN has not been received, a procedure 7120 is invoked to calculate the delay D-link-actual across the communications channel by comparing the expected number of the control time frame TN-control with the UTR time frame corresponding to the time of arrival ToA of the time cycle delimiter D-cycle. The difference d between the expected delay across the communications channel D-link-expected and the actual measured delay D-link-actual is calculated. If such difference d is not null, a Delay Flag is set.

Subsequently, the Delay Flag is checked 7130. If the Delay Flag is set, the switching delay adjustment procedure 7040—the same invoked during the D-frame Procedure 7000—is executed. Otherwise, if the Delay Flag is not set, 7050 the proper TF Queue 6650 in the Alignment Subsystem 6600 shown in FIG. 10 is selected through signal Select-in 1410 for storing the data units being received during the current time frame.

By having the Transmit Delineation Controller 6011 in FIG. 1 embed in the flow of data units at least one of a time frame delimiter D-frame, a control time frame delimiter D-control, a time cycle delimiter D-cycle, a time frame number TN, and a time stamp TS, the Receive Delineation Controller 6021 in FIG. 1 can detect a communications channel 920 outage or timing failures (i.e., a change in the propagation delay across the channel 920). Moreover, by executing a proper switching delay adjustment procedure, such as 6920, 7020, and 7040, the system shown in FIG. 1 can recover from timing failures.

The time required for recovery depends on the policy for embedding control information within the flow of data units. Immediate (within one time frame) recovery is possible if either a time stamp TS or a time frame number TN is transmitted during each time frame.

Recovery from a timing failure is possible if enough TF queues 6650 are available in the Alignment Subsystem 6600, depicted in FIG. 10, to properly delay the switching time of received data units, according to the results of the switching time adjustment procedures 6920, 7020, and 7040. FIG. 11 contains a table with the overall buffering space across all the TF Queues 6650 within the Alignment Subsystem 6600 depicted in FIG. 10 required to implement recovery from timing failure. If the total amount of buffering space in the Alignment Subsystem 6600 enables storage of a time cycle worth of data units, recovery from timing failures is possible. Thus, the total buffering requirement depends on the time cycle duration and the capacity of the communications channel. The table in FIG. 11 provides the buffering requirement for a set of time cycle durations and for two channel capacities: OC-48 (2.4 Gb/s) and OC-192 (10 Gb/s).

A Time Frame Switching Method Using Time Frame Labels and Common Time Reference

A system is provided for managing data transfer of data units from a source to a destination. The transfer of the data units is provided during a predefined time interval, comprised of a plurality of predefined time frames. The system is further comprised of a plurality of switches. A common time reference signal is coupled with each of the switches, and a time assignment controller assigns selected predefined time frames for transfer into and out from each of the respective switches responsive to the common time reference (CTR) signal.

As shown in FIG. 18A data units transmitted during a given time frame 15060 are enclosed between header control information 15010 and trailer control information 15020. The system transmitting data units appends the header control information 15010 and appends the trailer control information 15020 before and after, respectively, the transmission of the data units belonging to a given time frame 15060. The system receiving data units strips off and parses the header control information 15010 and the trailer control information 15020, and processes the information contained therein before switching and transmitting the data units belonging to a given time frame 15060. The information contained in the header control information 15010 and the trailer control information 15020 can be used to handle, e.g., route, the data units belonging to the respective time frame 15060.

As shown in FIG. 18C, in a possible embodiment a safety gap 15070 can be introduced between the transmitted data units and control information—at least one of header control information 15010 and trailer control information 15020) belonging to consecutive time frames 15060-1 and 15060-2.

In a possible embodiment, the safety gap 15070 begins after the end of the trailer control information 15020-1 of a first time frame 15060-1 and ends before the beginning of the header control information 15010-2 of a second time frame 15060-2, wherein the second time frame 15060-2 immediately follows the first time frame 15060-1.

The safety gap 15070 is useful in separating the data units and control information pertaining to different time frames transmitted (and received) on the same channel. Moreover, in a possible implementation a switch changes the configuration of its switch fabric during the safety gap. As an example, the safety gap is extremely useful for the operation of optical switches deploying an all-optical switch fabric because all optical switch fabrics have typically longer reconfiguration times than electronic switch fabrics.

A possible embodiment of all-optical switch takes advantage of the CTR-based time driven switching so as to switch the content of subsequent time frames without having to process the control information received in the header control information 15010 or in the trailer control information 15020 fields.

In a possible embodiment, both the header control information 15010 and the trailer control information 15020 can be empty, i.e., the data units belonging to a time frame are framed and identified only by at least one of the UTC time of transmission and the UTC time of reception.

In an alternative embodiment, the trailer control information 15020 in FIG. 18A comprises an error check code, e.g., a cyclic redundant code (CRC). The trailer control information 15020 possibly comprises an error correction code to provide forward error correction (FEC) capability. As shown in FIG. 18B, in a possible embodiment the header control information 15010 comprises a delimiter 15030, a label 15040, and a priority 15050 field.

The delimiter 15030 in FIG. 18B is used by the receiver of a stream of data units to unmistakably determine the time frame to which data units belong. Data units received before a given delimiter 15030 belong to a previous time frame, while data units received after the header control information 15010 comprising a given delimiter 15030 belong to the time frame begun by the given delimiter. The delimiter 15030 is encoded according to one of the methods described above. In a possible embodiment, the time frame header control information 15010 does not comprise a delimiter 15030.

The label 15040 in FIG. 18B is used by the receiver of a stream of data units to determine to which output port and during which time frame to switch the data units belonging to the time frame with which the label 15040 is associated. The label 15040 is at least one of:

a fractional lambda pipe identifier (FLP ID) uniquely identifying, throughout the whole network, the FLP for which the time frame is reserved;

a local identifier uniquely identifying, within its scope, the FLP for which the time frame is reserved. The scope of the local identifier can be at least one of the receiving switching system, the transmitting switching system, the communications link between the transmitting and receiving switching systems, and the communications channel between the transmitting and receiving switching systems;

the universal identifier of the time frame in the time cycle, as defined by the common time reference (CTR);

a local identifier of the time frame in the time cycle, as defined by at least one of the receiving switching system, the transmitting switching system, the communications link between the transmitting and receiving switching systems, and the communications channel between the transmitting and receiving switching systems;

a time stamp devised as at least one of: the UTC time, according to the common time reference (CTR), at which the time frame transmission began; the UTC time, according to the common time reference (CTR), at which the time frame reception began; the UTC time, according to the common time reference (CTR), at which a specific time frame data unit was handled by a selected component of one of the transmitting system and the receiving system; the local time, according to the transmitting system clock, at which the time frame transmission began; the local time, according to the receiving system clock, at which the time frame reception began.

In a possible embodiment, the time frame header control information 15010 in FIG. 18B does not comprise a label field 15040.

The priority 15050 field in FIG. 18B is used to differentiate the way data units belonging to separate time frames are handled. In a possible embodiment, data units belonging to time frames 15060 with a higher value in their respective priority field 15050 are switched and forwarded before data units belonging to time frames 15060 with a lower value in their respective priority field 15050. In a possible embodiment, the time frame header control information 15010 does not comprise a priority field 15050.

FIG. 19A depicts the block diagram of a time driven switching system 15100 for routing and switching data units transmitted during time frames as defined by the common time reference (CTR) and possibly comprising at least one of a header control information 15010 and trailer control information 15020, as shown in FIG. 18A.

The switching system 15100 in FIG. 19A switches data units received from a plurality of inputs 15130 on a plurality of outputs 15190. In the embodiment shown in FIG. 19A, the inputs 15130 are optical channels previously separated by a respective one of a plurality of wavelength division multiplexing (WDM) de-multiplexers (DMUXs) 15110 from an optical signal received over a respective optical link 15120. In the embodiment shown in FIG. 19A, the outputs 15180 are optical channels combined by a respective one of a plurality of wavelength division multiplexing (WDM) multiplexers (MUXs) 15160 in an optical signal transmitted over a respective optical link 15170.

In an alternative embodiment subcarrier multiplexing (SCM) is used to provide for multiple channels on each fiber. SCM multiplexers and SCM de-multiplexers—instead of WDM multiplexers (MUXes) 15160 and WDM de-multiplexers (DMUXes) 15110—combine and separate the various optical channels on the fibers.

The switching system 15100 operates responsive to a common time reference (CTR) signal 002 and further comprises a plurality of mapping & alignment subsystems 15200—one for each of the inputs 15130—at least one switch controller 15150, and at least one switch fabric 15140 operating responsive to a control signal 15157 from at least one of the switch controllers 15150.

As shown in FIG. 19B, during a first time frame TF(t) the switching system 15100 responsive to the CTR signal 002 receives data units and maps them to the proper switching and output time frame, thus aligning them to the CTR. During a second time frame TF(t+k) the switching system 15100 switches to and transmits on the proper output 15180 the data units received during the first time frame TF(t), wherein the second time frame is later than the first time frame.

Figure 41:
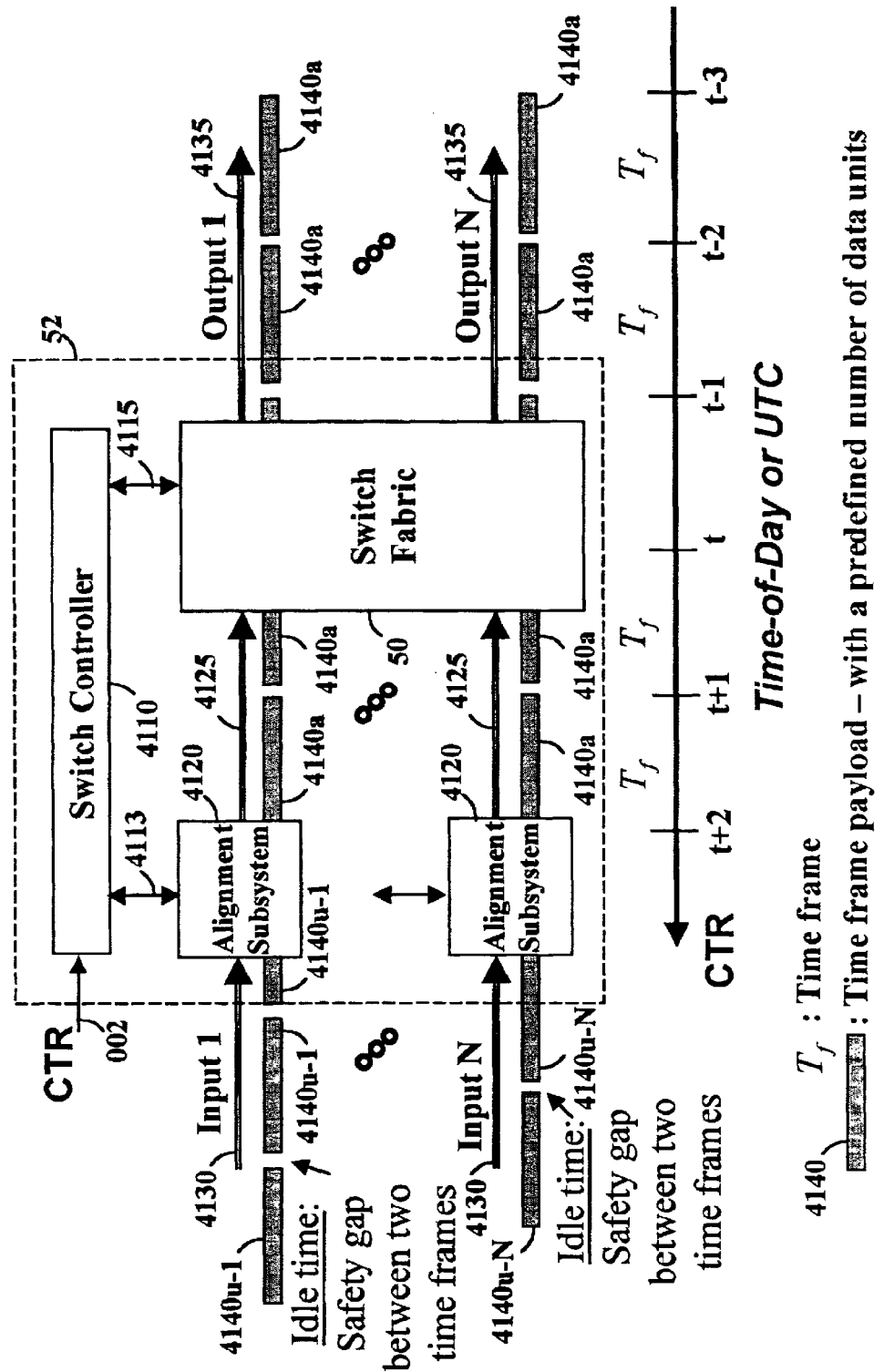
FIG. 41 is a pictorial representation of the alignment principle wherein unaligned time frames on all the inputs are aligned to the common time reference prior to being switched.

The alignment principle is further exemplified in FIG. 41. Time frames received on the input links 4130 are not aligned with the CTR. Each time frame contains a payload 4140; an idle time acts as a safety gap separating the payloads 4140 of adjacent time frames. The payloads 4140u of the time frames on the input links 4130 are not aligned with the CTR. Time frame payloads received from different input links 4130 are not necessarily aligned among themselves (see for example 4140u-1 and 4140u-N in FIG. 41).

An alignment subsystem 4120 coupled with each input link 4130 delays incoming, unaligned time frame payloads 4140u such that time frame payloads 4140a are aligned upon exiting the alignment subsystem 4120. Time frame payloads 4140a on all the inputs 4125 of the switch fabric 50 are aligned to the CTR. Time frame payloads 4140a switched to the outputs 4135 are all aligned to the CTR.

Figure 20:
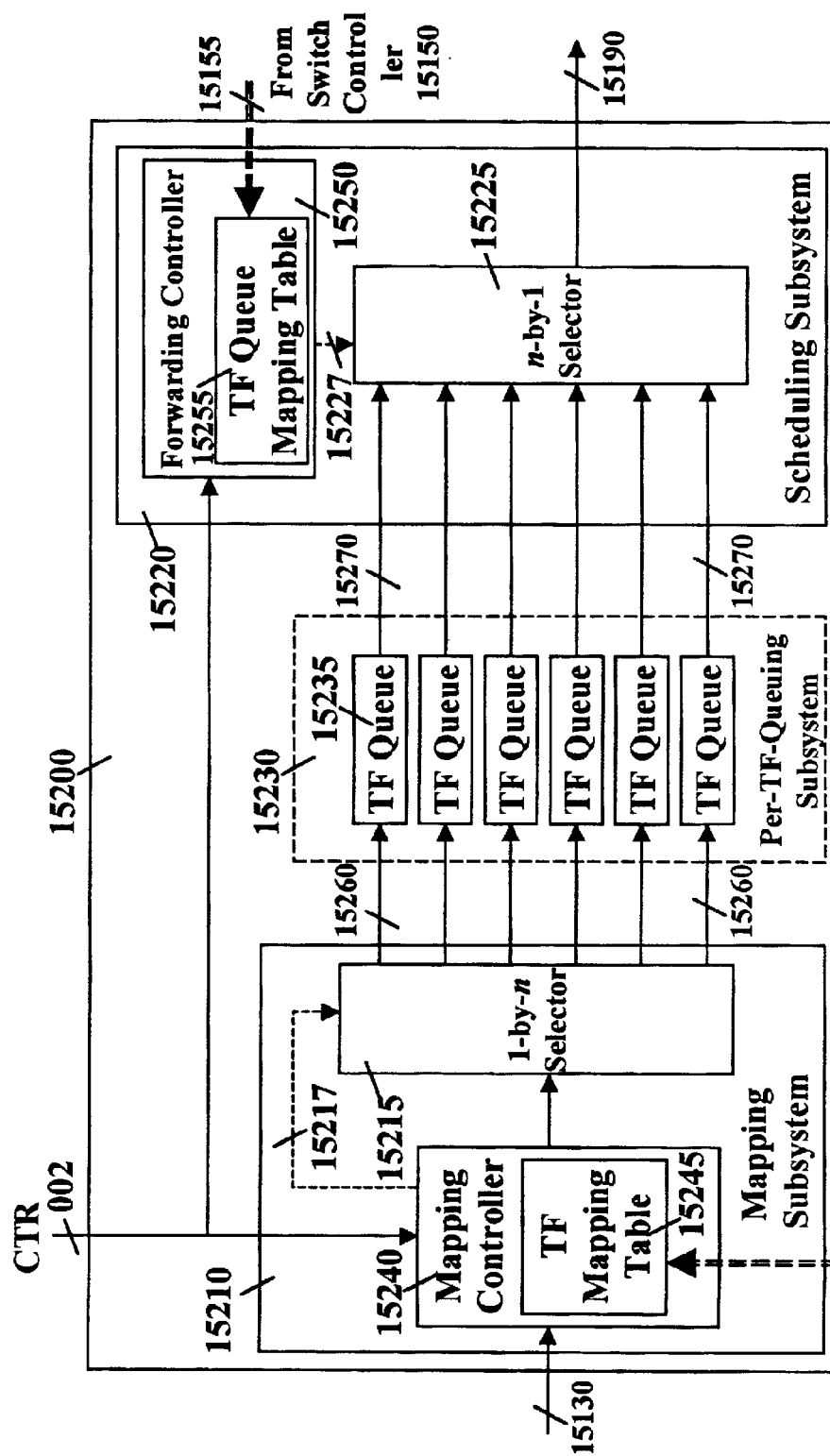
FIG. 20 is an architecture of a possible implementation of a mapping and alignment subsystem comprising a mapping subsystem responsive to the CTR, a per-TF-queuing subsystem, and a scheduling subsystem responsive to the CTR.

FIG. 20 shows the block diagram of a possible embodiment of mapping & alignment subsystem 15200 composed of three main modules: a mapping subsystem 15210, a per-TF (time frame) queuing subsystem 15230, and a scheduling subsystem 15220.

Data units received through the input 15130 of the mapping & alignment subsystem 15200 are processed by the mapping subsystem 15210 that, responsive to the CTR signal 002 and the time frame header control information 15010 information (see FIG. 18), selects the data line 15260 on which the data units are to be moved to the per-TF-queuing subsystem 15230. The data line 15260 through which the per-TF-queuing subsystem 15230 receives data units determines the TF queue 15235 within the per-TF-queuing subsystem 15230 in which the data units are stored.

The scheduling subsystem 15220 in FIG. 20, responsive to the CTR signal 002, determines the data line 15270 from which data units should be retrieved from the per-TF-queuing subsystem 15230 for being forwarded on the respective output 15190. The data line 15270 through which the scheduling subsystem 15220 retrieves data units determines the TF queue 15235 within the per-TF-queuing subsystem 15230 from which the data units are retrieved.

As shown in FIG. 20, the mapping subsystem 15210 further comprises a mapping controller 15240 responsive to the CTR signal 002 and to a TF mapping table 15245, and a 1-by-n selector 15215 responsive to a control signal 15217 from the mapping controller 15240.

The mapping controller 15240 is responsible for determining the time frame to which each data unit received from its respective input 15130 belongs. The time frame to which a data unit belongs is determined based on the CTR time frame during which the data unit is received and the propagation delay on the link 15120 in FIG. 19 on which the data unit has traveled. In an alternative embodiment, the time frame to which a data unit belongs is determined based on the information contained in the TF's header control information 15010. In a possible embodiment, the delimiter 15030 is used to discriminate between data units belonging to different time frames. The label 15040 is also used to determine the time frame to which data units belong.

Once a first selected time frame, according to the respective link's UTR, to which a data unit belongs is determined, the mapping controller 15240 in FIG. 20, responsive to the information contained in the TF mapping table 15245, determines a second selected time frame, as defined by the CTR, during which the data units belonging to the first time frame are to be switched. The mapping controller 15240 programs the 1-by-n selector 15215 through the control signal 15217 to select the data line 15260 coupled with the TF queue 15235 associated to the second time frame.

As shown in FIG. 20, the TF mapping table 15245 is downloaded 157 by the switch controller 15150 (see FIG.

19A) that centrally computes the TF mapping table 15245 for all the input channels 15130 guaranteeing that time frames received from different input channels 15130 and destined to the same output channel 15180 are not mapped onto the same time frame for switching. The TF mapping table 15245 computation also ensures that time frames that are to be switched along incompatible input/output connections through the switch fabric 15140 (when the switch fabric 15140 is a blocking one) are not mapped onto the same time frame for switching.

The TF mapping table 15245 in FIG. 20 is changed at the fractional lambda pipe control level, i.e., each time a fractional lambda pipe is set up or torn down through the respective time driven switch. The TF mapping follows a predefined pattern; in a possible embodiment, such mapping repeats each time cycle or each super cycle.

Figure 21:
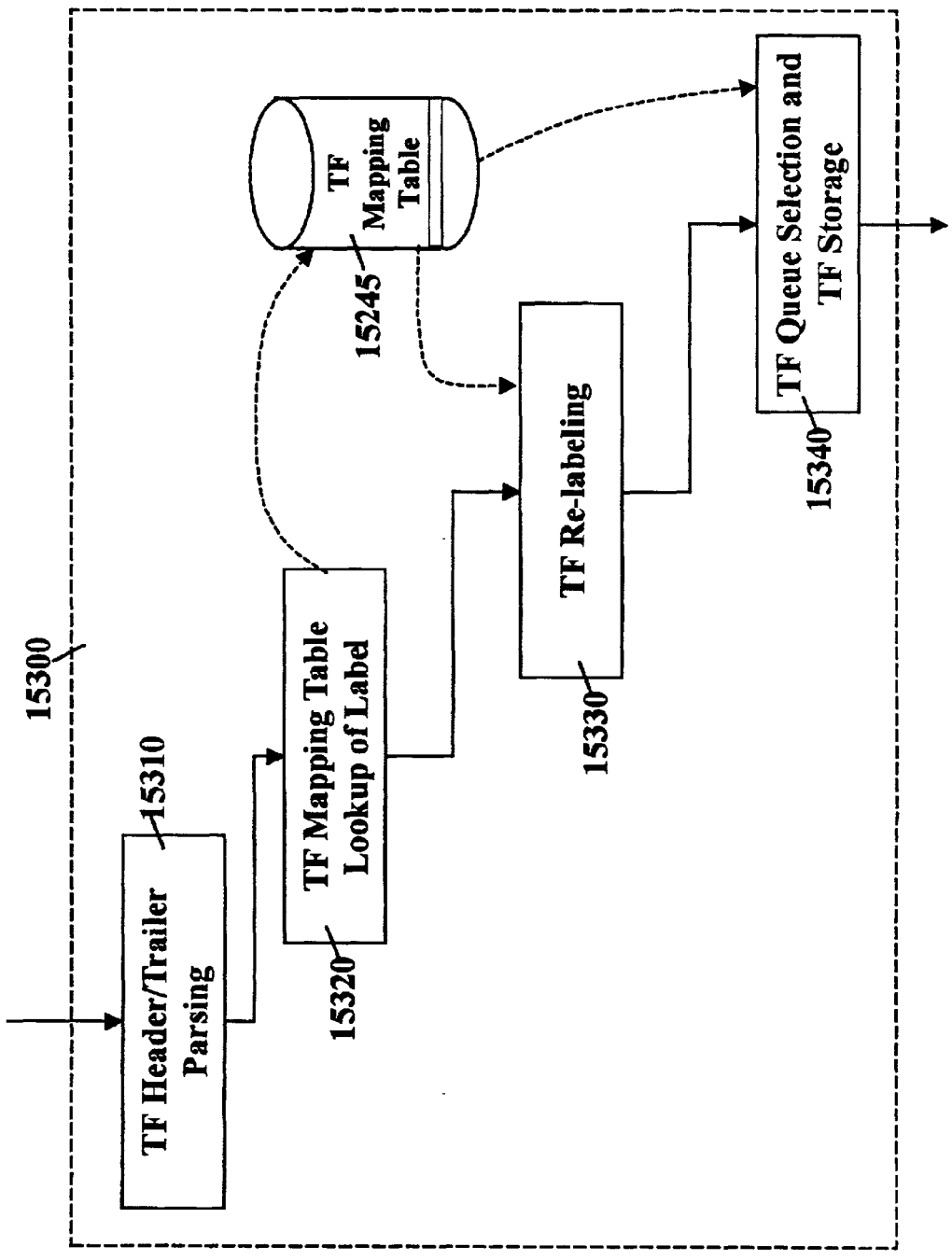
FIG. 21 is a diagram describing the operation of the mapping controller.

FIG. 21 shows the flow chart 15300 of the operation of the mapping controller 15240 in FIG. 20. As shown in FIG. 21, the mapping controller 15240 first parses 15310 at least one of the header control information 15010 and trailer control information 15020 (see FIG. 18) of a selected time frame. In a possible embodiment, this operation 15310 deploys the delimiter 15030 within the header control information to delineate the beginning of the time frame 15060, and hence of the header control information 15010.

Once the label 15040 within the TF header control information 15010 is located, the mapping controller 15240 looks it up 15320 in the TF mapping table 15245. In a possible embodiment, the label 15040 (in FIG. 18B) value can be used as an index in the table. At completion of the lookup operation 15320, the mapping controller 15240 has all the information needed to handle (i.e., to route, switch and forward) the respective time frame.

In an embodiment in which the label field 15040 in FIG. 18B contains a local identifier, the TF mapping table 15245 contains the new label value to be used for the forwarded time frame. As shown in step 15330, the mapping controller 15240 changes the label value to the one contained in the TF mapping table 15245 entry associated with the looked-up label value.

In the next step 15340, the mapping controller 15240 in FIG. 20 selects the TF queue 15235 within the per-TF-queuing subsystem 15230 in which the time frame is to be stored while waiting to be switched and transmitted. The TF queue 15235 is chosen based on the mapping information contained in the respective entry of the TF mapping table 15245. In a possible embodiment, the TF mapping table 15245 entry corresponding to a first time frame's label 15040 value contains the identity of a second time frame or a first plurality of time frames during which the data units belonging to the first time frame are to be switched and forwarded. The mapping controller 15240 stores the data units of the first time frame, together with the time frame header control information 15010 and trailer control information 15020 in the TF queue 15235 associated to the second time frame or associated to a selected one of the time frames of the first plurality of time frames.

In a possible embodiment, the TF header control information 15010 in FIG. 18B does not contain a label field 15040 and the lookup in the TF mapping table 15245 is based on the UTC time of arrival of the received time frame.

The scheduling subsystem 15220 in FIG. 20 further comprises a forwarding controller 15250 responsive to the CTR signal 002 and to a TF queue mapping table 15255, and a 1-by-n selector 15225 responsive to a control signal 15227 from the forwarding controller 15250.

The forwarding controller 15250 is responsible for determining the TF queue 15235 within the per-TF-queuing subsystem 15230 from which data units are to be retrieved for switching and transmission during each time frame, as defined by the CTR. Through the 1-by-n selector 15225 controlled via the control signal 15227, the forwarding controller 15250 responsive to the CTR signal 002 and the TF queue mapping table 15255, determines the TF queue 15235 to be used. The TF queue mapping table 15255 contains, for each CTR time frame, the TF queue 15235 from which data units should be retrieved for transmission on the data line 15190 which, as shown in FIG. 19A, is connected to the switch fabric 15140.

As shown in FIG. 20, the TF queue mapping table 15255 is downloaded 15155 by the switch controller 15150 which centrally computes the TF queue mapping table 15245 for all the input channels 15130 guaranteeing that time frames received from different input channels 15130 and destined to the same output channel 15180 are not mapped onto the same time frame for switching. The TF queue mapping table 15255 computation also ensures that time frames that are to be switched along incompatible input/output connections through the switch fabric 15140 (when the switch fabric 15140 is a blocking one) are not mapped onto the same time frame for switching.

In a possible embodiment, the TF queue mapping table 15255 is changed at the fractional lambda pipe control level, i.e., each time a fractional lambda pipe is set up or torn down through the respective time driven switch 15100. The TF queue mapping follows a predefined pattern; in a possible embodiment, such mapping repeats each time cycle or super cycle.

Figure 22:
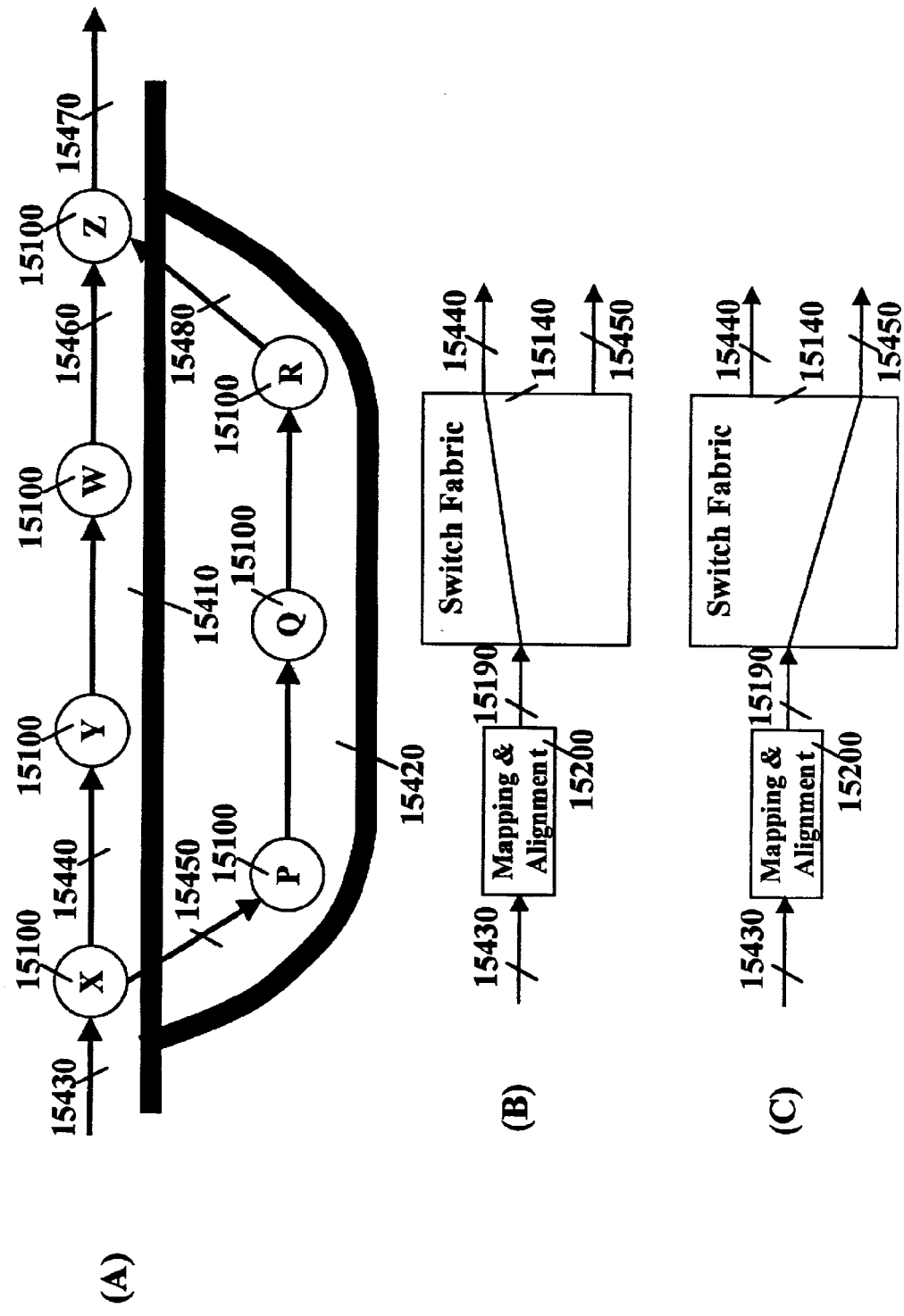
FIG. 22A shows an example of a primary fractional lambda pipe and a protection fractional lambda pipe over an alternate path.
FIG. 22B shows a configuration of the switch fabric of a possible embodiment of pipe switch node when deploying the primary fractional lambda pipe.
FIG. 22C shows a configuration of the switch fabric of a possible embodiment of pipe switch node when deploying the protection fractional lambda pipe.

Protection and Restoration Methods with Time Frame Labels and Common Time Reference FIG. 22A shows a protection scenario in which a primary fractional lambda pipe (FLP) 15410 is active across the time driven switches 15100 X, Y. W, and Z. A protection FLP 15420 is also set up between time driven switches 15100 X and Z, and across P, Q, and R.

In a possible embodiment of 1:1 protection, when all the links, channels, and nodes 15100 traversed by the primary FLP 15410 are operating properly, X forwards to Y data units traveling through the primary FLP 15410, and Z receives from W data units traveling through the primary FLP 15410. When at least one of the links, channels, and nodes 15100 traversed by the primary FLP 15410 is faulty, X forwards to P on the protection FLP 15420 data units traveling through the primary FLP 15410, and Z will receive such data units from R. As a result, data units flowing through the primary FLP 15410 are able to reach their intended destination even though outages are being experienced on the path of the FLP 15410.

1:1 protection can be realized in a plurality of ways. The following of this disclosure describes some of these ways that benefit from the presence of the label field 15040 in the TF header control information 15010.

In a possible embodiment, the schedule for the protection FLP 15420 is set up at the same time or after the schedule for the primary FLP 15410. The schedule for the protection FLP 15420 is set up in the pipe switch node X, in the traversed nodes P, Q, and R, and in the pipe merge node Z.

FIG. 22B shows the switch fabric 15140 input/output connection scheduled during the plurality of time frames associated with the primary FLP 15410 in the pipe switch node X. FIG. 22C shows the switch fabric 15140 input/output connection scheduled during the plurality of time frames associated to the protection FLP 15420 in the pipe switch node X.

Figure 23:
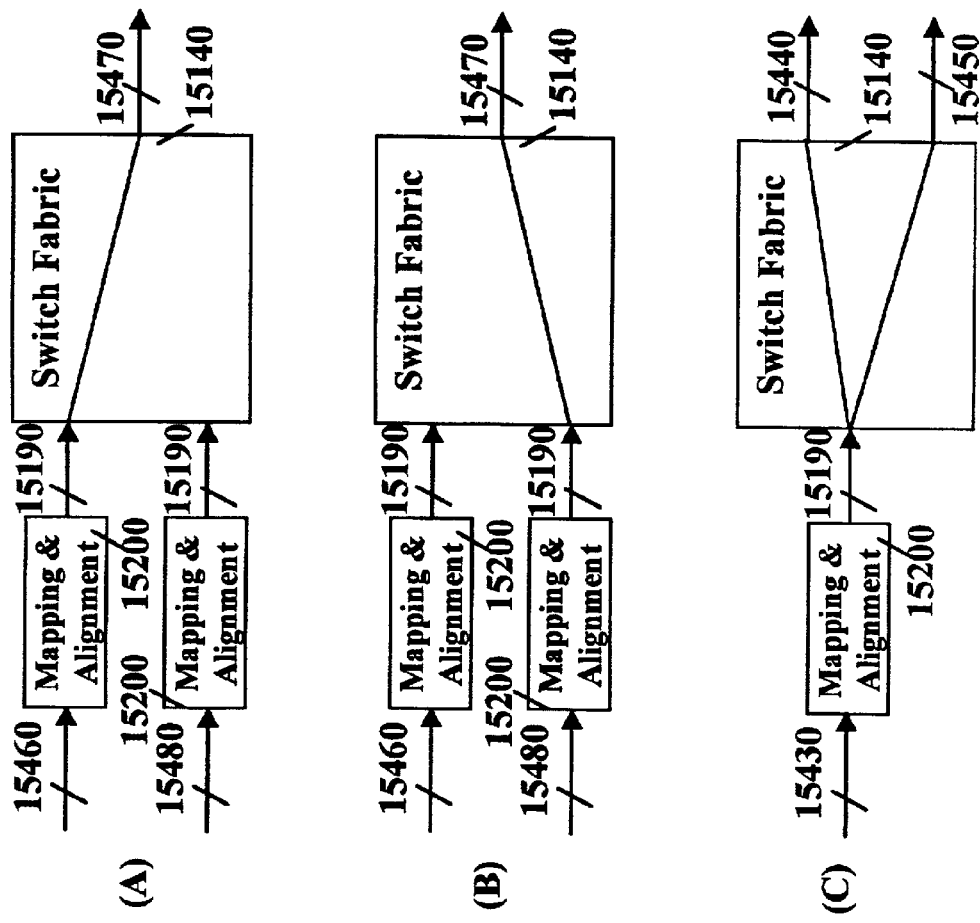
FIG. 23A shows a configuration of the switch fabric of a possible embodiment of pipe merge node when deploying the primary fractional lambda pipe.
FIG. 23B shows a configuration of the switch fabric of a possible embodiment of a pipe merge node when deploying the protection fractional lambda pipe.
FIG. 23C shows a configuration of the switch fabric of a possible embodiment of a pipe switch node when deploying at least one of the primary fractional lambda pipe and the protection fractional lambda pipe.

FIG. 23A shows the switch fabric 15140 input/output connection scheduled during the plurality of time frames associated to the primary FLP 15410 in the pipe merge node Z. In a possible embodiment, the plurality of time frames associated to the primary FLP 15410 in the pipe switch node X is the same as the plurality of time frames associated to the protection FLP 15420. In this case, both the input/output connection depicted in FIG. 22B and the input/output connection depicted in FIG. 22C are scheduled and possible during the same time frames. The switch controller 15150 (see FIG. 19A) of the pipe switch time driven switch 15100, for example X in the scenario depicted in FIG. 22A, uses the input/output connection in FIG. 22B as long as the primary FLP 15410 is fully operational. In the presence of a fault in at least one of the links, channels, and nodes 15100 traversed by the primary FLP 15410, the switch controller 15150 of the pipe switch time driven switch 15100, for example X in the scenario depicted in FIG. 22A, switches to the input/output connection depicted in FIG. 22C during the plurality of time frames reserved to the primary FLP 15410, which coincide with the time frames reserved to the protection FLP 15420.

FIG. 23B shows the switch fabric 15140 input/output connection scheduled during the plurality of time frames associated with the protection FLP 15420 in the pipe merge node Z. In the preferred embodiment, the plurality of time frames associated with the primary FLP 15410 in the pipe merge node Z is the same as the plurality of time frames associated with the protection FLP 15420. In this case, both the input/output connection depicted in FIG. 23A and the input/output connection depicted in FIG. 23B are scheduled and possible during the same time frames. The switch controller 15150 (see FIG. 19A) of the pipe merge time driven switch 15100, for example Z in the scenario depicted in FIG. 22A, uses the input/output connection in FIG. 23A as long as the primary FLP 15410 is fully operational. In the presence of a fault in at least one of the links, channels, and nodes 15100 traversed by the primary FLP 15410, the switch controller 15150 of the pipe merge time driven switch 15100, for example Z in the scenario depicted in FIG. 22A, switches to the input/output connection depicted in FIG. 23B during the plurality of time frames reserved to the primary FLP 15410, which coincides with the time frames reserved to the protection FLP 15420.

The TF mapping table 15245 in the mapping & alignment subsystem 15200 of the input channel 15460 on which the primary FLP 15410 is routed provides a mapping between each of the time frames associated to the primary FLP 15410 on its respective input channel 15460 and the respective time frame associated to the primary FLP 15410. During such time frame the input/output connection in FIG. 23A is realized and the respective data units are forwarded on the output channel 15470. The TF mapping table 15245 in the mapping & alignment subsystem 15200 of the input channel 15480 on which the protection FLP 15420 is routed provides a mapping between each of the time frames associated to the protection FLP 15420 on its respective input channel 15480 and the respective time frame associated to the protection FLP 15420 during which the input/output connection in FIG. 23B is realized. The respective time frame is the same reserved for the primary FLP 15410 for transmission of the respective data units on the output channel 15470.

The described combined operation of the pipe switch node X and the pipe merge node Z realizes 1:1 protection of the traffic carried by the primary FLP 15410 on the protection FLP 15420. In this mode of operation the mapping & alignment subsystems 15200 of both the input channel 15460 on which the primary FLP 15410 is routed and input channel 15480 on which the protection FLP 15420 is routed are essential. In a scenario in which the plurality of time frames associated to the primary FLP 15410 in the pipe switch node X is the same as the plurality of time frames associated to the protection FLP 15420, and the propagation delay, measured in time frames, between the pipe switch node X and the pipe merge node Z through the primary FLP 15410 and the protection FLP 15420 is not the same.

the plurality of time frames associated to the primary FLP 15410 on its respective input channel 15460 is different from the plurality of time frames associated to the protection FLP 15420 on its respective input channel 15480. However, since only one set of time frames is reserved for the primary FLP 15410 on the output channel 15470, the input/output connections shown in FIG. 23A and FIG. 23B must be scheduled during the same time frames, and the proper mapping must be ensured for data units flowing through both the primary FLP 15410 and the protection FLP 15420.

In an alternative embodiment, the plurality of time frames associated with the primary FLP 15410 for switching and forwarding in the pipe switch node X is different from the plurality of time frames associated to the protection FLP 15420 for switching and forwarding in the pipe switch node X. In this case, the input/output connection depicted in FIG. 22B and the input/output connection depicted in FIG. 22C are scheduled and possible during different sets of time frames. The switch controller 15150 (depicted in FIG. 19A) of the pipe switch time driven switch 15100, for example X in the scenario depicted in FIG. 22A, uses the input/output connection in FIG. 22B during the time frames reserved to the primary FLP 15410 as long as the primary FLP 15410 is fully operational. In the presence of a fault in at least one of the links, channels, and nodes 15100 traversed by the primary FLP 15410, the switch controller 15150 of the pipe switch time driven switch 15100, for example X in the scenario depicted in FIG. 22A, modifies the TF mapping table 15245 of the mapping and alignment subsystem 15200 in FIG. 20 coupled with the input channel 15430 on which the primary FLP 15410 is set up. The modified TF mapping table 15245 maps the incoming time frames carrying data units of the primary FLP 15410 onto the CTR time frames during which the input/output connection depicted in FIG. 22C is imposed on the switch fabric 15140. As a result, the data units flowing on the primary FLP 15410 exit the pipe switch node X on the link 15450 towards node P during the time frames reserved for the protection FLP 15420, i.e., the data units exit on the protection FLP 15420.

In a possible embodiment, protection requires the TF queue mapping table 15255 within the forwarding controller 15250 in FIG. 20 to be modified in at least one of the pipe switch node X and the pipe merge node Z when switching from the primary FLP 15410 to the protection FLP 15420.

The operation of the pipe switch node X and the pipe merge node Z must be coordinated so that they concurrently use the input/output connections depicted in FIG. 22B and FIG. 23A respectively during normal operation, and they concurrently use the input/output connections depicted in FIG. 22C and FIG. 23B respectively during protection. In a possible embodiment, a control protocol is used between the pipe switch node X and the pipe merge node Z to coordinate the deployment of either one of the two input/output connections mentioned above.

In an alternative embodiment, a label 15040 identifying an "empty time frame" is used by the pipe switch node X for the time frames associated to the protection FLP 15420. The mapping & alignment subsystem 15200 associated to the input channel 15480 of the pipe merge node Z (see FIG. 23A and FIG. 23B) does not forward through the switch fabric 15140 "empty time frames". When the pipe switch node X transmits data units belonging to the primary FLP 15410 on the protection FLP 15420, the mapping & alignment subsystem 15200 associated with the input channel 15480 of the pipe merge node Z receives time frames whose label field 15040 does not carry the value indicating an "empty time frame".

In a possible embodiment, a value in the label field 15040 of the control header 15010 is associated with the primary FLP 15410 and a different value is associated with the protection FLP 15420. The switch controller 15150 of the pipe merge node Z instructs the switch fabric 15140 to concurrently realize both the input/output connections depicted in FIG. 23A and FIG. 23B during the time frames reserved to the primary FLP 15410 for switching and forwarding on the output channel 15470. During protection operation, the mapping & alignment subsystem 15200 associated to the input channel 15460—on which the primary FLP 15410 is set up—of the pipe merge node Z does not receive time frames whose label field 15040 indicates the primary FLP 15410 and consequently does not forward data units through the switch fabric. Instead, the mapping & alignment subsystem 15200 associated with the input channel 15480—on which the protection FLP 15420 is set up—of the pipe merge node Z receives time frames whose label field 15040 indicates the protection FLP 15420 and consequently it forwards the respective data units through the switch fabric.

In an alternative embodiment, the switch controller 15150 of the pipe merge node Z instructs the switch fabric 15140 to realize the input/output connection depicted in FIG. 23A during the time frames reserved to the primary FLP 15410 for switching and forwarding on the output channel 15470. During protection operation, the mapping & alignment subsystem 15200 associated with the input channel 15480—on which the protection FLP 15420 is set up—of the pipe merge node Z receives time frames whose label field 15040 indicates the protection FLP 15420. As the mapping & alignment subsystem 15200 associated with the input channel 15480 receives the first time frame whose label field 15040 does not carry the value indicating an "empty time frame", it signals to the switch controller 15150 to change the switch fabric 15040 configuration to realize the input/output connection depicted in FIG. 23B during the time frames reserved to the protection FLP 15420 for switching—i.e., the time frames reserved to the primary FLP 15410 for forwarding on the output channel 15470.

FIG. 23C shows a switch fabric 15140 configuration that can be used within the pipe switch node X during the time frames reserved to the primary FLP 15410 in order to implement 1+1 protection. In 1+1 protection the pipe switch node X forwards traffic flowing through the primary FLP 15410 also on the protection FLP 15420. This can be realized if the pipe switch time driven switch 15100 X provides multicast services. During normal operation, the pipe merge node Z receives data units flowing through the primary FLP 15410 from the two input channels 15460 and 15480. Only one of the mapping & alignment subsystems 15200 associated with the two said input channels forwards data units flowing through the primary FLP 15410 through the switch fabric 15140 which is configured accordingly to the respective configuration among those depicted in FIG. 23A and FIG. 23B.

As a fault occurs on the path of either the primary FLP 15410 or the protection FLP 15420, the mapping & alignment subsystem 15200 associated with the input channel on which the surviving FLP is set up forwards data units received during the time frames reserved to the surviving FLP. If the mapping & alignment subsystem 15200 forwarding data units during the protection operation is different from the one that was forwarding data units during the normal operation, the switch controller 15150 changes the switch fabric 15140 configuration (to one of the configurations shown in FIG. 23A and FIG. 23B) accordingly.

Figure 24:
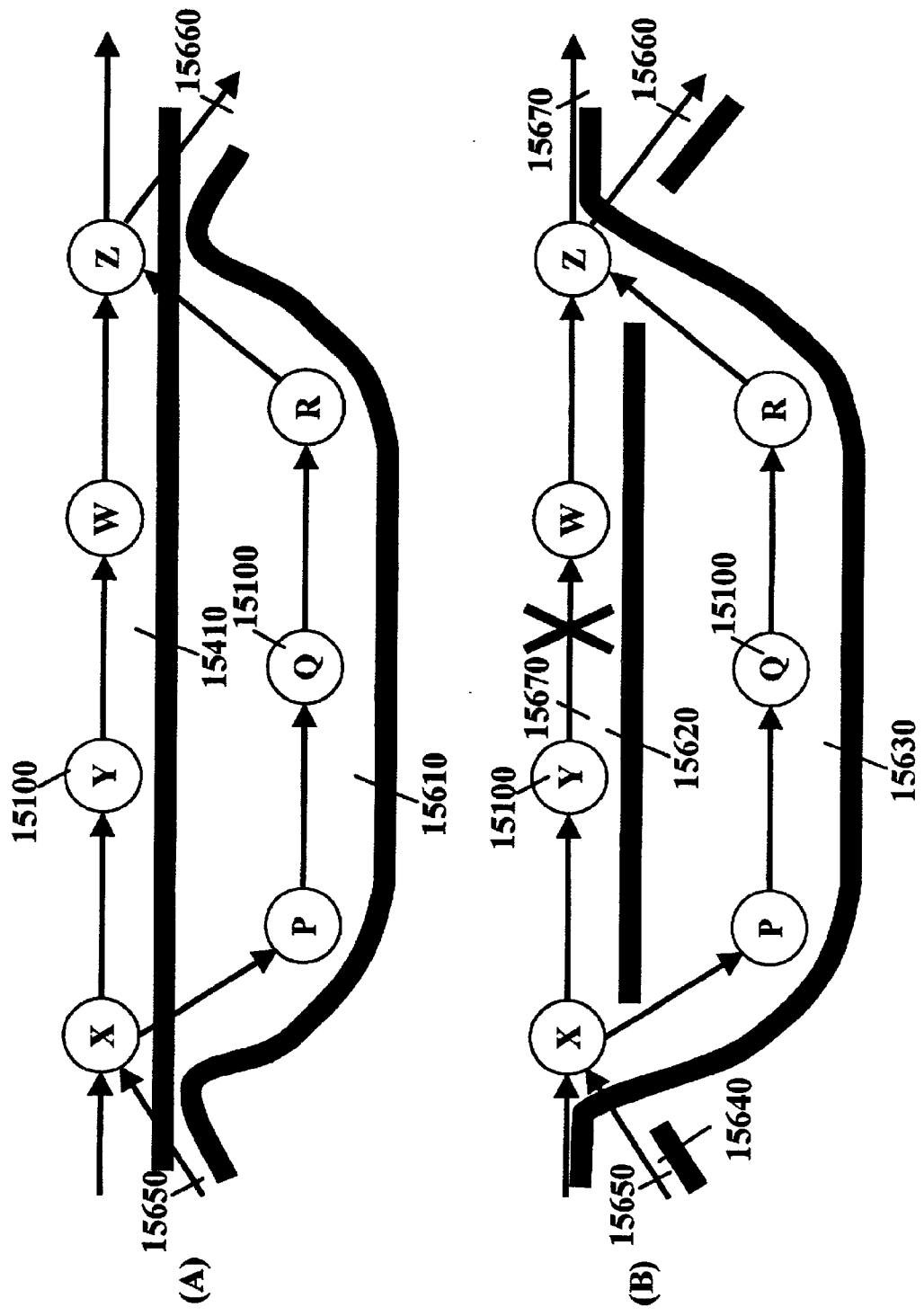
FIG. 24A shows an example of a primary fractional lambda pipe and protection fractional lambda pipe over an alternate path, wherein the protection fractional lambda pipe carries low priority traffic when the primary fractional lambda pipe is operating normally.
FIG. 24B shows an example of a primary fractional lambda pipe and protection fractional lambda pipe over an alternate path, wherein, upon the failure of one of the communications links on the path of the primary fractional lambda pipe, the protection fractional lambda pipe carries the traffic that would normally be carried by the primary fractional lambda pipe.

Availability of a label 15040 in the TF header control information 15010 enables low priority traffic to be carried on a protection FLP. FIG. 24A shows a scenario in which a FLP 15610 is set up to provide protection for a primary FLP 15410 between a pipe switch node X and a pipe merge node Z. During normal network operation, i.e., while all the links, channels and nodes 15100 on the path of the primary FLP 15410 are working properly, the protection FLP 15610 is used to carry lower priority traffic that is received by the pipe switch node X from channel 15650 and is forwarded by the pipe merge node Z on channel 15660.

As shown in FIG. 24B, in case of fault of at least one of the links, channels, and nodes 15100 on the path of the primary FLP 15410 (e.g., link 15670 in FIG. 24B), the pipe switch node X forwards on the protection FLP 15610 the traffic originally flowing on the primary FLP 15410. At this point, the pipe merging node Z begins receiving data units to be routed on the output channel 16570, instead of the output channel 15660, from the protection FLP 15630.

The time driven switches 15100 on the path of the primary FLP 15410, on the path of the protection FLP 15610 during normal operation, and on the path of the protection FLP 15630 during protection receive, align, route, switch, and forward data units according to the methods described in this disclosure. In a possible embodiment, alignment, routing, switching, and forwarding are based on information contained in the TF mapping tables 15245 and in the TF queue mapping tables 15255 depicted in FIG. 20. Coordination between the pipe switch node X and the pipe merge node Z is required in order to handle the switching of data units from the primary FLP 15410 to the protection FLP 15630. In a possible embodiment a control protocol is used between the pipe switch node X and the pipe merge node Z.

Lower priority data units flowing on the protection FLP 15610 during normal operation have a label 15040 value different from the one of data units carried on the protection FLP 15630 during protection. Consequently, in an alternative embodiment, the pipe merge node Z is able to handle data units received on the protection FLP 15610 during normal operation differently from those received on the protection FLP 15630 without explicit signaling between the pipe switch node X and the pipe merge node Z. The pipe switch node X and the pipe merge node Z operate based on the value of the label field 15040 (see FIG. 18B) in the TF header control information 15010 and the content of the TF mapping table 15245 and in the TF queue mapping table 15255 (both shown in FIG. 20).

Figure 25:
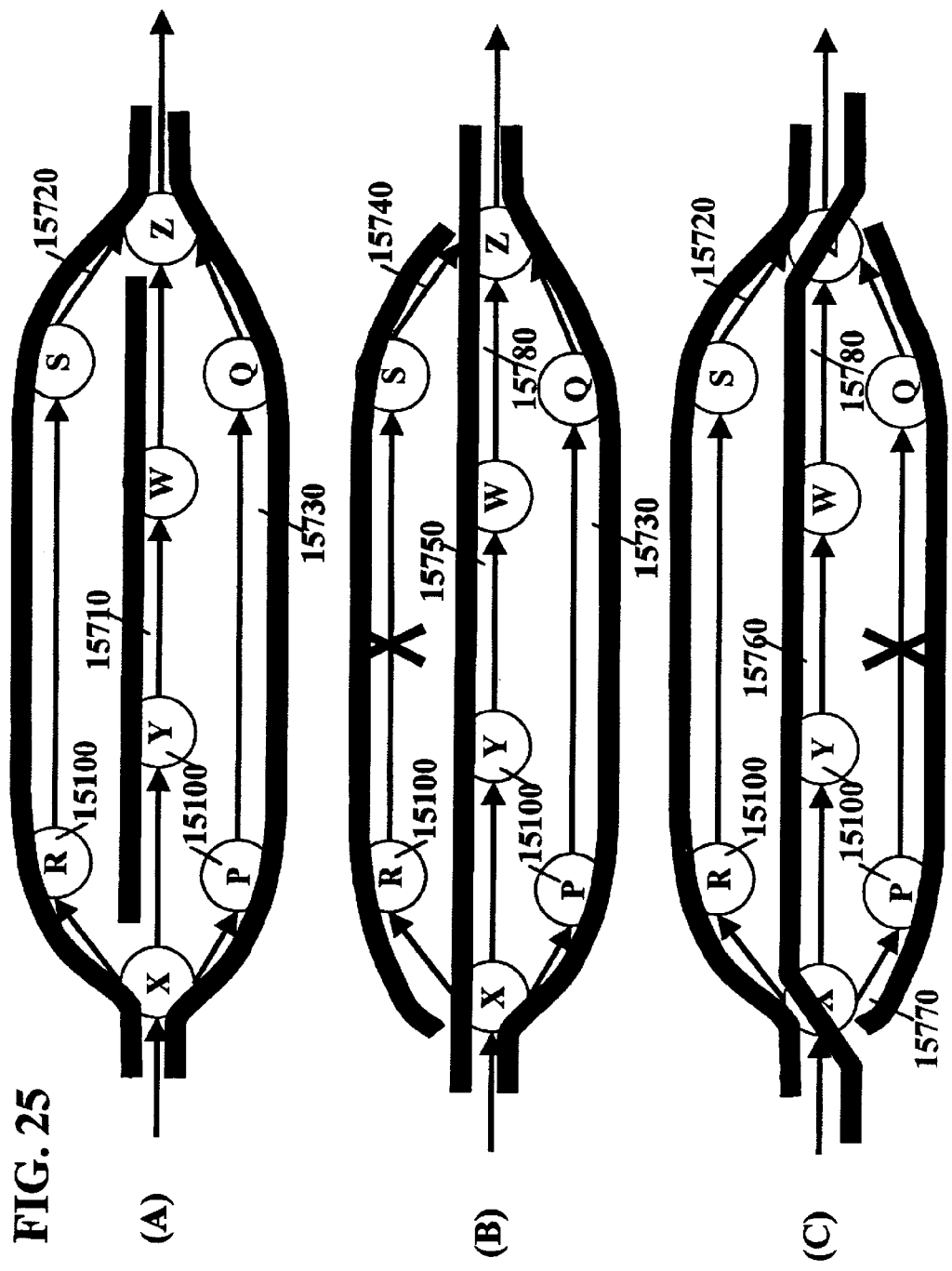
FIG. 25A shows an example of two primary fractional lambda pipes and one protection fractional lambda pipe over an alternate path, wherein the protection fractional lambda pipe provides shared protection for the two primary fractional lambda pipes.
FIG. 25B shows an example of two primary fractional lambda pipes and one protection fractional lambda pipe over an alternate path, wherein, upon the failure of one of the communications links on the path of the first primary fractional lambda pipe, the protection fractional lambda pipe carries the traffic that would normally be carried by the first primary fractional lambda pipe.
FIG. 25C shows an example of two primary fractional lambda pipes and one protection fractional lambda pipe over an alternate path, wherein, upon the failure of one of the communications links on the path of the second primary fractional lambda pipe, the protection fractional lambda pipe carries the traffic that would be normally carried by the second primary fractional lambda pipe.

FIG. 25 shows a scenario in which shared protection, or 1:N protection, is provided. In shared protection, one protection FLP is providing protection for at least one of a plurality of FLPs. In the example shown in FIG. 25A, a protection FLP 15710 (not carrying traffic during normal operation) provides protection for two primary FLPs 15720 and 15730 between the pipe switch node X and the pipe merge node Z.

As shown in FIG. 25B, when a fault on at least one of the links, channels, and nodes 15100 on the path of one 15740 of the primary FLPs, the pipe switch node X stops forwarding data units flowing on the faulty primary FLP 15740 and begins forwarding them on the protection FLP 15750. The pipe merge node Z receives data units from the protection FLP 15750 and forwards them on the path of the original primary FLP 15720.

Coordination between the pipe switch node X and the pipe merge node Z is required in order to handle the switching of data units from the primary FLP 15720 to the protection FLP 15750. In a possible embodiment a control protocol is used between the pipe switch node X and the pipe merge node Z.

In an alternative embodiment, a label 15040 identifying an "empty time frame" is used by the pipe switch node X for the time frames associated to the protection FLP 15710. The mapping & alignment subsystem 15200 associated to the input channel 15780 of the pipe merge node Z does not forward "empty time frames". through the switch fabric 15140 ""When the pipe switch node X transmits on the protection FLP 15750 data units belonging to the primary FLP 15720, the mapping & alignment subsystem 15200 associated to the input channel 15780 of the pipe merge node Z receives time frames whose label field 15040 does not carry the value indicating an "empty time frame" and properly handles the corresponding data units according to both their respective label 15040 and the information contained in both the TF mapping tables 15245 and in the TF queue mapping tables 15255 (depicted in FIG. 20).

In a possible embodiment, as the operation of the primary FLP 15720 is restored, the pipe switch node X resumes forwarding data units on it 15720 instead of forwarding them on the protection FLP 15710, thus returning to the scenario shown in FIG. 25A.

As shown in FIG. 25C, when a fault occurs on at least one of the links, channels, or nodes 15100 on the path of one 15770 of the primary FLPs, the pipe switch node X stops forwarding data units flowing on the faulty primary FLP 15770 and begins forwarding them on the protection FLP 15760. The pipe merge node Z receives data units from the protection FLP 15760 and forwards them on the path of the original primary FLP 15730.

Coordination between the pipe switch node X and the pipe merge node Z is required in order to handle switching of data units from the primary FLP 15730 to the protection FLP 15760. In a possible embodiment a control protocol is used between the pipe switch node X and the pipe merge node Z.

In an alternative embodiment, a label 15040 identifying an "empty time frame" is used by the pipe switch node X for the time frames associated with the protection FLP 15710 shown in FIG. 25A. The mapping & alignment subsystem 15200 associated with the input channel 15780 of the pipe merge node Z does not forward "empty time frames" through the switch fabric 15140"". When the pipe switch node X transmits data units belonging to the primary FLP 15730 on the protection FLP 15760, as shown in FIG. 25C, the mapping & alignment subsystem 15200 associated with the input channel 15780 of the pipe merge node Z receives time frames whose label field 15040 does not carry the value indicating an "empty time frame" and properly handles the corresponding data units according to their respective label 15040 and the information contained in both the TF mapping tables 15245 and in the TF queue mapping tables 15255 shown in FIG. 20.

In a possible embodiment, as the operation of the primary FLP 15730 is restored, the pipe switch node X resumes forwarding data units on it 15730 instead of forwarding them on the protection FLP 15710, thus returning to the scenario shown in FIG. 25A.

Data units flowing on the protection FLP 15750 during protection of the primary FLP 15720 as shown in FIG. 25B have a label 15040 value different from that of data units carried on the protection FLP 15760 during protection of the primary FLP 15730 as shown in FIG. 25C. Consequently, the pipe merge node Z is able to handle data units received on the protection FLP 15750 differently from those received on the protection FLP 15760 without explicit signaling between the pipe switch node X and the pipe merge node Z. The pipe switch node X and the pipe merge node Z operate based on the value of the label field 15040 in the TF header control information 15010 and the content of both the TF mapping table 15245 and in the TF queue mapping table 1525 shown in FIG. 20.

In an alternative embodiment, lower priority traffic can be carried over the protection FLP 15710 during normal operation according to the methods described above. When at least one of the links, channels, and nodes 15100 on the path of one of the primary FLPs 15720 and 15730 fails, the protection is started and lower priority traffic is discarded by the pipe switch node X.

Switching with Multiple Time References

A system is provided for managing data transfer of data units from a source to a destination. The transfer of the data units is provided during a time interval comprised of a plurality of predefined time frames. The system is further comprised of a plurality of communications switches. During normal operation a common time reference signal is coupled to each of the switches, and a time assignment controller assigns selected predefined time frames for transfer into and out from each of the respective switches responsive to the common time reference (CTR) signal. In a possible embodiment, the CTR signal is obtained from a dedicated CTR distribution system, such as at least one of the GPS (Global Positioning System), GLONASS (Global Navigation Satellite System), and Galileo.

In abnormal operating conditions one or more switches may fail to receive the CTR signal from a dedicated CTR distribution system, such as at least one of the GPS (Global Positioning System), GLONASS (Global Navigation Satellite System), and Galileo. In a possible embodiment, a switch devises the CTR signal from at least one of its neighboring switches.

A method is provided for the system to continue operating in the abnormal condition responsive to a local time reference (LTR). In a possible embodiment, the LTR is derived from an independently running local clock nominally providing a signal with the same frequency as the CTR signal. In an alternative embodiment, a switch synchronizes the frequency of its LTR signal to the frequency of the at least one of CTR signal and an LTR signal received from at least one of its neighboring switches.

Figure 26:
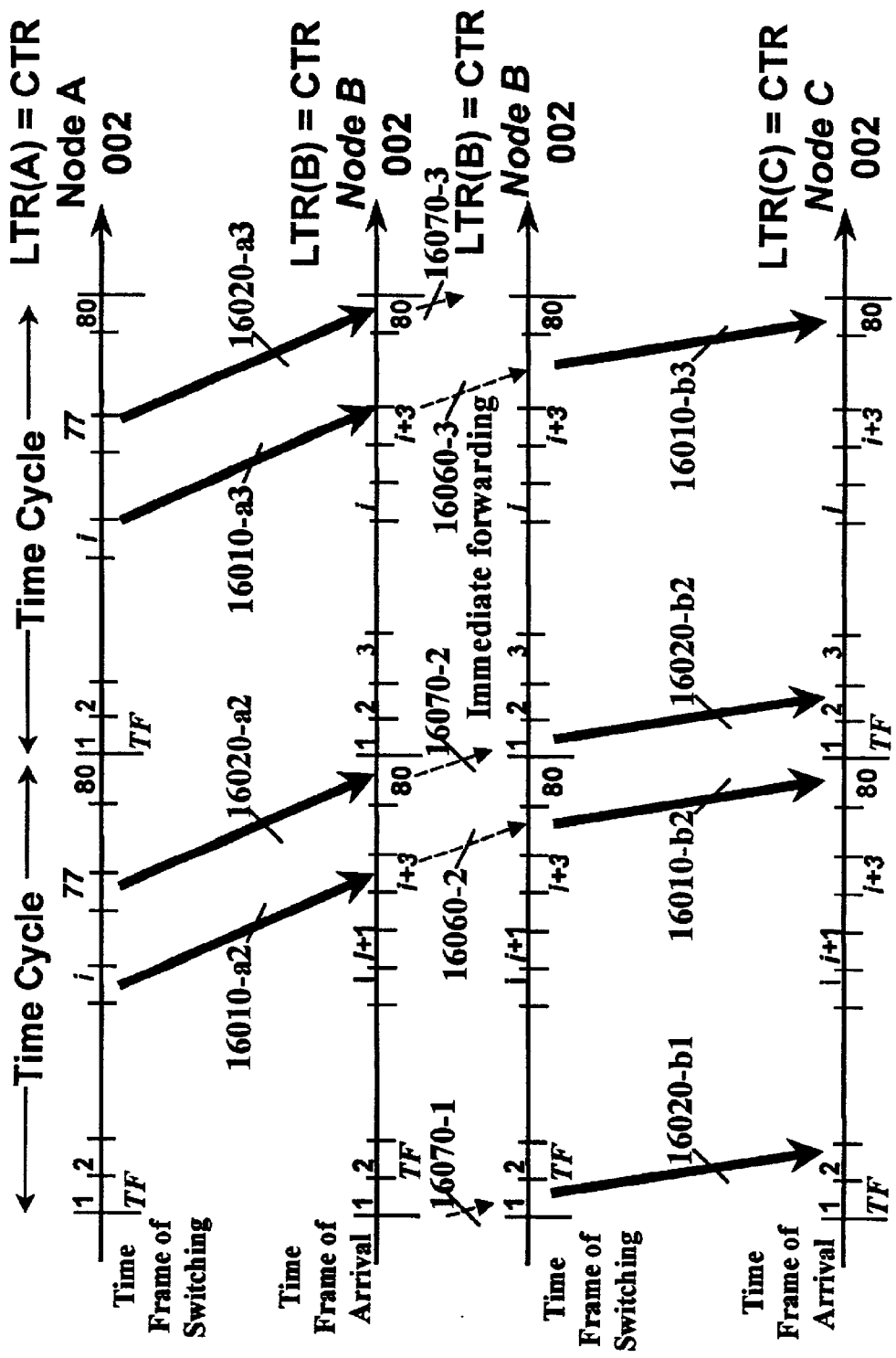
FIG. 26 is a timing diagram of the common time reference (CTR) on three nodes, wherein a first plurality of arrows shows the propagation of data units from the first node (Node A) to the second one (Node B), a second plurality of arrows shows the forwarding of data units within the second node (Node B), and a third plurality of arrows shows the propagation of data units from the second node (Node B) to the third node (Node C)

The normal operation of a possible embodiment of the system disclosed herein is provided by the timing diagrams depicted in FIG. 26. Three switches, A, B, and C, are coupled with the common time reference (CTR); the LTR of each switch coincides with the CTR, i.e., LTR(A)=LTR(B)= LTR(C)=CTR. As shown in FIG. 26, the common time reference (CTR) is aligned to UTC and divided in consecutive time frames. Consecutive time frames are grouped into time cycles. As shown in the example illustrated in FIG. 26, there are 80 time frames in each time cycle. For illustration purposes, the time frames within a time cycle are numbered 1 through 80.

Data units switched and transmitted during a predefined time frame—e.g., time frame i by switch A—reach switch B after a fixed and known time depending on the transmission and propagation delay on the link between switch A and switch B. In the example of FIG. 26, data units switched and transmitted by switch A in time frame i are received and buffered by switch B in time frame i+3, as shown by arrows 16010-*a*2 and 16010-*a*3. As shown in FIG. 26, switching and transmission of data units by switch A in time frame i is repeated in every time cycle.

In a possible embodiment, switch B performs immediate forwarding (i.e., it switches and transmits data units received in a time frame during the following time frame), as shown by arrows 16060-2, 16070-2, and 16060-3. As shown by arrows 16020-*b*1, 16010-*b*2, 16020-*b*2, and 16010-*b*3, data units switched and transmitted by node B during time frame j are received and buffered by node C during time frame j+1. The time frame delay between switching and transmission of data units by switch B and their reception by switch C depends on the propagation and transmission delay on the link between switch B and switch C.

Due to the fact that switches A, B, and C operate responsive to the same CTR and since propagation and transmission delay on the links between switches A, B, and C is constant, immediate forwarding is possible. As a consequence, the performance of the communications system comprising switches A, B, and C (e.g., the transfer time of data units through the system), is known in advance in a deterministic way.

In case of failure of at least one of the components of the system for the distribution of the CTR signal—such as for example the GPS antenna connected to the switch, the GPS receiver, reception of the GPS signal (due, for example, to atmospheric conditions or surrounding environment), a plurality of GPS satellites—the switch cannot receive the CTR signal from an external distribution system. In a possible embodiment of this invention, the switch operates responsive to a local time reference LTR generated locally, for example, via a clock having a nominal frequency equal to the frequency of the CTR signal.

Figure 27:
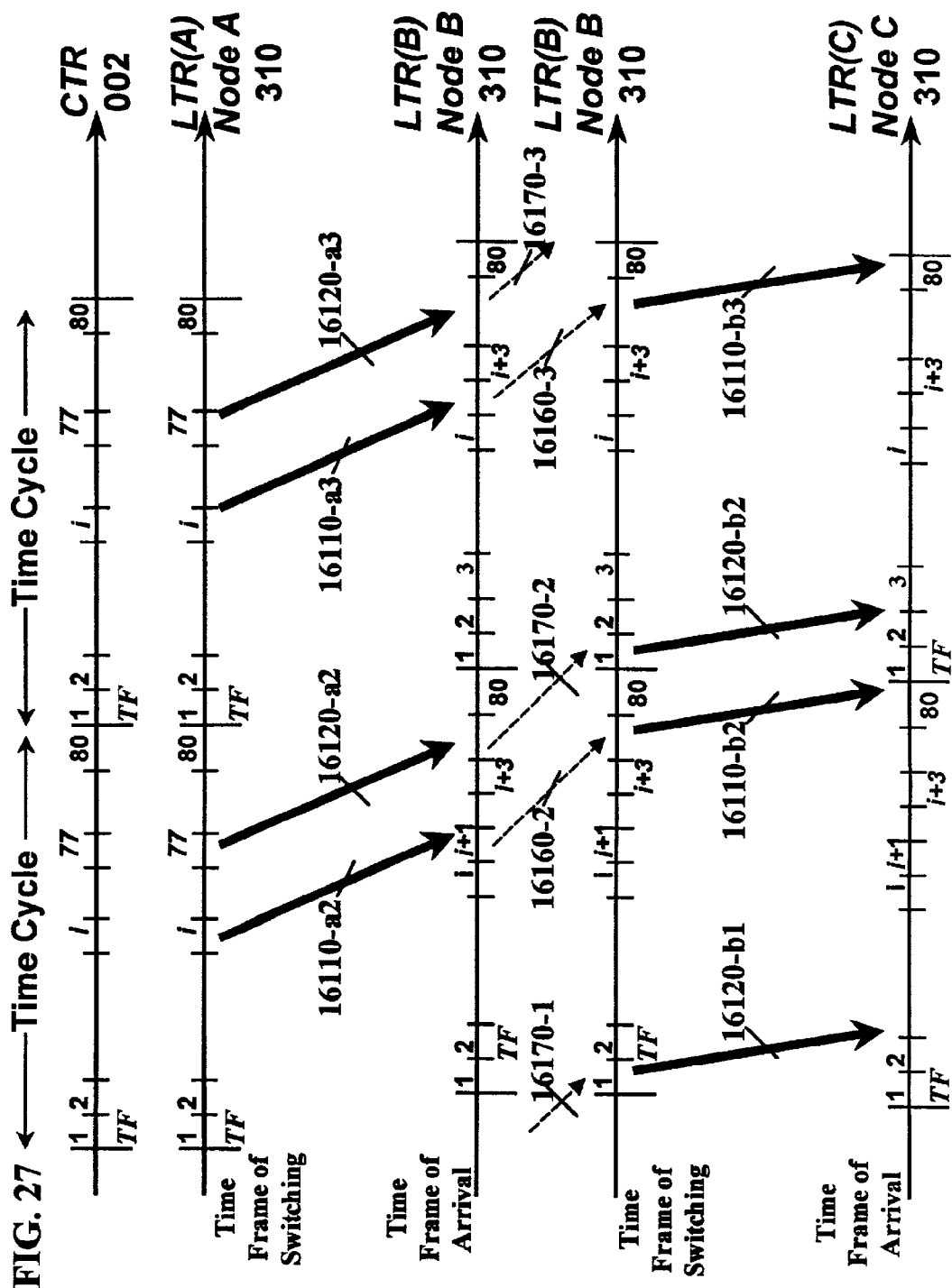
FIG. 27 is a timing diagram of the common time reference (CTR) and the local time reference (LTR) on three nodes, wherein a first plurality of arrows shows the propagation of data units from the first node (Node A) to the second one (Node B), a second plurality of arrows shows the forwarding of data units within the second node (Node B), and a third plurality of arrows shows the propagation of data units from the second node (Node B) to the third node (Node C)

The timing diagrams depicted in FIG. 27 show the operation of a communications system comprising three switches, A, B, and C, operating responsive to their respective LTR signal 310. In the example shown in FIG. 27, the frequency of the three LTR signals is synchronized, but the time cycle of each LTR is not aligned with the time cycles of the others. Moreover, the time cycle of the LTRs of node B and node C are not aligned with the time cycle of the CTR 002. The misalignment of the time cycles of different LTRs is due to the fact that the local clocks frequencies are not perfectly identical, so that the LTR signals generated by them drift as time elapses.

Data units switched and transmitted during a predefined LTR(A) time frame, e.g., LTR(A) time frame i, , reaches switch B from switch A after a fixed and known time depending on the transmission and propagation delay on the link between switch A and switch B. In the example of FIG. 27, data units switched and transmitted by switch A in LTR(A) time frame i are received and buffered by switch B in LTR(B) time frame i+1, as shown by arrows 16110-*a*2 and 16110-*a*3. As shown in FIG. 27, switching and transmission of data units by switch A in LTR(A) time frame i is repeated in every time cycle.

In a possible embodiment, switches keep the same switching and forwarding schedule they use when operating with CTR (see FIG. 26). Consequently, in the example depicted in FIG. 27, switch B switches and transmits data units in LTR(B) time frames 1 and i+4. In a possible embodiment, data units received from an input channel are stored in a buffer based on the CTR time frame to which they belong.

The CTR time frame to which data units belong is determined according to at least one of the methods described in the present disclosure. For example, when the CTR signal is present, the time of arrival of data units and the CTR signal can be used to determine the CTR time frame to which each data unit belongs. When the CTR signal is not present, at least one of a delimiter 15030 and a label 15040 comprised within the time frame 101 header control information 15010 can be used according to the methods described in this disclosure to determine the CTR time frame to which each data unit belongs.

The CTR time frame to which data units belong determines the buffer in which they are stored and the CTR time frame, during normal operation, and LTR time frame, during operation without CTR signal, during which they are going to be switched and forwarded. In the example depicted in FIG. 27, data units switched and forwarded by node A during LTR(A) time frame i are received by node B during LTR(B) i+1, as shown by arrow 16110-*a*2. Node B determines that such data units belong to the time frame supposed to be switched by the upstream node (switch A in the example in FIG. 27) during CTR time frame i, when normal CTR based operation is being performed. As a consequence, switch B determines that the said data units are to be switched and forwarded during LTR(B) time frame i+4, as shown by arrow 16160-2 and arrow 16110-*b*2.

Analogously, data units switched and forwarded during LTR(A) time frame 77 16120-*a*2 by switch A are buffered for a few time frames by node B 16170-3 and forwarded during LTR(B) time frame 1 16120-*b*2. In a possible embodiment, the schedule, i.e., the LTR time frame during which data units belonging to a specific time frame are to be switched and forwarded is periodic and repeats itself every time cycle and super cycle.

Due the different actual frequency of the local clocks deployed to generate the LTRs, the time cycle of the LTRs drift with respect to each other. This can be seen by comparing FIG. 27 and FIG. 28. In a possible interpretation of the example depicted in FIG. 28, the actual frequency of the clock of node A is lower than the one of the clock of node B. As a result LTR(B) drifts forward with respect to LTR(A) and data units received by node B are buffered longer, as may be seen by comparing arrow 16260-2 with arrow 16160-2. Also, as an effect of the drift between LTR(A) and LTR(B), data units switched and forwarded by node A during LTR(A) time frame 77 are received by node B during LTR(B) time frame 80 16210-*a*2, not during LTR(B) time frame i+1, as shown by arrow 16110-*a*2 in FIG. 27.

Figure 28:
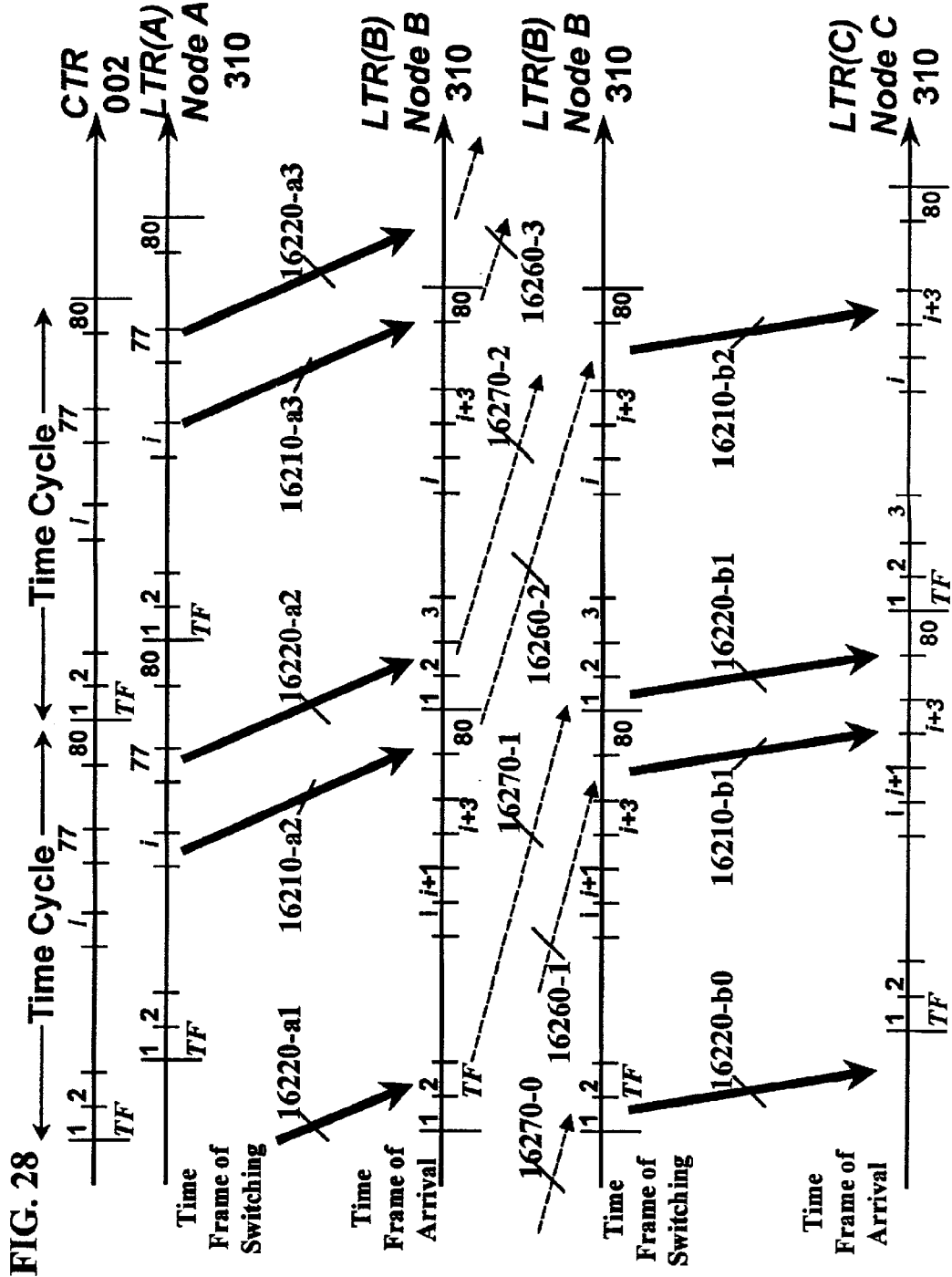
FIG. 28 is a timing diagram of the common time reference (CTR) and the local time reference (LTR) on three nodes, wherein a first plurality of arrows shows the propagation of data units from the first node (Node A) to the second one (Node B), a second plurality of arrows shows the forwarding of data units within the second node (Node B), and a third plurality of arrows shows the propagation of data units from the second node (Node B) to the third node (Node C)

In an alternative possible interpretation of the example depicted in FIG. 28, the actual frequency of the clock of node A is higher than the frequency of the clock generating LTR(B). As a result, the data units that in FIG. 27 are received by node B during LTR(B) time frame i+1 16110-*a*2 and switched and forwarded during LTR(B) time frame i+4 16110-*b*2 in FIG. 27, are now received during LTR(B) time frame 80 (following LTR(B) time frame i+4), and their switching and forwarding must be delayed until LTR(B) time frame i+4 in the following time cycle, as shown by 16260-2.

When switches A, B, and C do not operate responsive to the same CTR, immediate forwarding is not always possible. As the LTRs of the switches drift with respect to each other, the delay introduced by each switch on data units being switched and forwarded varies. Moreover, as it will be further described below, loss of data units can occur. However, due to the regular operation of switches and the high accuracy of currently commercially available clocks, the long term performance of a communications system operating according to the principles disclosed in this invention is very close to that of the system operating with the CTR available to all the switches. As a consequence, the performance of the communications system comprising switches A, B, and C (e.g., the transfer time of data units through the system), is not known in advance in a strictly deterministic way, but if the system is properly engineered it can be undistinguishable from the deterministic performance of a system operating with CTR.

The reminder of the disclosure describes possible embodiments of a system and method for switching data units according to the operation pictorially described by the timing diagrams in FIG. 26, FIG. 27, and FIG. 28.

Figure 29:
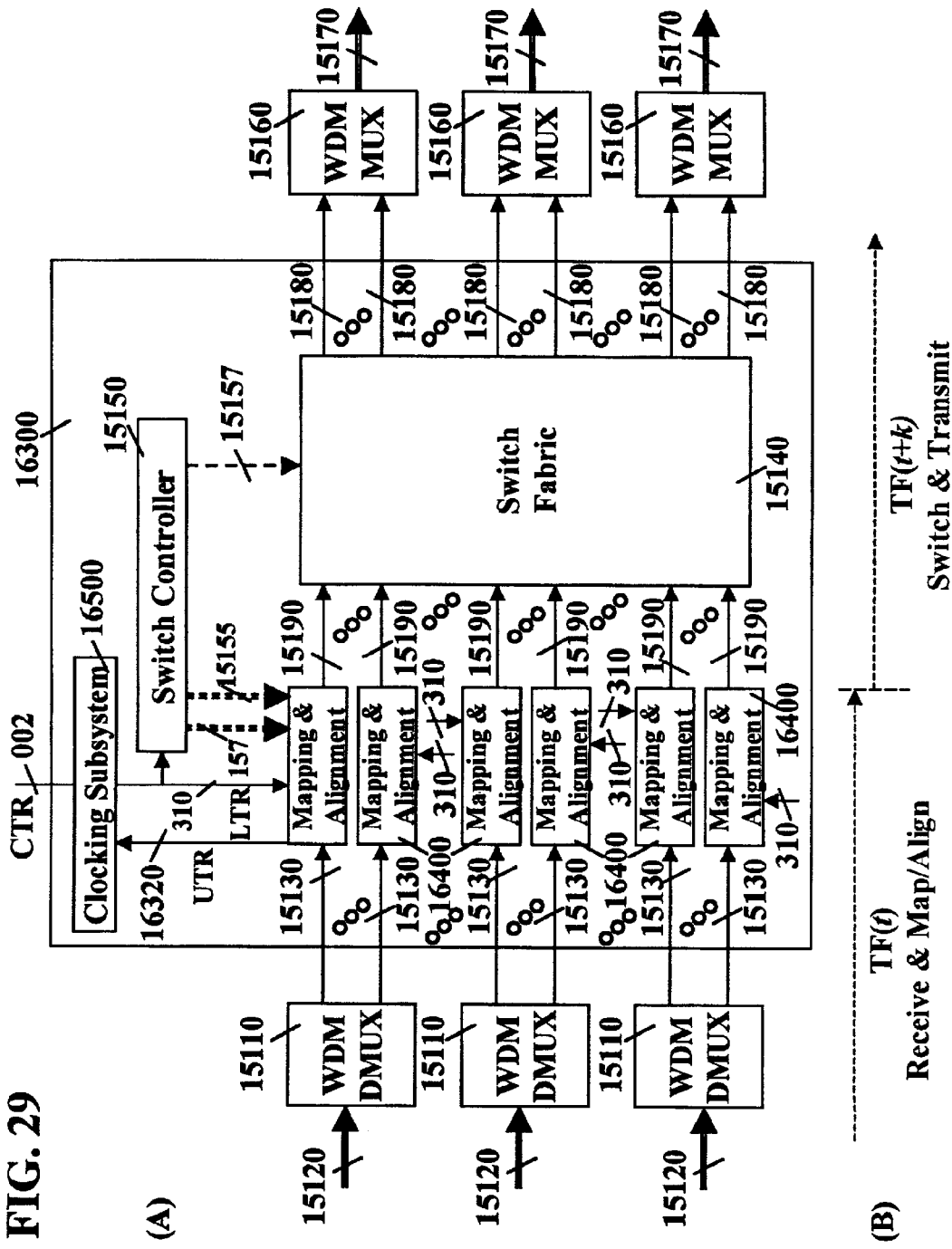
FIG. 29A is an architecture of a time driven switch capable of switching labeled time frames responsive to at least one of a local time reference (LTR) and time frame label comprising a clocking subsystem, a switch controller, a plurality of mapping & alignment subsystems, and a switch fabric, wherein the clocking subsystem generates the LTR responsive to at least one of a common time reference (CTR) and the clocking information received from at least one of the neighboring switches, wherein the switch's inputs and outputs are wavelength division multiplexed on a plurality of optical communications links.
FIG. 29B is a pictorial representation of the 2 phase forwarding principle.

FIG. 29A depicts the block diagram of a time driven switching system 16300 for routing and switching data units, responsive to a local time reference (LTR), transmitted during time frames as defined by the common time reference (CTR) and possibly comprising at least one of header control information 15010 and trailer control information 15020, as shown in FIG. 18A.

The switching system 16300 in FIG. 29A switches data units received from a plurality of inputs 15130 on a plurality of outputs 15180. In the embodiment shown in FIG. 29A, the inputs 15130 are optical channels separated by a respective one of a plurality of wavelength division multiplexing (WDM) de-multiplexers (DMUXs) 15110 from an optical signal received over a respective optical link 15120. In the embodiment shown in FIG. 29A, the outputs 15180 are optical channels combined by a respective one of a plurality of wavelength division multiplexing (WDM) multiplexers (MUXs) 15160 in an optical signal transmitted over a respective optical link 15170.

The switching system 16300 operates responsive to a common time reference (CTR) signal 002 and further comprises a clocking subsystem 16500 generating a local time reference (LTR) signal 310, a plurality of mapping & alignment subsystems 16400, one for each of the inputs 15130, at least one switch controller 15150, and at least one switch fabric 15140, operating responsive to the control signal 15157 from at least one of the switch controllers 15150.

Each of the inputs 15130 has a unique time reference (UTR) that is independent of the CTR 002. The UTR is divided into super cycles, time cycles, TFs (time frames), possibly sub-time frames of the same duration as the super cycles, time cycles, TFs, and possibly sub-time frames of the CTR, as was shown in FIG. 26. Each of the super cycles, time cycles, and TFs of the UTR possibly starts and ends at a time different than the respective start and end time of the super cycles, time cycles, and TFs of the CTR.

As shown in FIG. 29B, during a first UTR time frame TF(t) the switching system 16300 responsive to at least one of the CTR signal 002, delimiter 15030, and label 15040 contained in the time frame header control information 15010 receives data units and maps them to the proper switching and output time frame, thus aligning them to the LTR. During a second time frame TF(t+k) the switching system 16300 switches to and transmits on the respective output 15180 the data units received during the first time frame TF(t), wherein the second time frame is later than the first time frame.

Figure 30:
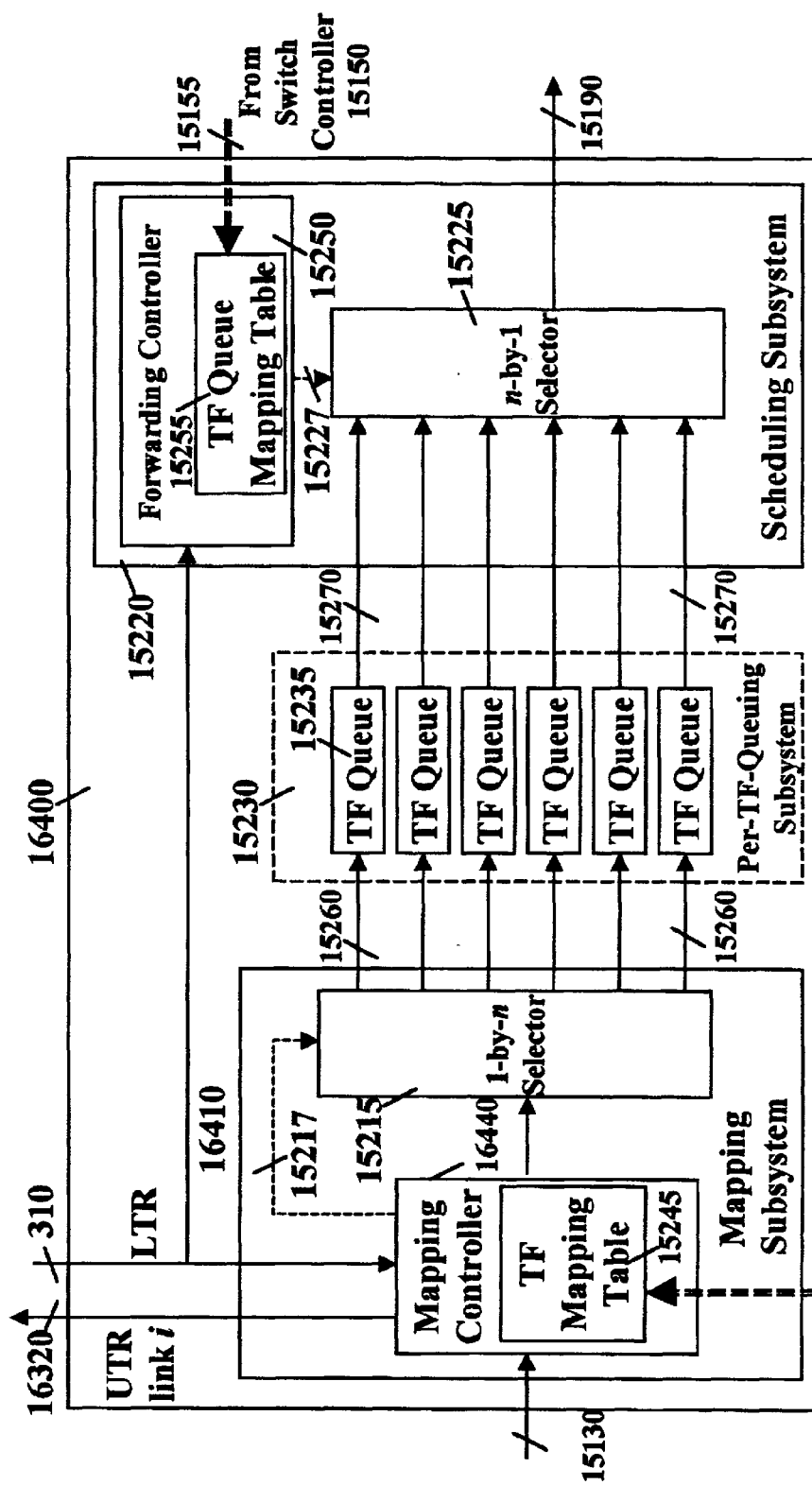
FIG. 30 is an architecture of a possible implementation of mapping and alignment subsystem comprising a mapping subsystem responsive to the LTR, a per-TF-queuing subsystem, and a scheduling subsystem responsive to the LTR.

FIG. 30 shows the block diagram of a possible embodiment of mapping & alignment subsystem 16400 composed of three main modules: a mapping subsystem 16410, a per-TF (time frame) queuing subsystem 15230, and a scheduling subsystem 15220.

Data units received through the input 15130 are processed by the mapping subsystem 16410 that, responsive to the LTR signal 310 from the clocking subsystem 16500 and the time frame header control information 15010, selects the data line 15260 on which the data units are to be moved to the per-TF-queuing subsystem 15230. The data line 15260 through which the per-TF-queuing subsystem 15230 receives data units determines the TF queue 15235 within the per-TF-queuing subsystem 15230 in which the data units are stored.

The scheduling subsystem 15220 in FIG. 30, responsive to the LTR signal 310, determines the data line 15270 from which data units should be retrieved from the per-TF-queuing system 15230 for being forwarded on the respective output 15190. The data line 15270 through which the scheduling subsystem 15220 retrieves data units determines the TF queue 15235 within the per-TF-queuing subsystem 15230 from which the data units are retrieved.

Figure 31:
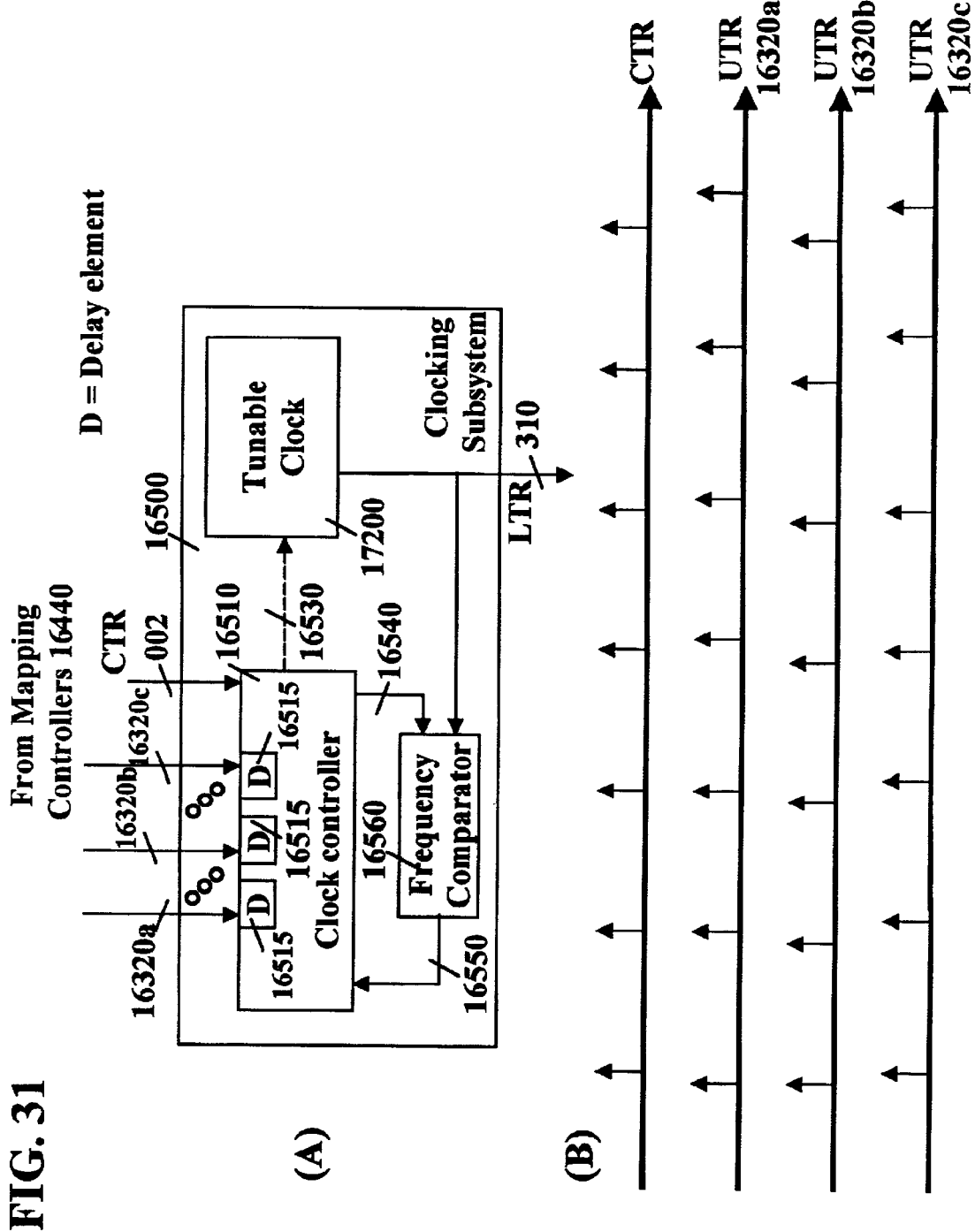
FIG. 31A is a block diagram of a possible implementation of a clocking subsystem comprising a clock controller responsive to the CTR and the unique time reference (UTR) of each input communications link, a tunable clock, and a frequency comparator.
FIG. 31B is an example of timing diagrams depicting the CTR and the UTR corresponding to three input communications links.

The mapping subsystem 16410 further comprises a mapping controller 16440 responsive to the LTR signal 310 and to a TF mapping table 15245, and a 1-by-n selector 15215 responsive to a control signal 15217 from the mapping controller 16440. Moreover, the mapping controller 16440, responsive to the time frame header control information 15010, generates a signal 16320 aligned to the UTR of the link to which the incoming channel 15130 belongs. In a possible embodiment, the signal 16320 generated by the mapping controller 16440 provides a delineation of the time frames, as shown in FIG. 31A.

As shown in the timing diagram in FIG. 9, during normal operating conditions (i.e., when the CTR signal is available to both switches at the ends of a link) the UTR and CTR time frames have the same duration. Instead, when at least one of the switches at the ends of a link is operating according to a LTR which is not synchronized with the CTR, the duration of LTR time frames can be different from the duration of CTR frames, as shown in FIG. 31B.

The mapping controller 16440 in FIG. 30 is responsible for determining for each data unit received from its respective input 15130 the time frame to which it belongs. When the CTR signal is available, the time frame to which a data unit belongs is determined based on the CTR time frame during which the data unit is received and the propagation delay on the link 15120 (see FIG. 29A) on which the data unit has traveled. In an alternative embodiment, the time frame to which a data unit belongs is determined based on the information contained in the TFs header control information 15010 (see FIG. 18B). In a possible embodiment, the delimiter 15030 is used to discriminate between data units belonging to different time frames. The label 15040 is also used to determine the time frame to which data units belong.

In a possible embodiment, whenever the mapping controller 16440 in FIG. 30 detects the beginning of a new time frame, for example based on one of the methods described above, it signals it on the control line UTR link i 16320.

Once the first time frame to which a data unit belongs is determined, the mapping controller 16440, responsive to the information contained in the TF mapping table 15245, determines a second time frame, as defined by the LTR, during which the data units belonging to the first time frame are be switched. The mapping controller 16440 programs the 1-by-n selector 15215 through the control signal 15217 to select the data line 15260 coupled with the TF queue 15235 associated with the second time frame.

As shown in FIG. 30, the TF mapping table 15245 is downloaded 157 by the switch controller 15150 which centrally computes the TF mapping table 15245 for all the input channels 15130 guaranteeing that time frames received from different input channels 15130 and destined to the same output channel 15180 are not mapped onto the same time frame for switching. The TF mapping table 15245 computation also ensures that time frames that are to be switched along incompatible input/output connections through the switch fabric 15140 (when the switch fabric 15140 is a blocking one) are not mapped onto the same time frame for switching.

The TF mapping table 15245 is changed at the fractional lambda pipe control level, i.e., each time a fractional lambda pipe is set up or torn down through the respective time driven switch 15100. The TF mapping follows a predefined pattern; in a possible embodiment, such a mapping repeats each time cycle or each super cycle.

Figure 33:
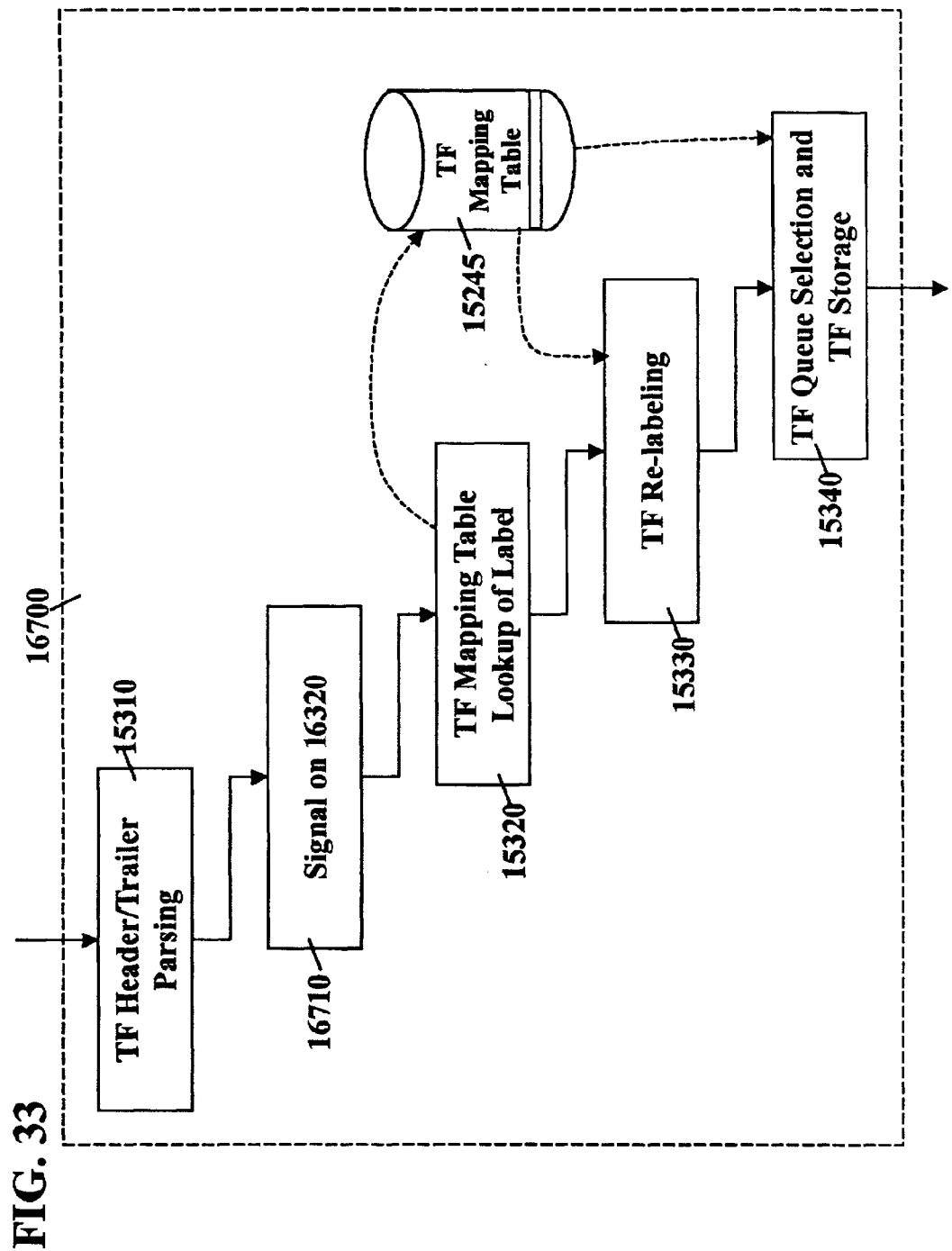
FIG. 33 is a diagram describing the operation of an embodiment of a mapping controller.

FIG. 33 shows the flow chart 16700 of the operation of the mapping controller 16440. The mapping controller 16440 first parses 15310 at least one of the header control information 15010 and the trailer control information 15020 of a selected time frame 15310. In a possible embodiment, this operation 15310 deploys the delimiter 15030 in FIG. 18B within the header control information 15010 to delineate the beginning of the time frame 15060 and hence the header control information 15010.

The beginning of a new time frame on its respective input channel is signaled 16710 by the mapping controller 16440 on control line 16320 shown in FIG. 30.

As shown in FIG. 33, once the label 15040 within the TF header control information 15010 is located, the mapping controller 16440 looks it up 15320 in the TF mapping table 15245.

In a possible embodiment, the label 15040 value can be used as an index in the table. At completion of the lookup operation 15320, the mapping controller 16440 has all the information needed to handle (i.e., to route, switch and forward) the data units belonging to the respective time frame.

In an embodiment in which the label field 15040 presented in FIG. 18B contains a local identifier, the TF mapping table 15245 contains the new label value to be used for the forwarded time frame. As shown in step 15330, the mapping controller 16440 in FIG. 30 changes the label value to the one contained in the entry of the TF mapping table 15245 associated with the looked-up label value.

In the next step 15340 in FIG. 33, the mapping controller 16440 selects the TF queue 15235 within the per-TF-queuing subsystem 15230 (see FIG. 30) in which the time frame is to be stored while waiting to be switched and transmitted. The TF queue 15235 is chosen based on the mapping information contained in the respective entry of the TF mapping table 15245. In a possible embodiment, the TF mapping table 15245 entry corresponding to a first time frame's label 15040 value contains the identity of a second time frame or a first plurality of time frames during which the data units belonging to the first time frame are to be switched and forwarded. The mapping controller 16440 stores the data units of the first time frame, together with the time frame header control information 15010 and trailer control information 15020 in the TF queue 15235 associated with the second time frame or associated with one of the time frames in the first plurality of time frames.

In a possible embodiment, the TF header control information 15010 depicted in FIG. 18B does not contain a label field 15040 and the lookup in the TF mapping table 15245 is based on the UTC time of arrival of the received time frame. If the CTR signal 002, and consequently UTC time, is not available, the lookup in the TF mapping table 15245 is based on the number of received time frame within the time cycle as defined by the UTR.

The scheduling subsystem 15220 in FIG. 30 further comprises a forwarding controller 15250 responsive to the LTR signal 310 and a TF queue mapping table 15255, and a 1-by-n selector 15225 responsive to a control signal 15227 from the forwarding controller 15250.

The forwarding controller 15250 in FIG. 30 is responsible for determining the TF queue 15235 within the per-TF-queuing subsystem 15230 from which data units are to be retrieved for switching and transmission during each time frame, as defined by the LTR. Through the 1-by-n selector 15225 controlled via the control signal 15227, the forwarding controller 15220 determines the TF queue 15235 to be used responsive to the LTR signal 310 and the TF queue mapping table 15255. The TF queue mapping table 15255 contains for each LTR time frame the TF queue 15235 from which data units should be retrieved for transmission on the data line 15190 which, as shown in FIG. 29A, is connected to the switch fabric 15140.

As shown in FIG. 30, the TF queue mapping table 15255 is downloaded 15155 by the switch controller 15150 which centrally computes the TF queue mapping table 15255 for all the input channels 15130, guaranteeing that time frames received from different input channels 15130 and destined to the same output channel 15180 are not mapped onto the same time frame for switching. The TF queue mapping table 15255 computation also ensures that time frames that are to be switched along incompatible input/output connections through the switch fabric 15140 (when the switch fabric 15140 is a blocking one) are not mapped onto the same time frame for switching.

In a possible embodiment, the TF queue mapping table 15255 is changed at the fractional lambda pipe control level, i.e., each time a fractional lambda pipe is set up or torn down through the respective time driven switch 16300. The TF queue mapping follows a predefined pattern; in a possible embodiment, such mapping repeats each time cycle or each super cycle.

FIG. 31A shows the block diagram of a possible implementation of the clocking subsystem 16500 generating the LTR signal 310 in the architecture presented in FIG. 29A. The clocking system 16500 in FIG. 31A comprises a tunable clock 17200 deployed to generate the LTR signal 310 and a clock controller 16510 controlling the oscillating frequency of the tunable clock 17200 responsive to the CTR signal 002, to the UTR signals 16320a, 16320b, and 16320c from the mapping controllers 16440, and to the output 16550 of a frequency comparator 16560.

Figure 38:
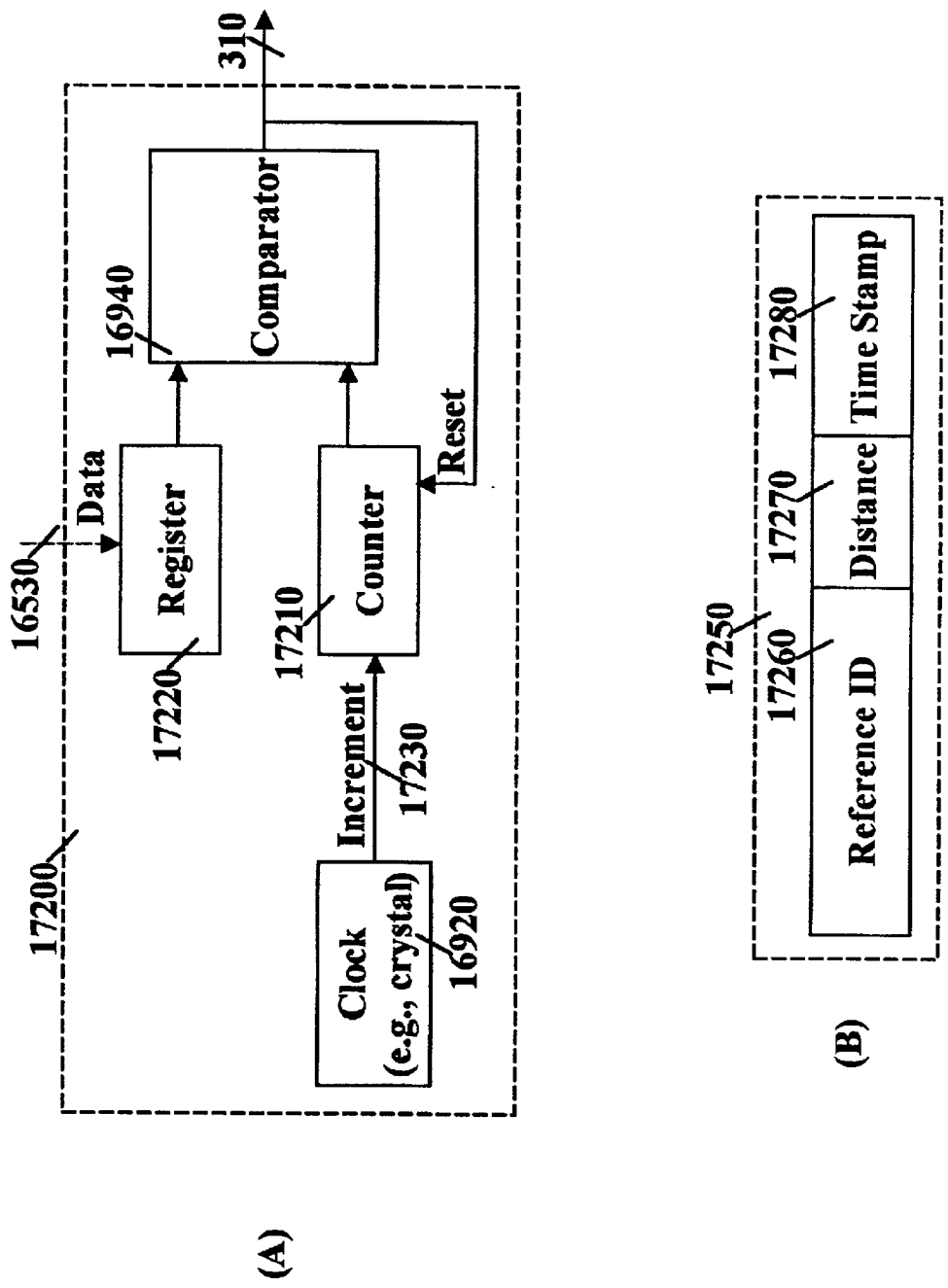
FIG. 38A is the block diagram of a possible embodiment of tunable clock comprising a clock, a counter, a register, and a comparator.
FIG. 38B is the structure of a possible embodiment of clocking information exchanged by clock controllers of neighboring switching systems in order to be able to synchronize their local time reference (LTR) to at least one of the following: an external CTR signal, the LTR of the neighbor closest to an external CTR signal, the LTR of a neighbor closest to an elected reference node, and the local clock.

FIG. 38A shows the block diagram of a possible implementation of tunable clock 17200 comprising a clock 16920 implemented, for example by a crystal, a register 17220, a counter 17210 incrementing its value responsive to the signal generated by the clock 16920, and a comparator raising its output 310 when the register 17220 and the counter 17210 contain the same value. The output 310 of the comparator 16940 is used to reset the counter 17210 and provides a signal whose frequency is regulated by the value stored in the register 16530 by way of the input line 16530.

From another viewpoint, the signal 17230 generated by a freely oscillating clock 16920 is used to pace the increments of the counter 17210 that counts from 0 to the value loaded in the register 17220 through line 16530. At this point the comparator 16940, its output 310, and the counter 17210 in FIG. 38A are reset back to 0, ready to start another counting cycle. The reset occurs because the output 310 of the comparator 16940 is connected to the Reset control input of the counter 17210. As the counter 17210 is reset, the content of the counter 17210 does not continue to coincide with the content of the register 17220, and the output 310 of the counter 17210 is lowered again. As a result, the signal on line 310 is an impulse with a frequency depending on the oscillating frequency of the clock 16920 (which is nominally fixed) and the value loaded in the register 17220 through line 16530. Thus, the frequency of the tunable clock's 17200 output signal 310 is controlled by the value provided by the clock controller 16510 through input line 16530.

The objective of the clock controller 16510 depicted in FIG. 31A in controlling the frequency of the tunable clock's 17200 output 310 is to keep the LTR signal 310 synchronized with the CTR signal 002, whenever present. When the CTR signal 002 is not available, if at least two of the UTR signals 16320*a*, 16320*b*, and 16320*c* from their respective mapping controllers 16440 have the same frequency, the clock controller 16510 regulates the tunable clock 17200 output frequency so that the LTR signal 310 is synchronized with the isochronous UTR signals among 16320*a*, 16320*b*, and 16320*c*.

The frequency comparator 16560 in FIG. 31A compares the frequency of the signal 310 generated by the tunable clock 17200 with the frequency of a target signal 16540. The output 16550 of the frequency comparator 16560 provides an indication of whether the frequency of the tunable clock's 17200 signal 310 is higher or lower than the frequency of the target signal 16540. The clock controller 16510, responsive to the output 16550 of the frequency comparator 16560, changes the frequency of the signal 310 generated by the tunable clock 17200 through the control signal 16530.

The clock controller 16510 in FIG. 31A receives as input the CTR signal 002 and the UTR signals 16320*a*, 16320*b*, and 16320*c* of the various input links from their respective mapping controllers 16440. The clock controller 16510 comprises a plurality of delay elements (D) 16515, one for each respective one of the UTR signals 16320*a*, 16320*b*, and 16320*c*. A delay element (D) 16515 introduces a delay such that the overall delay on the input link 15120 of the respective UTR signal 16320*a*, 16320*b*, or 16320*c* will be an integer number of time frames. As a result, if the switching system 16300 at the other end of a communications link 15120 is operating responsive to the CTR, its respective UTR signal 16320*a*, 16320*b*, or 16320*c* delayed through the delay element (D) 16515 is aligned to the CTR.

If the propagation delay on a selected communications link 15120 is not known, the respective delay element (D) 16515 cannot be set to the proper value. In this case, the switching system 16300 at the receiving end of the selected communications link 15120 still operates properly, but the delay experienced by data units within the switching system 16300 is possibly longer than necessary.

FIG. 31B depicts timing diagrams for the CTR signal 002 and three example UTRs 16320*a*, 16320*b*, and 16320*c*. On each timing diagram the arrows show the delimiter between contiguous time frames. As shown by the timing diagrams of UTR signals 16320*a*, 16320*b*, and 16320*c*, the delimiters are not at constant distance due to at least one of the following: (1) the clocks of the neighboring nodes not operating exactly at the nominal frequency and (2) the delay variation on the communications links connecting the neighboring nodes.

Figure 32:
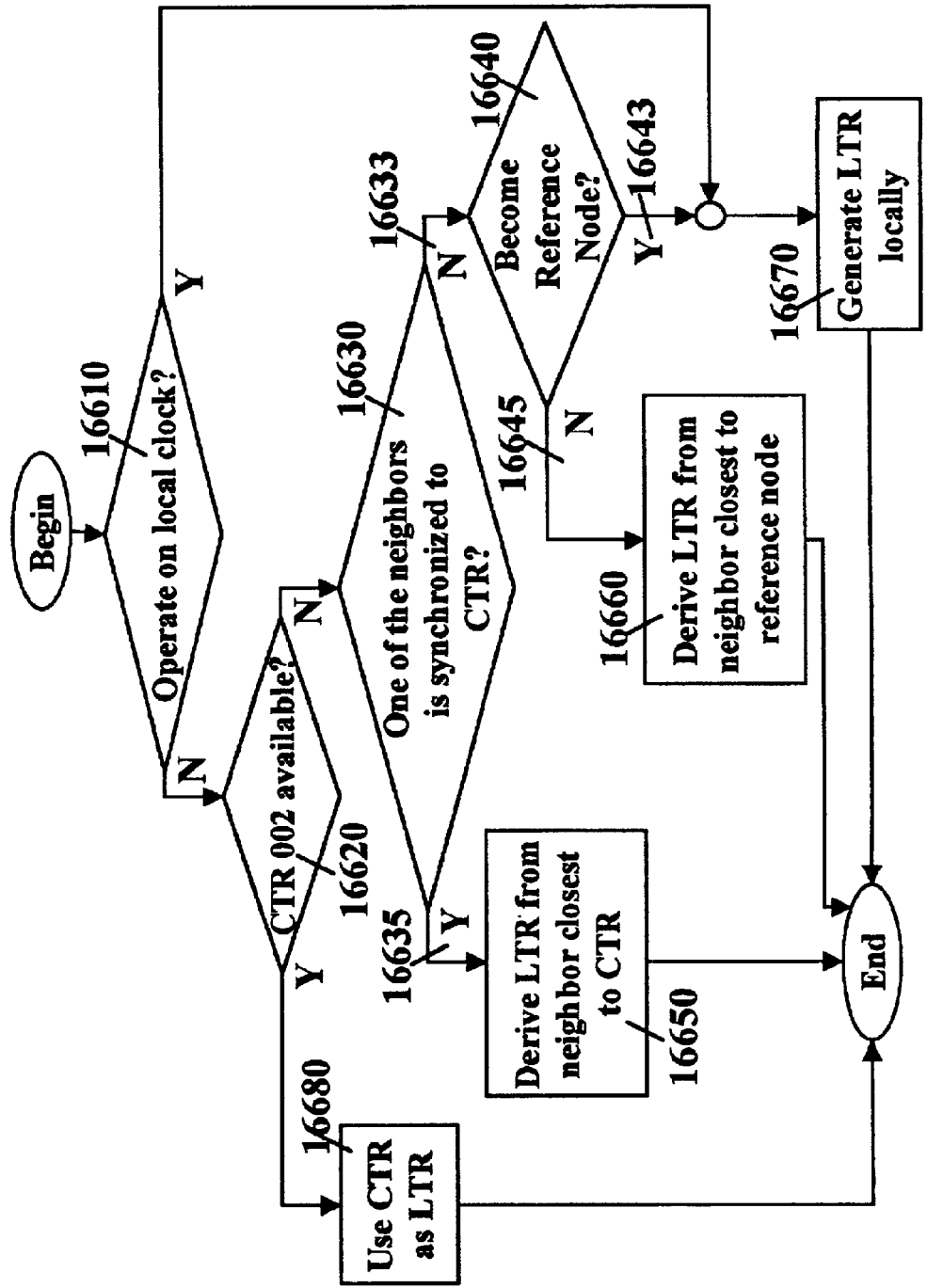
FIG. 32 is a flow chart describing the operation of an embodiment of a clock controller.

FIG. 32 shows the flow diagram of the operation of a possible embodiment of the clock controller 16510 in FIG. 13A. A shown in FIG. 32, the clock controller 16510 first checks 16610 whether for administrative or configuration reasons it has been programmed to generate the timing reference locally. This can be the case when at least one of the following is true: the external clocking sources are deemed to be unreliable or to have inadequate accuracy and stability, the switching system 16300 is operated in a stand alone mode, and the switching system 16300 is operated as an asynchronous packet switch.

As shown in FIG. 32, if external clock references are not to be used, the LTR is generated locally 16670, otherwise, the clock controller 16510 checks 16620 whether the CTR signal 002 is available. If the CTR signal 002 is available, it is used as LTR 16680. Otherwise, the availability of a CTR reference from one of the other switching systems 16300 is checked 16630. If at least one of the neighboring switching systems 16300 is operating responsive to the CTR, the LTR is derived 16650 from the LTR of the neighboring switching system 16300 closest to the CTR signal 002.

According to the flow chart in FIG. 32, if none of the neighboring switching systems 16300 has declared to be operating responsive to the CTR 16633, a leader election algorithm is run in order to identify one single switching system 16300, called reference node, whose LTR is to be used as a reference for synchronizing the LTRs of all the switching systems 16300 in the network participating to the leader election algorithm.

If 16640 a switching system 16300 is eligible to becoming reference node, it generates the LTR locally 16670; otherwise, it derives its respective LTR from the LTR of the neighboring node 16300 closest to the reference node 16660.

The operation of the clock controller 16510 as shown in FIG. 32 and the leader election algorithm are based on the clocking information received from neighboring switching systems 16300 and comprises transmission of clocking information to neighboring switching systems 16300. The clocking information enables a switching system 16300 to know, for each neighboring switching system 16300, which of the following applies:

The neighboring switching system 16300 is operating responsive to the CTR in which case whether the CTR is derived from other nodes, or received directly as an external CTR signal 002 (e.g., from GPS, GLONASS, or Galileo);

The neighboring switching system 16300 is operating responsive to an LTR derived from the LTR of another node;

The neighboring switching system 16300 is operating responsive to an LTR generated locally independent of the CTR and the LTR of other nodes.

Figure 18:
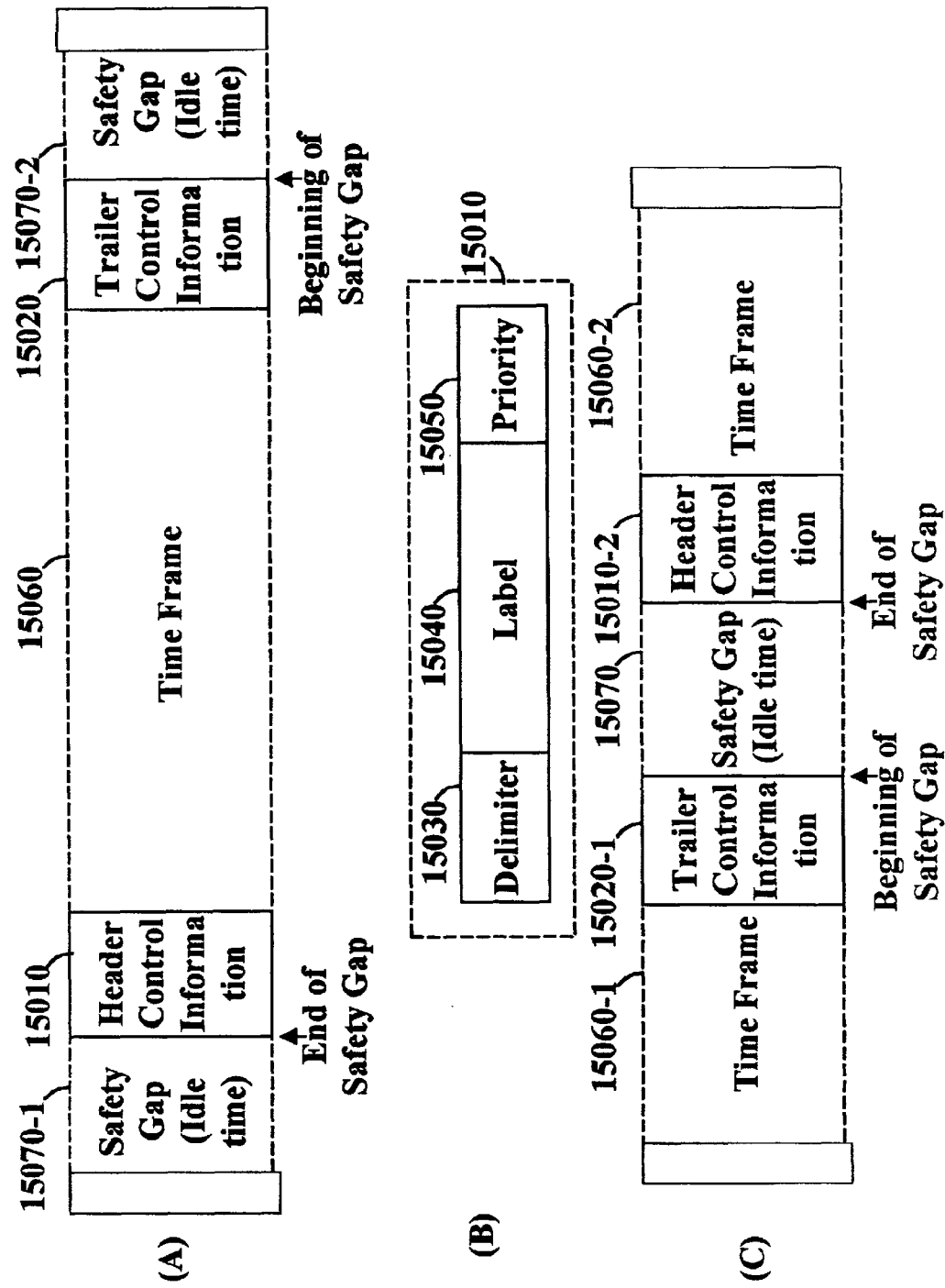
FIG. 18A shows a structure of a time frame comprising header control information, trailer control information, and a safety gap.
FIG. 18B is a structure of a possible embodiment of time frame header control information comprising a delimiter field, a label field, and a priority field.
FIG. 18C shows a possible embodiment a safety gap between the transmitted data units and control information (at least one of a header control information and a trailer control information) belonging to consecutive time frames.

In a possible embodiment, neighboring switching systems 16300 exchange clocking information 17250 according to the format shown in FIG. 38B. In a possible embodiment, a switching system 16300 transmits clocking information 17250 each time frame. In a possible embodiment, the clocking information 17250 is included in the TF header control information 15010 as shown in FIG. 18; in an alternative embodiment the clocking information 17250 is included in the TF trailer control information 15020 as shown in FIG. 18. In an alternative embodiment, the clocking information 17250 in FIG. 38B is transmitted in at least one of the time frames within at least a selected one of a time cycle and a super cycle. In an alternative embodiment, the clocking information 17250 is transmitted only once when a communications link between two switching systems 16300 begins operating. In another alternative embodiment, the clocking information 17250 is exchanged between two switching systems 16300 only when at least part of the clocking information 17250 changes with respect to its last successful exchange.

In the embodiment shown in FIG. 38B, the clocking information 17250 comprises a reference ID 17260 field, a distance 17270 field, and a time stamp 17280 field. The reference ID 17260 indicates the identity of the source used for generating the LTR used by the switching system 16300 transmitting the clocking information 17250. In the embodiment presented in this disclosure, the reference ID 17260 is at least one of:

- a special encoding indicating the CTR as received from an external source (such as GPS, GLONASS, or Galileo): in this case the LTR of the transmitting switching system 16300 is aligned with the CTR;
- the identifier of the transmitting switching system 16300: the LTR of the transmitting switching system 16300 is generated locally and is independent of both the CTR and the LTR of every other switching system 16300 in the network;
- the identifier of a switching system 16300 different than the transmitting one: the LTR of the transmitting switching system 16300 is synchronized with the LTR of the switching system 16300 uniquely identified by the value of reference ID 17260.

The reference ID 17260 is a unique identifier for a switching system 16300 and is at least one of the switching system's 16300 IP address, the switching system's 16300 Ethernet address, the switching system's 16300 ATM address, and the switching system's 16300 serial number. If the switching system 16300 has more than one IP address and the IP address is to be used as reference ID 17260, one of the switching system's 16300 IP addresses is selected for the purpose and deployed throughout the operation of the switching system 16300.

The distance 17270 in FIG. 38B indicates the distance of the switching system 16300 transmitting the clocking information 17250 from the reference of its LTR, i.e., from the switching system 16300 identified by the corresponding reference ID 17260. The distance 17270 is measured as at least one of number of hops (i.e., communications links on the path between the and the reference switching system 16300), and delay experienced by data units traveling from the reference switching system 16300 to the transmitting switching system 16300.

Figure 36:
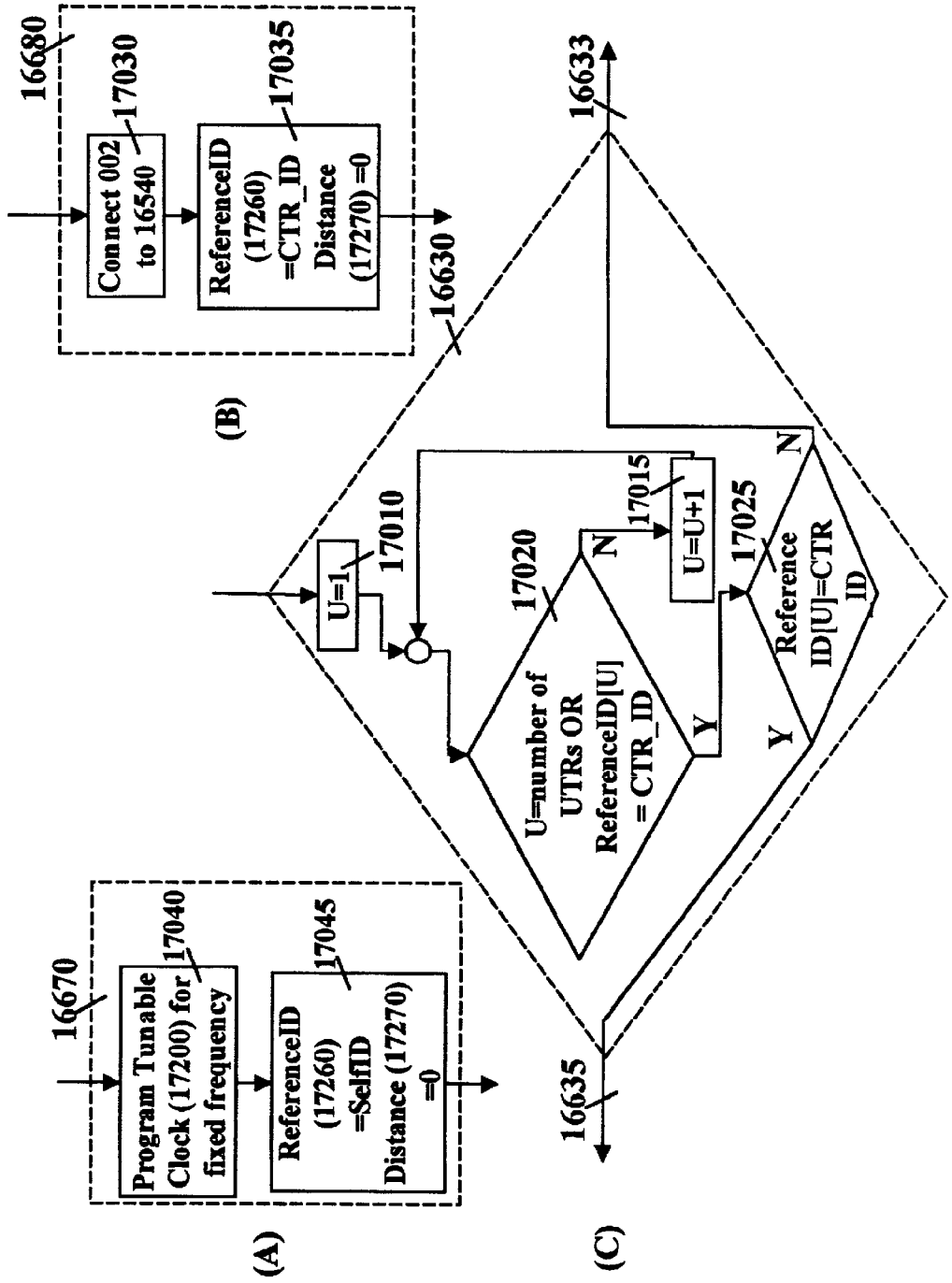
FIG. 36A is a flow chart describing the actions performed by the clock controller to generate a local time reference (LTR) independent of the CTR and UTR of any neighboring node.
FIG. 36B is a flow chart describing the actions performed by the clock controller in order to generate a local time reference (LTR) synchronized with a CTR signal received by an external source.
FIG. 36C is a flow chart describing the actions performed by the clock controller to check whether any of the neighboring nodes is operating responsive to the CTR.

The time stamp 17280 in FIG. 38B is the time, according to the LTR of the sending switching system, at which the clocking information 17250 is transmitted. If the LTR of the sending switching system is synchronized with the CTR, then the time stamp 17280 field contains the UTC time at which the clocking information 17250 is transmitted FIG. 36A shows the steps 16670 performed when the LTR is generated locally. First 17040, the tunable clock 17200 is programmed, through line 16530 in FIG. 31A, to oscillate at a fixed frequency corresponding to the nominal frequency of the CTR. Then, the neighboring switching systems 16300 are notified that the node is operating responsive to an LTR generated locally 17045. This is implemented by writing the identifier of the switching system 16300 itself SelfID in the reference ID field 17260 (ReferenceID=SelfID) and 0 in the distance field 17270 (Distance=0) of the clocking information 17250 transmitted by the switching system 16300 to its neighbors.

FIG. 36B shows the steps 16680 performed when the LTR is generated from a CTR signal 002 available locally from an external source (e.g., a GPS receiver, a GLONASS receiver, or a Galileo receiver). The clock controller 16510 routes 17030 the CTR signal 002 directly on the target signal 16540, depicted in FIG. 31A, on which the tunable clock 17200 is synchronized. Then 17035, the neighboring switching systems 16300 are notified that the node is operating responsive to an LTR derived from a local CTR signal 002. This is implemented by writing the special identifier indicating the CTR CTR_ID in the reference ID field 17260 (ReferenceID=CTR_ID) and 0 in the distance field 17270 (Distance=0) of the clocking information 17250 (see FIG. 38B) transmitted by the switching system 16300 to its neighbors.

FIG. 36C is the flow diagram of the actions 16630 performed by the clock controller 16510 to check whether at least one of the neighboring switching systems 16300 is operating according to the CTR. After initializing 17010 a counter U, a loop is performed on each UTR signal 16320a, 16320b, and 16320c from the neighbors, as counted 17015 by the counter U, until 17020 either the UTR signals 16320a, 16320b, and 16320c from all the neighbors (U=number of UTRs) has been checked, or one UTR signal 16320a, 16320b, and 16320c derived from the CTR is found (ReferenceID[U]=CTR_ID). The flow diagram 16630 in FIG. 36C has two exit points. One 16635 if 17025 one neighboring switching system 16300 is found to be operating responsive to the CTR (ReferenceID[U]=CTR_ID). The other exit point 16633 is reached in case none of the neighboring nodes 16300 has notified through the reference ID field 17260 in the clocking information 17250 transmitted that it is operating responsive to the CTR.

Figure 37:
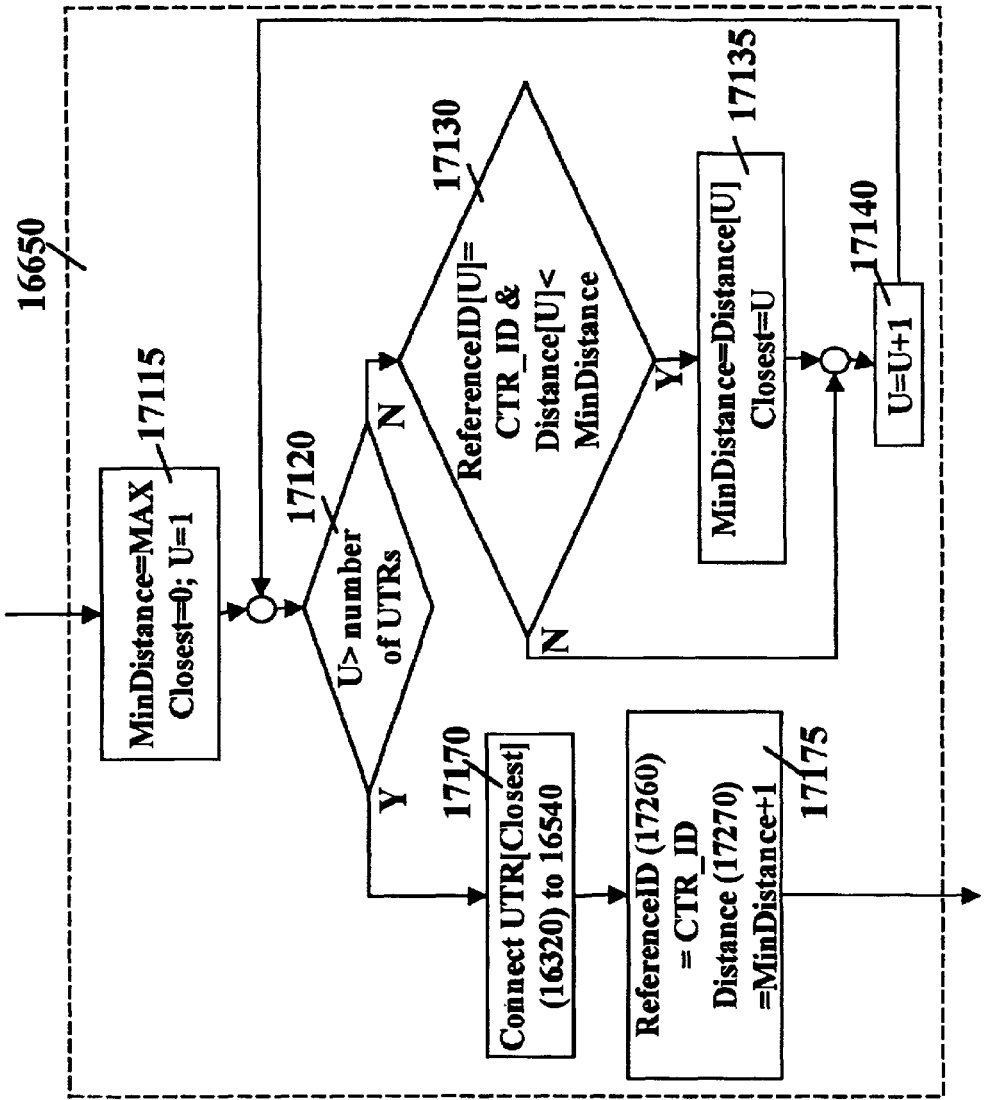
FIG. 37 is a flow chart describing the actions performed by the clock controller in order to generate a local time reference (LTR) synchronized with the CTR, wherein the CTR is derived from the clocking information received from the neighbor closest to an external CTR signal.

FIG. 37 depicts the actions 16650 performed by the clock controller 16510 to derive the LTR from the neighboring switching system 16300 closest to an external CTR signal 002. First 17115 variables used in the algorithm are initialized: U contains the ordinal number, from 1 to number of UTRs, of the neighboring switching system 16300 being considered; MinDIstance contains the minimum distance of a neighbor already considered from an external CTR signal 002; Closest contains the ordinal number of the neighbor, among the ones already considered, that is closest to an external CTR signal 002. Then, a loop that takes into consideration each 17120 of the UTR signals 16320a, 16320b, and 16320c from the neighbors, as counted 17140 by the counter U, is performed. At each iteration, the clocking information 17250 from the respective one of the neighboring switching systems 16300 is analyzed to check 17130 whether the respective one of the UTR signals 16320a, 16320b, and 16320c is derived from the CTR (ReferenceID[U]=CTR_ID) and the distance of the node from the CTR signal 002 used as a reference is smaller than the distance of the neighbors already considered (Distance [U]<MinDistance) that derive their respective LTR from an external CTR signal 002. If the check 17130 is positive (branch Y of 17130), the variables Closest and MinDIstance are updated 17135 with the value of U—ordinal number of the UTR signal 16320a, 16320b, and 16320c whose clocking information 17250 is being considered—and the content of the respective distance field 17270 (Distance[U]), respectively.

Finally, as shown in FIG. 37, the next UTR signal 16320a, 16320b, and 16320c is considered 17140. Once all the UTR signals 16320a, 16320b, and 16320c have been taken into consideration (branch Y of 17120), the UTR signal 16320a, 16320b, or 16320c of the switching system 16300 closest to its respective reference CTR signal 002 (UTR[Closest]) is used 17170 as the target signal 16540 in FIG. 31A In the last step 17175 of the algorithm presented in FIG. 37, the clocking information 17250 transmitted by the switching system 16300 to its neighbors is updated. The reference ID field 17260, as presented in FIG. 38B, contains the special identifier for the CTR reference CTR_ID. In the preferred embodiment, the distance of a switching system 16300 from the reference from which its LTR is derived is expressed as the number of hops between the switching system 16300 itself and the switching system 16300 having the external CTR signal 002 used as a reference. Thus, the distance field 17270 contains the distance MinDistance received in the distance field 17270 included in the clocking information 17250 received from the neighbor closest to a CTR signal 002 augmented by 1.

Figure 39:
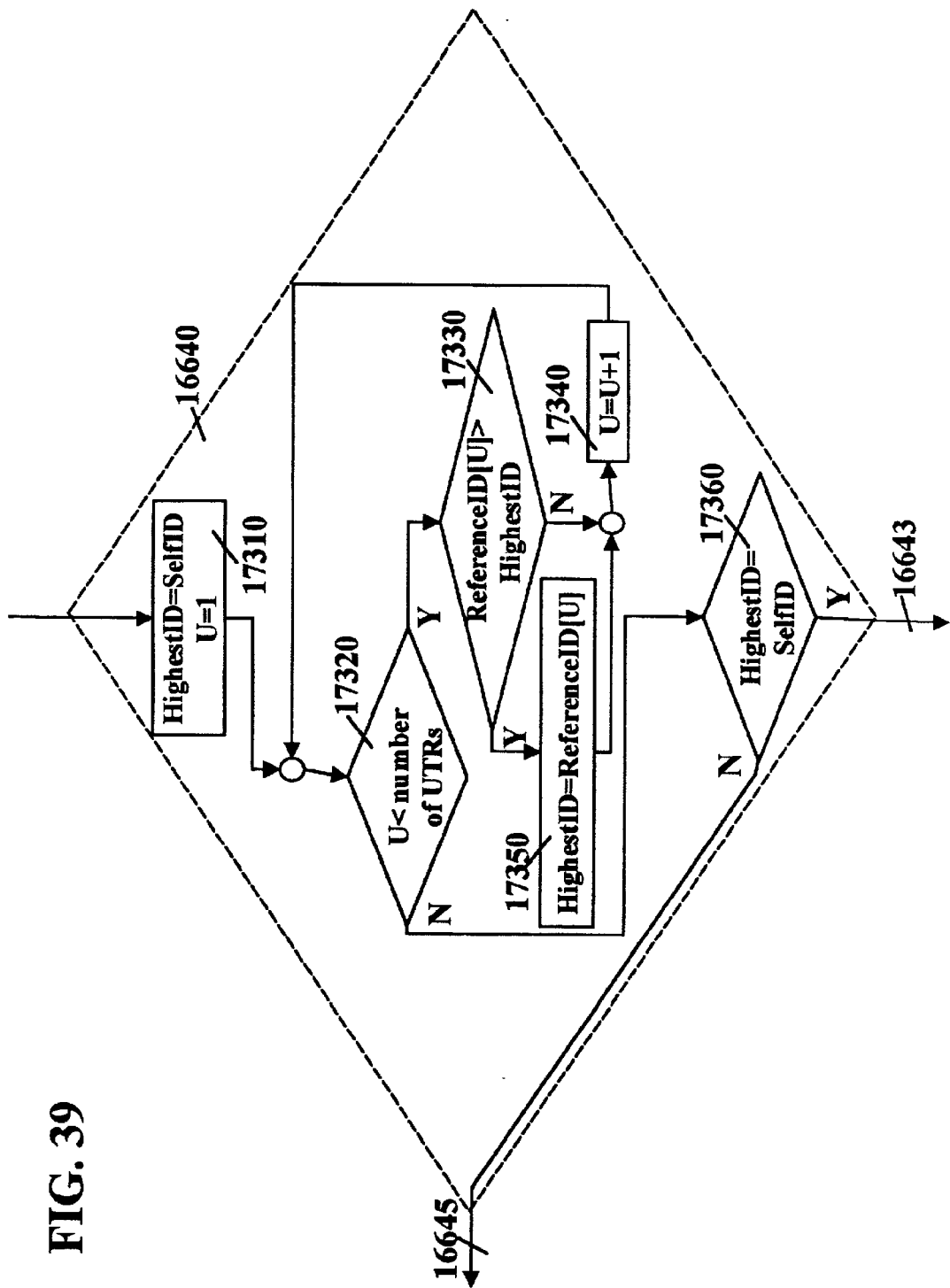
FIG. 39 is a flow chart describing the actions performed by the clock controller to check whether any of the neighboring nodes is operating responsive to the LTR of a node that has higher priority over the clock controller's node to become reference node.

FIG. 39 contains the part 16640 of the leader election algorithm performed by the clock controller 16510 used to determine whether the switching system itself is eligible for leadership. In other words, clock controller 16510 checks whether its switching system can become the reference node from whose LTR the other nodes will derive their respective LTR. After the initialization 17310 of two support variables—a counter U used to identify the UTR signal 16320a, 16320b, or 16320c whose clocking information 17250 is being considered, and HighestID containing the highest value among the reference ID fields 17260 considered so far—a loop is performed that considers each 17320 of the UTR signals 16320a, 16320b, and 16320c. At each iteration, if 17330 the value ReferenceID[U] of the reference ID field 17260 within the clocking information 17250 coupled with the UTR signal 16320a, 16320b, and 16320c being considered, (i.e., identified by the current value of U) is higher than the highest value so far considered HighestID, the variable HighestID is updated 17350. Then, the clocking information 17250 associated with the next 17340 UTR signal 16320a, 16320b, or 16320c is considered.

At the end of the loop (branch N of 17320), the variable HighestID contains the identifier of the reference node. The flow chart 16640 depicted in FIG. 39 has two exit points. One 16643 for the case in which the switching system 16300 itself should become a reference node, because HighestID contains (branch Y of 17360) the identifier of the switching system 16300 itself SelfID upon termination of the above described loop. The other exit point 16645 takes place when another switching system 16300 is used as a reference node.

Figure 40:
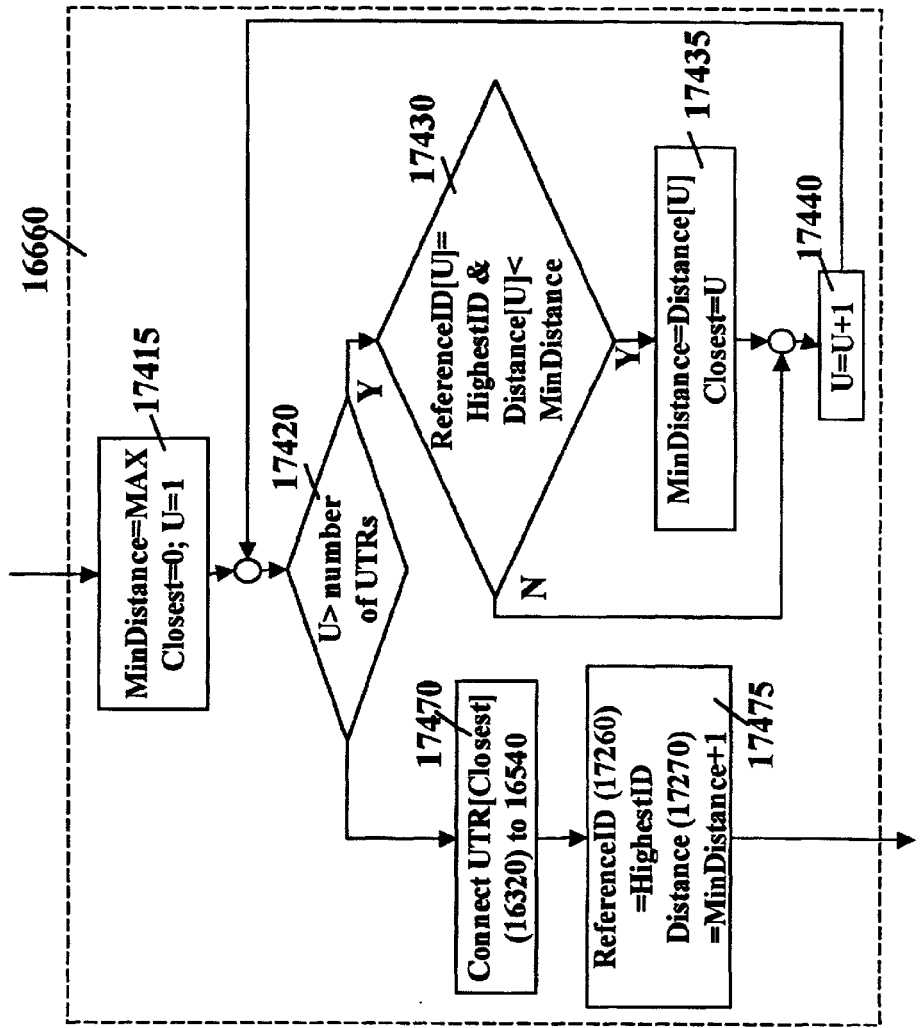
FIG. 40 is a flow chart describing the actions performed by the clock controller to generate a local time reference (LTR) synchronized with the local time reference (LTR) of an elected node, called the reference node, wherein the LTR of the reference node is derived from the clocking information received from a selected neighbor, wherein the selected neighbor is the closest to the reference node.

When the leader election algorithm determines that the LTR should be derived from the LTR of another switching system 16300—the reference node—(branch 16645 of 16640 in FIG. 39), the steps 16660 depicted in FIG. 40 are performed by the clock controller 16510 in order to determine the neighboring node (steps 17415, 17420, 17430, 17435, and 17440) whose respective UTR signal 16320a, 16320b, or 16320c (UTR[Closest]) is to be used 17470 as the target signal 16540, and to update 17475 the clocking information 17250 transmitted to the neighbors with the proper value HighestID for the reference ID field 17260 and the proper value MinDistance+1 for the distance field 17270.

After the initialization 17415 of three support variables, the reference node is determined by a loop 17420 considering the clocking information 17250 coupled with each 17440 of the UTR signals 16320a, 16320b, and 16320c. Whenever a UTR signal 16320a, 16320b, or 16320c is found to be synchronized with the LTR of the reference node—previously identified by the algorithm 16640 presented in FIG. 39—from a neighboring node that is closer to the reference node than the UTR signals 16320a, 16320b, and 16320c already considered 17430, the MinDistance and Closest variables are updated 17440 to reflect the distance Distance[U] and the ordinal number U of the neighboring node sending the selected UTR signal 16320a, 16320b, or 16320c.

The algorithm performed by the clock controller 16510 to choose a reference for generating its respective LTR signal, including the leader election algorithm to select a reference node when an external CTR signal 002 is not available throughout the network, is self stabilizing in that if a reference node does not exist, one, and only one, is elected in a completely distributed fashion without the need to have external intervention;

if an existing reference node stops operating, another one, and only one, is elected in a completely distributed fashion without the need to have external intervention.

In an alternative embodiment, the clock controller 16510 generates the LTR signal 310 as an average of at least two of the UTR signals 16320a, 16320b, and 16320c received from the neighboring nodes.

Figure 35:
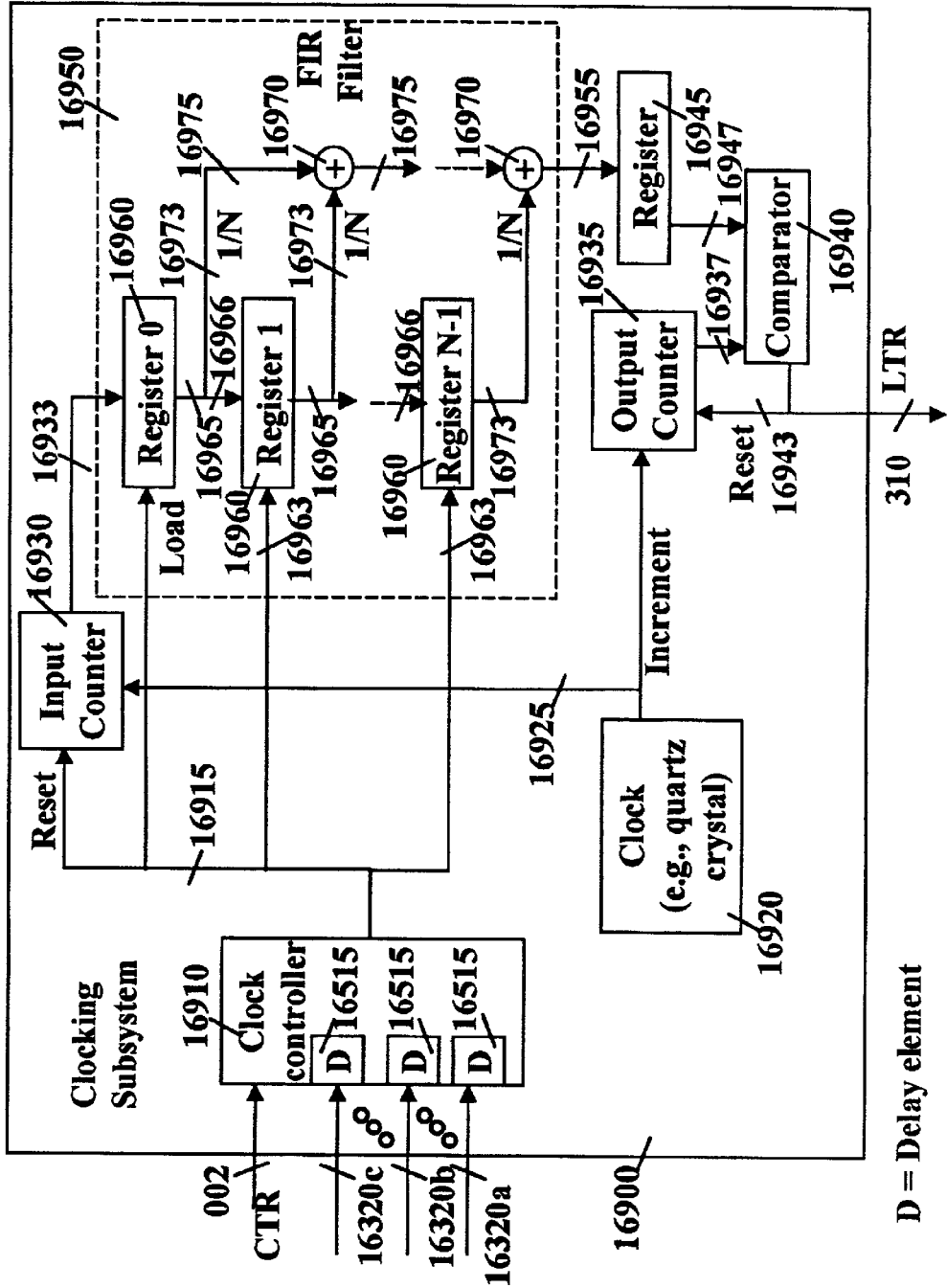
FIG. 35 is the block diagram of an alternative embodiment of clocking subsystem based on a finite impulse response (FIR) filter and comprising a clock controller, a clock, two counters, a register, and a comparator.

FIG. 35 shows a possible embodiment of clocking subsystem 16900 alternative to the clocking subsystem 16500 embodiment shown in FIG. 31A. The clocking subsystem 16900 depicted in FIG. 35 is based on a FIR (finite-impulse-response) filter 16950 and further comprises a clock controller 16910, an input counter 16930, a clock 16920, an output counter 16935, a register 16945, and a comparator 16940.

The clocking subsystem 16900 in FIG. 35 receives as input the CTR signal 002 and the UTR signals 16320a, 16320b, and 16320c of the various input links 15120 from their respective mapping controllers 16440 shown in FIG. 29A. The clock controller 16910 comprises a plurality of delay elements (D) 16515, one for each respective one of the UTR signals 16320a, 16320b, and 16320c. A delay element (D) 16515 introduces a delay such that the overall delay on the input link 15120 of the respective UTR signal 16320a, 16320b, or 16320c is an integer number of time frames. As a result, if the switching system 16300 at the other end of the communications link 15120 is operating responsive to the CTR, the UTR signal 16320a, 16320b, or 16320c delayed through the delay element (D) 16515 is aligned to the CTR.

FIG. 31B depicts timing diagrams for the CTR signal 002 and three example UTRs 16320a, 16320b, and 16320c. On each timing diagram arrows show the delimiter between contiguous time frames. As shown by the timing diagrams of UTR signals 16320a, 16320b, and 16320c, the delimiters are not at constant distance due to at least one of the clocks of the neighboring nodes not operating exactly at the nominal frequency and the delay variation on the communications links connecting the neighboring nodes.

The objective of the clocking subsystem 16900 is to produce an LTR signal 310 synchronized with the CTR signal 002, whenever present. When the CTR signal 002 is not available, according to a first embodiment, if at least two of the UTR signals 16320a, 16320b, and 16320c from their respective mapping controllers 16440 have the same frequency, the LTR signal 310 generated by the clocking system 16900 is synchronized with the isochronous UTR signals among 16320a, 16320b, and 16320c.

The clock controller 16910 receives as input the CTR signal 002 and the UTR signals 16320a, 16320b, and 16320c of the various input links from their respective mapping controllers 16440. If the CTR signal 002 is available, the clock controller 16910 uses it as the target signal 16915, i.e., connects its CTR input 002 with its target signal output 16915.

If the CTR signal 002 is not available, the clocking subsystem 16900 tries to devise the CTR from one of its neighboring nodes. The first step is for the clock controller 16910 to check if at least one of the neighboring nodes is operating (i.e., switching and forwarding data units) responsive to the CTR. In a possible embodiment, this is done by checking whether at least two of the UTR signals 16320a,

16320b, and 16320c have the same frequency. If this is not the case, the clock controller 16910 is not able to determine whether any of the neighboring nodes are operating responsive to the CTR, and hence the clocking subsystem 16900 does not try to synthesize a clock signal 310 synchronized with any one of the UTR signals 16320a, 16320b, and 16320c. In a scenario in which all the nodes do not have a CTR signal 002, each switch operates responsive to its own local clock and the communications system has the performance of an asynchronous packet switched network such as, for example, a multi-protocol label switching (MPLS) network.

If at least two UTR signals 16320a, 16320b, and 16320c have the same frequency, the respective neighboring nodes are most likely operating responsive to the CTR. Thus, the clock controller 16910 uses one of the synchronous UTRs as the target signal 16915, i.e., it connects the respective UTR input 16320a, 16320b, and 16320c with its target signal output 16915.

According to a second embodiment, if an external CTR signal 002 is not available, the clock controller 16910 of the clocking system 16900 in FIG. 35 executes the reference node election algorithm presented in FIG. 32, and described above, to identify a node in the network whose LTR should be used as a CTR and to select one of the neighboring switching systems from whose UTR the LTR is to be derived.

The input counter 16930 and the output counter 16935 are incremented with a frequency generated by a clock 16920 on the increment control signal 16925. The input counter 16930 is reset with the frequency of the target signal 16915. Thus, before each reset, the input counter 16930 contains the duration, according to the clock 16920, of the last time frame as defined by the target signal 16915.

The purpose of the FIR filter 16950 is to smooth the fluctuations of the measurement 16933 of the duration of each time frame by providing as output 16955 a time frame duration obtained by averaging the measured duration of the last N time frames.

The filtered measurement 16955 is stored in the register 16945 so that it can be compared with the value 16937 of the output counter 16935 that is reset each time it equals the content of the register 16945. The reset signal 16943 is obtained as the output of a comparator 16940 that is fed with the content of the output counter 16935 and the content of the register 16945. The output 16943 of the comparator 16940 is set each time its two inputs 16937 and 16947 coincide. Thus, the subsystem comprised by the output counter 16935, the register 16945, and the comparator 16940 generates a signal 310 with a period equivalent to the time frame duration measurement 16955 filtered by the FIR filter. This signal 310 is used as an LTR for the switching system 16300 operation.

The FIR filter 16950 is comprised of a plurality of registers 16960, a plurality of adders 16970, and interconnections 16965, 16975, and 16973 among them. In the sample embodiment depicted in FIG. 35, the FIR filter comprises N registers 16960 numbered from 0 to N-1.

A time frame duration measurement to be filtered 16933 is first loaded in register 0 16960 and moved to register 1 16960 as a new measurement is available at the input 16933 of the FIR filter 16950. As more measurements become available, the measurements stored in the registers 16960 are moved to the next register 16960 through the data lines 16965 interconnecting each register 16960 with the next one. The measurement stored in register N-1 16960 is discarded as a new measurement becomes available.

The movement of the content of each register 16960 to the next register 16969 is paced by the target signal 16915 that is connected to the load input 16963 of each register 16960. Whenever the load signal 169663 is applied to a register 16960, the value on its data input 16966 is stored in the register 16960 and will appear on the data output 16965. Since the data output 16965 of each register i 16960 is coupled with the data input 16966 of the next register i+1 16960, each time the target signal 16915 has a transition, the values of the registers 16960 are shifted towards register N-1 16960.

The FIR filter 16950 employs a plurality of adders 16970 to calculate the average of all the values stored in the N registers 16960. The data output 16965 of each register is divided by N 16973 and fed into a respective adder 16970. The output 16975 of each first adder 16970 is fed into a second respective adder 16970. No input of the adder 16970 coupled with register 1 16960 is coupled with another adder 16970; instead one 16975 of the inputs of the adder 16970 coupled with register 1 16960 is coupled with register 0 16960. Moreover, the output 16955 of the adder 16970 coupled with register N-1 16960 is not coupled with another adder 16970. Instead, the output 16955 of the adder 16970 coupled with register N-1 16960 is the output 16955 of the FIR filter 16950.

Notice that if N is a power of 2, the division by N of the data output 16965 of each register 16960 can be simply obtained by not connecting the N least significant bits of the data output 16965 of the register 16960 to the data line 16973. In other words, the least significant bit of line 16973 is connected to bit N of the data output 16965, the next bit of line 16973 is connected to bit N+1 of the data output 16965, and so on until the most significant bit of the data output 16965 is connected to data line 16973.

As shown in FIG. 27 and FIG. 28, when switches are operating responsive to their local clocks, their local time references (LTRs) drift with respect to each other. Over long periods of time, as shown in FIG. 28, this results in possibly long waiting times for data units inside the per-TF-queuing subsystem 15230 of their respective input port (see FIG. 30). If the number of TF queues 15235 in the per-TF-queuing subsystem 15230 is not large enough to accommodate data units received during a number of time frames equal to the delay experienced by data units within the per-TF-queuing subsystem 15230, data units are discarded. For example, in the scenario depicted in FIG. 28, data units received by node B during LTR(B) time frame 2 are forwarded during LTR(B) time frame 1 in the following time cycle, as shown by arrow 16270-1. Hence, in order to avoid loss, the per-TF-queuing subsystem 15230 must comprise at least 80 TF queues 15235.

In other words, given the number of TF queues 15235 in the per-TF-queuing subsystem 15230 and the accuracy level (i.e., the ratio between the nominal oscillating frequency and the actual oscillating frequency of its respective local clock) there is a maximum time during which a node can operate responsive to its LTR before having to drop data units.

FIG. 34 shows the aforementioned maximum time for a number of configurations comprising different numbers of TF queues 15235 within the per-TF-queuing subsystem 15230 depicted in FIG. 30, various levels of clock accuracy, and various choices of time frame duration.

Four well-known levels of clock accuracy are considered in the scenarios reported in FIG. 34. A stratum 1 clock has an accuracy of 1 e-10, i.e., its oscillating frequency can differ from its nominal oscillating frequency by 1 e-10. If a switch with a stratum 1 clock 16920 in the clocking subsystem 16900 depicted in FIG. 35 loses the CTR signal 002 and starts operating with its local clock 16920, the error in the frequency generated by the clock 16920 accumulates over time and the LTR drifts with respect to the CTR, resulting in a misalignment of the CTR time cycle and the LTR time cycle. The misalignment between LTR and CTR does not produce any effect as long as it is smaller than a time frame. When the misalignment becomes larger than a time frame, data units can be lost unless enough buffering space is available within the per-TF-queuing subsystem 15230 in FIG. 30 to handle the situation.

When the LTR and the CTR are aligned, three TF queues 15235 within the per-TF-queuing subsystem 15230 in FIG. 30 are sufficient to ensure proper operation. The three TF queues 15235 are written and read as a circular buffer. The mapping & alignment subsystem 16400 switches to the next queue 15235 for writing whenever a new time frame begins according to its respective UTR. The mapping & alignment subsystem 16400 in FIG. 30 switches to the next queue 15235 for reading whenever a new time frame begins according to the switching system's respective LTR.

If, due to differences in clocks' frequency, the LTR has longer time frames than the CTR, and hence than the UTRs, the mapping & alignment subsystem 16400 in FIG. 30 switches too early to the next queue 15235 for writing. When the misalignment between CTR and LTR is larger than one time frame, the mapping & alignment subsystem 16400 can possibly switch to the next TF queue 15235 for writing before the data units stored in the next TF queue 15235 have been retrieved for switching and transmission. Consequently, the data units in the TF queue 15235 are overwritten and lost.

This can be avoided by having more than three TF queues 15235 within the per-TF-queuing subsystem 15230. For example, if an extra queue is present, a misalignment between LTR and CTR up to 2 time frames can be tolerated without loss because the mapping & alignment subsystem 16400 in FIG. 30 can start writing in the extra TF queue 15235 while it is still retrieving data units for switching and forwarding from the third TF queue 15235.

If, due to differences in clocks' frequency, the LTR has shorter time frames than the CTR, when the misalignment between LTR and CTR is larger than one time frame, the mapping & alignment subsystem 16400 in FIG. 30 may start retrieving data units from the same TF queue 15235 in which it is storing data units, thus under-running such queue 15235. This can be avoided by having more than three queues and by operating non-immediate forwarding when the CTR signal 002 is available. If switching and forwarding of data units is delayed by one time frame during normal operation, a misalignment between LTR and CTR of up to 2 time frames can be tolerated without under-running a TF queue 15235.

The table in FIG. 34 was calculated assuming that if N TF queues 15235 are comprised within the per-TF-queuing subsystem 15230 in FIG. 30, the switch delays data units for (N−3)/2 time frames. As a result, a misalignment between CTR and LTR of at least (N−3)/2 can be tolerated without loss or under-running one TF queue.

The first column of the table in FIG. 34 shows the considered time frame duration, the second column shows the number of TF queues 15235 within the per-TF-queuing subsystem 15230 as shown in FIG. 30. The third column shows the amount of memory required to implement the per-TF-queuing subsystem 15230 when considering a channel capacity of 2.5 Gb/s for a time frame duration of 7.8125 microseconds and 10 Gb/s for the other values of time frame duration. The fourth column shows the accuracy of the switching system clock 16920 characterized by the stratum shown in the fifth column. The last four columns show the maximum time the switching system is able to operate properly (without loss due to congestion) with the LTR generated by its local clock 16920. Notice that the clock accuracy is also the error rate of the switching system if operated responsive to an LTR generated by the local clock 16920 for a time longer than the system tolerance.

Key feature of the presented switching method: in normal operating conditions each TF is switched immediately. In particular conditions, e.g., protection, (some) TFs are delayed.

The frequency of the selected time reference is recovered and this is enough to work properly without slips. The phase can be recovered if the link length is known.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A switching system having a plurality of communications switches each having a plurality of inputs and a plurality of outputs for switching data units in time frames, the system further comprising of:

a first communications switch and a second communications switch connected by at least one communications channel for transmitting a plurality of data units in time frames through said communications channel to the output of the switching system;

wherein each of the inputs of each of the communications switches is coupled to a plurality of uniquely addressable incoming communications channels and each of the outputs of each of the communications switches is coupled to a plurality of uniquely addressable outgoing communications channels;

a common time reference (CTR);

wherein the CTR is divided into a plurality of contiguous periodic super cycles (SCs) each comprised of at least one contiguous time cycle (TC) each comprised of at least one contiguous time frame (TF);

wherein the CTR is coupled to each of the communications switches;

wherein the TF has associated therewith at least one of header control information and trailer control information;

wherein the data units associated with the time frames (TFs) are received over the incoming communications channels and transmitted over the outgoing communications channels; and wherein the data units associated with selected ones of the TFs are forwarded over selected ones of the outgoing communications channels of the first communications switch and then forwarded over selected ones of the outgoing communications channels of the second communications switch responsive to at least one of the CTR, the header control information, and the trailer control information.

2. The system as in claim 1, wherein there is a predefined delay between when data units associated with each selected one of the TFs are forwarded from the first communications switch and the second communications switch.

3. The system as in claim 1,
wherein the selected ones of the outgoing communications channels of the second communications switch are determined by the header control information and the forwarding time for the data units is determined by the CTR and the header control information.

4. The system as in claim 1,
wherein there are a plurality of second communications switches each coupled via a separate communications channel to the first communications switch.

5. The system as in claim 4,
wherein selected ones of the data units for the associated TFs are forwarded to selected ones of the plurality of second communications switches.

6. The system as in claim 2,
wherein the predefined delay is at least one of: an integer number of TFs, an integer number of TFs and a fraction of a TF, a fraction of a time cycle, a fraction of a super cycle.

7. The system as in claim 1,
wherein there is no header control information.

8. The system as in claim 1,
wherein there is no trailer control information.

9. The system as in claim 1,
wherein at least one of the header control information and the trailer control information includes a field for checking for the correct transmission of the data units that are contained within the respective time frame.

10. The system as in claim 1, further comprising:
a plurality of mapping and alignment subsystems;
wherein the incoming communications channels are coupled to the mapping and alignment subsystems;
a switch fabric;
a switch controller;
wherein the mapping and alignment subsystems are coupled to the switch fabric;
wherein the switch fabric is coupled to the outgoing communications channels;
wherein the CTR is coupled to the switch controller; and
wherein the switch controller is coupled to the mapping and alignment subsystems and the switch fabric.

11. The system as in claim 10,
wherein each of the mapping and alignment subsystems is further comprised of: a plurality of time frame queues (TF-queues) and a mapping controller; and
wherein the mapping controller stores the data units received in each of the time frames of a respective one of the incoming communications channels in one of the TF-queues responsive to at least one of the header control information, the trailer control information and the CTR.

12. The system as in claim 11,
wherein the header control information further contains a routing label; and
wherein the routing label is used for selecting the respective TF-queue within which the data units received in the respective time frame should be stored.

13. The system as in claim 12,
wherein the switch controller couples, in every time frame through the switch fabric, a selected one of the TF-queues to at least one of the outgoing communications channels for output forwarding of the data units received in said TF-queue during respective ones of the time frames.

14. The system as in claim 13,
wherein the routing label in the header control information is replaced by a new header control information prior to the output forwarding.

15. The system as in claim 12,
wherein the routing label is at least one of: ATM virtual circuit (VC) label, ATM virtual path (VP) label, MPLS label, IP v4 address, IP v6 address, fiber channel address and, Ethernet MAC address.

16. A switching system having a plurality of communications switches each with a plurality of inputs and a plurality of outputs for switching data units in time frames, the system further comprising:
a first communications switch, a second communications switch and a third communications switch;
wherein the first communications switch is connected by at least one first communications channel to the second communications switch for transmitting a plurality of data units in time frames through the first communications channel to the output of the switching system;
wherein the first communications switch is connected by at least one second communications channel to the third communications switch for transmitting a plurality of data units in time frames through the second communications channel to the output of the switching system;
wherein each of the inputs of each of the communications switches are coupled to a plurality of uniquely addressable incoming communications channels and each of the outputs of the communications switches is coupled to a plurality of uniquely addressable outgoing communications channels;
a common time reference (CTR);
wherein the CTR is divided into a plurality of contiguous periodic super cycles (SCs) each comprised of at least one contiguous time cycle (TC) each comprised of at least one contiguous time frame (TF);
wherein the CTR is coupled to each of the communications switches;
wherein selected one of the TFs have at least one of header control information and trailer control information;
wherein the data units for consecutive TFs are received over the incoming communications channels and transmitted over outgoing communications channels; and
wherein the data units for selected ones of the TFs are forwarded over selected ones of the outgoing communications channels of the first communications switch and then forwarded over selected ones of the outgoing communications channels of the second communications switch responsive to the CTR and the header control information.

17. The system as in claim 16, further comprising:
means for detecting failure in transmitting of the plurality of data units in time frames through the first communications channel to the second communications switch; and
wherein responsive to detecting failure through the first communications channel to the second communications switch, said respective data units in time frames are forwarded through the second communications channel to the third communications switch.

18. The system as in claim 17, further comprising:
means responsive to detecting failure of communications of the data units through the first communications channel to the second communications switch, to provide that said respective data units in time frames are forwarded through the second communications channel to the third communications switch.

19. The system as in claim 11,
wherein the header control information further contains a routing label.

20. The system as in claim 19,
wherein the routing label in the header control information is replaced by a new routing label prior to the data units in selected ones of the TFs are forwarded over selected ones of the outgoing communications channels.

21. The system as in claim 19,
wherein the routing label is at least one of: ATM virtual circuit (VC) label, ATM virtual path (VP) label, MPLS label, IP v4 address, IP v6 address, fiber channel address and, Ethernet MAC address.

22. A switching system, comprising:
a switch apparatus for switching data units contained within defined ones of a plurality of contiguous time frames, between a plurality of input ports and a plurality of output ports, wherein each of the time frames has associated control information;
a Common Time Reference (CTR) divided into time frames (TFs);
a plurality of mapping and alignment subsystems (MAS), each said MAS coupled to a respective one of the input ports, and responsive to the CTR and the associated control information for providing an aligned output that is aligned to the CTR and that contains the respective data units from the respective input port for each of the respective time frames;
a switch fabric providing for coupling of the data units from the aligned outputs for each of the time frames to respective ones of the output ports responsive to the CTR and the associated control information; and
wherein the data units at the input ports contained within a single time frame are provided to the output ports within a single time frame.

23. The system as in claim 22, wherein the data units at the input ports contained within a single time frame are provided as aligned outputs within a single time frame.

24. The system as in claim 22, wherein the MAS is further comprised of:
a plurality of time frame queues; and
a mapping subsystem comprising: a mapping controller coupled to receive the data units within the time frames from the respective input port, and a time frame mapping table, for defining associative mapping of the received data units received within the respective time frame to a respective one of the time frame queues, responsive to the CTR and the respective control information associated with the respective time frame.

25. The system as in claim 24, further comprising:
means for storing the respective data units in respective ones of the time frame queues responsive to the mapping subsystem.

26. The system as in claim 25, further comprising:
a forwarding controller comprising a time frame queue mapping table for defining associative mapping between the time frame queue outputs and the respective time frames during which to forward the time frame queue output as the respective aligned output; and
a scheduling subsystem for selectively forwarding the data units from the time frame queues to provide the respective alignment output, responsive to the CTR and to the time frame queue mapping table.

27. The system as in claim 26,
wherein the associated control information further contains a routing label; and
wherein the routing label is used for selecting the respective time frame queue within which the data units received in the respective time frame should be stored.

28. The system as in claim 27,
wherein the switch apparatus couples, in every time frame through the switch fabric, a selected one of the time frame queues to at least one of the output ports for output forwarding of the data units received in said time frame queue during respective ones of the time frames.

29. The system as in claim 28,
wherein the routing label in the associated control information is replaced by a new control information prior to the data units in selected ones of the TFs are forwarded from selected ones of the outputs.

30. The system as in claim 27,
wherein the routing label is at least one of: ATM virtual circuit (VC) label, ATM virtual path (VP) label, MPLS label, IP v4 address, IP v6 address, fiber channel address and, Ethernet MAC address.

31. The system as in claim 26,
wherein the associated control information further contains a time frame delimiter; and
wherein the time frame delimiter is used for identifying the respective time frame beginning and end.

32. A method of switching data units contained within time frames, between a plurality of input ports and a plurality of output ports, the method comprising:
providing a Common Time Reference (CTR); dividing the CTR into defined ones of a plurality of contiguous time frames;
associating control information with each of the time frames;
providing for each of the input ports, an aligned output that is aligned to the CTR and that contains the respective data unit from the respective input port for each of the respective time frames responsive to the CTR and the associated control information;
providing for coupling of the data units from the aligned outputs for each of the time frames to respective ones of the output ports responsive to the CTR; and
providing the data units to the output ports within a single time frame for respective ones of the data units at the input ports having the data units contained within a signal time frame.

33. The method as in claim 32, further comprising:
providing as aligned outputs within a single time frame the data units at the input ports contained within a single time frame.

34. The method as in claim 32, further comprising:
providing a plurality of time frame queues;
receiving the data units within time frames from the respective input port;
defining associative mapping of the received data units received within the respective time frame to a respective one of the time frame queues, responsive to the CTR and the respective control information associated with the respective time frame.

69

35. The method as in claim 34, further comprising:
storing the respective data units in respective ones of the time frame queues responsive to the associative mapping.

36. The method as in claim 35, further comprising:
defining the associative mapping of time frame queues between the time frame queue outputs and the respective time frame during which to forward the time frame queue output as the respective aligned output; and
selectively forwarding the data units from the time frame queues to provide the respective alignment output, responsive to the CTR and to the associative mapping of the time frame queues.

37. The method as in claim 32, further comprising:
providing a routing label within the control information;
selecting the respective time frame queue within which the data units received in the respective time frame should be stored, responsive to the routing label.

38. The method as in claim 37, further compromising:
coupling in every time frame a selected one of the time frame queues to at least one of the output ports for output forwarding of the data units received in said time frame queue during respective ones of the time frames.

39. The method as in claim 38 further comprising:
replacing the routing label in the control information by a new header control information prior to the output forwarding.

40. The method as in claim 37,
wherein the routing label is at least one of: ATM virtual circuit (VC) label, ATM virtual path (VP) label, MPLS label, IP v4 address, IP v6 address, fiber channel address and, Ethernet MAC address.

41. A switching system having a plurality of communications switches each with a plurality of inputs and a plurality of outputs for switching data units in time frames, the system further comprising:
a first communications switch, a second communications switch and a third communications switch;
wherein the second communications switch is connected by at least one communications channel to the first communications switch for transmitting a plurality of data units in time frames through said communications channel to the output of the switching system;
wherein the third communications switch is connected by at least one communications channel to the first communications switch for transmitting a plurality of data units in time frames through said communications channel to the output of the switching system;
wherein each of the inputs of each of the communications switches are coupled to a plurality of uniquely addressable incoming communications channels and each of the outputs of the communications switches is coupled to a plurality of uniquely addressable outgoing communications channels;
a common time reference (CTR);
wherein the CTR is divided into a plurality of contiguous periodic super cycles (SCs) each comprised of at least one contiguous time cycle (TC) each comprised of at least one contiguous time frame (TF);
wherein the CTR is coupled to each of the communications switches;
wherein the TF has at least one of header control information and trailer control information;

70 wherein the data units for consecutive TFs are received over the incoming communications channels and transmitted over outgoing communications channels; and
wherein the data units for selected ones of the TFs are forwarded over selected ones of the outgoing communications channels of the second communications switch and then forwarded over selected ones of the outgoing communications channels of the first communications switch responsive to the CTR and the header control information.

42. The system as in claim 41, further comprising:
means for detecting failure in transmitting of the plurality of data units in time frames through said communications channel from the second communications switch; and
wherein responsive to detecting failure through said communications channel to the first communications switch, said respective data units in time frames are forwarded through said communications channel from the third communications switch.

43. The system as in claim 42, further comprising:
means responsive to detecting failure of communications of the data unit from said second communications switch, to provide that said respective data units in time frames are forwarded through said communications channel from the third communications switch.

44. A switching method, for use with a switching system having inputs and outputs and comprised of a plurality of communications switches each having a plurality of inputs and a plurality of outputs for switching data units in time frames, the method comprising:
connecting a first communications switch and a second communications switch by at least one communications channel;
transmitting a plurality of data units in time frames through said communications channel to the output of the switching system;
coupling each of the inputs of each of the communications switches to a plurality of uniquely addressable incoming communications channels;
coupling each of the outputs of each of the communications switches to a plurality of uniquely addressable outgoing communications channels;
providing a common time reference (CTR);
dividing the CTR into a plurality of contiguous periodic super cycles (SCs) each comprised of at least one contiguous time cycle (TC) each comprised of at least one contiguous time frame (TF);
coupling the CTR to each of the communications switches;
associating each of the TF with at least one of header control information and trailer control information;
receiving the data units associated with the time frames (TFs) over the incoming am communications channels;
transmitting the data units associated with the time frames (TFs) over outgoing communications channels;
forwarding the data units associated with selected ones of the TFs over selected ones of the outgoing communications channels of the first communications switch and then forwarding the data units associated with selected ones of the TFs over selected ones of the outgoing communications channels of the second communications switch responsive to at least one of the CTR, the header control information, and the trailer control information.

45. The method as in claim 44, further comprising:

providing a predefined time delay between when selected ones of the data units associated with each selected one of the TFs are forwarded from the first communications switch and when the selected ones of the data units are forwarded out from the second communications switch.

46. The method as in claim 44, further comprising:

determining the selected one of the outgoing communications channels of the second communications switch responsive to the header control information; and determining the forwarding time for the data units responsive to the CTR and the header control information.

47. The method as in claim 44, further comprising:

coupling a plurality of second communications switches via a separate communications channel to the first communications switch.

48. The method as in claim 47, further comprising:

forwarding selected ones of the data units for the associated TFs to selected ones of the plurality of the second communications switches.

49. The method as in claim 45, wherein the predefined delay is at least one of: an integer number of TFs, an integer number of TFs and a fraction of a TF, a fraction of a time cycle, a fraction of a super cycle.

* * * * *